US012698191B2

(12) United States Patent
Shankar et al.

(10) Patent No.: US 12,698,191 B2
(45) Date of Patent: Aug. 4, 2026

(54) SYSTEMS AND METHODS FOR DIRECTION OF TRAVEL

(71) Applicant: Oshkosh Corporation, Oshkosh, WI (US)

(72) Inventors: Prabhu Shankar, Oshkosh, WI (US); Timothy Smullen, Oshkosh, WI (US); Samuel Myers, Oshkosh, WI (US); Matthew Gilbride, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 65 days.

(21) Appl. No.: 18/602,581

(22) Filed: Mar. 12, 2024

(65) Prior Publication Data

US 2024/0308832 A1 Sep. 19, 2024

Related U.S. Application Data

(60) Provisional application No. 63/451,817, filed on Mar. 13, 2023, provisional application No. 63/451,823, filed on Mar. 13, 2023.

(51) Int. Cl.
*B66F 11/04* (2006.01)
*B66F 17/00* (2006.01)

(52) U.S. Cl.
CPC .......... *B66F 11/048* (2013.01); *B66F 11/044* (2013.01); *B66F 11/046* (2013.01); *B66F 17/006* (2013.01)

(58) Field of Classification Search
CPC ..... B66F 11/048; B66F 11/044; B66F 11/046; B66F 17/006
See application file for complete search history.

(56) References Cited

U.S. PATENT DOCUMENTS 7,139,411 B2 11/2006 Fujimura et al.
7,263,209 B2 8/2007 Camus et al.
(Continued)

FOREIGN PATENT DOCUMENTS

CN 202273265 U 6/2012
CN 105704435 A 6/2016
(Continued)

OTHER PUBLICATIONS

Invitation to Pay Additional Fees issued in connection with PCT/US2024/019529 dated Sep. 10, 2024.
(Continued)

*Primary Examiner* — Rami Khatib
(74) *Attorney, Agent, or Firm* — Foley & Lardner LLP

(57) ABSTRACT

A vehicle can include a chassis. The vehicle can also include a turntable. The turntable can be movably coupled with the chassis. The vehicle can also include a first camera and a second camera. The vehicle can also include a control system. The control system can include one or more memory devices. The one or more memory devices can store instructions thereon. The instruction can, when executed by one or more processors, cause the one or more processors to receive first data indicating movement of the vehicle. The instructions can also cause the one or more processors to generate a first user interface including image data from the first camera. The instructions can also cause the one or more processors to in response to the first data indicating the movement of the vehicle, generate a second user interface including image data from the second camera.

19 Claims, 36 Drawing Sheets

(56) References Cited

U.S. PATENT DOCUMENTS

| | | | |
|---|---|---|---|
| 7,342,486 | B2 | 3/2008 | Tsukada et al. |
| 7,567,687 | B2 | 7/2009 | Kudo |
| 7,667,581 | B2 | 2/2010 | Fujimoto |
| 8,340,874 | B2 | 12/2012 | Lee |
| 9,300,954 | B2 | 3/2016 | Tanizumi et al. |
| 9,580,961 | B2 | 2/2017 | Kraemer |
| 9,836,938 | B2 | 12/2017 | Kiyota |
| 10,465,362 | B2 | 11/2019 | Kiyota et al. |
| 10,467,903 | B1 | 11/2019 | Chase |
| 10,661,712 | B2 | 5/2020 | Ishihara et al. |
| 10,750,953 | B1 | 8/2020 | Chase |
| 10,755,576 | B2 | 8/2020 | Chase |
| 10,824,853 | B2 | 11/2020 | Kiyota |
| 10,988,361 | B2 | 4/2021 | Luminet et al. |
| 11,062,608 | B2 | 7/2021 | Chase |
| 11,294,380 | B2 | 4/2022 | Chase |
| 11,414,838 | B2 | 8/2022 | Izumikawa |
| 11,420,855 | B2 | 8/2022 | Ishizaki |
| 11,554,775 | B2 | 1/2023 | Chase |
| 11,574,534 | B2 | 2/2023 | Maley |
| 11,590,892 | B2 | 2/2023 | Bruflodt et al. |
| 11,623,584 | B2 | 4/2023 | Seki |
| 11,647,686 | B2 | 5/2023 | Kean et al. |
| 11,661,722 | B2 | 5/2023 | Bruflodt et al. |
| 11,697,920 | B2 | 7/2023 | Kiyota et al. |
| 11,981,547 | B2 | 5/2024 | Minami |
| 2004/0252862 | A1 | 12/2004 | Camus et al. |
| 2005/0231339 | A1 | 10/2005 | Kudo |
| 2006/0177097 | A1 | 8/2006 | Fujimura et al. |
| 2007/0274566 | A1 | 11/2007 | Fujimoto |
| 2010/0073479 | A1 | 3/2010 | Uto et al. |
| 2010/0204873 | A1 | 8/2010 | Lee |
| 2013/0088593 | A1 | 4/2013 | Ishimoto |
| 2015/0033962 | A1 | 2/2015 | Schwartz et al. |
| 2015/0159564 | A1 | 6/2015 | Wildgrube et al. |
| 2015/0175353 | A1 | 6/2015 | Gillmore et al. |
| 2015/0217981 | A1 | 8/2015 | Baillargeon et al. |
| 2015/0249821 | A1 | 9/2015 | Tanizumi et al. |
| 2016/0005286 | A1 | 1/2016 | Kiyota |
| 2016/0221812 | A1 | 8/2016 | Puszkiewicz et al. |
| 2017/0073934 | A1 | 3/2017 | Kiyota et al. |
| 2017/0083760 | A1 | 3/2017 | Kiyota |
| 2017/0297425 | A1 | 10/2017 | Wildgrube et al. |
| 2018/0251354 | A1 | 9/2018 | Mohlman et al. |
| 2018/0258616 | A1 | 9/2018 | Kiyota et al. |
| 2019/0071291 | A1 | 3/2019 | Puszkiewicz et al. |
| 2019/0077646 | A1 | 3/2019 | Puszkiewicz et al. |
| 2019/0093318 | A1* | 3/2019 | Izumikawa ........... E02F 9/2033 |
| 2019/0121353 | A1 | 4/2019 | Datema et al. |
| 2019/0152753 | A1 | 5/2019 | Vial et al. |
| 2019/0177140 | A1 | 6/2019 | Gilbride et al. |
| 2019/0225471 | A1 | 7/2019 | Luminet et al. |
| 2019/0248289 | A1* | 8/2019 | Ishihara .................... G06T 1/00 |
| 2019/0346857 | A1 | 11/2019 | Chase |
| 2020/0031641 | A1 | 1/2020 | Puszkiewicz et al. |
| 2020/0066159 | A1 | 2/2020 | Chase |
| 2020/0094671 | A1 | 3/2020 | Wildgrube et al. |
| 2020/0149248 | A1 | 5/2020 | Ram-On et al. |
| 2020/0249681 | A1 | 8/2020 | Chase |
| 2020/0311964 | A1 | 10/2020 | Ishizaki |
| 2020/0317256 | A1 | 10/2020 | Hao et al. |
| 2020/0317480 | A1 | 10/2020 | Shankar et al. |
| 2020/0317488 | A1 | 10/2020 | Bafile et al. |
| 2020/0317489 | A1 | 10/2020 | Bhatia et al. |
| 2020/0317492 | A1 | 10/2020 | Bhatia et al. |
| 2021/0002112 | A1 | 1/2021 | Puszkiewicz et al. |
| 2021/0101791 | A1 | 4/2021 | Ishizaki |
| 2021/0124347 | A1 | 4/2021 | Datema et al. |
| 2021/0188607 | A1 | 6/2021 | Luminet et al. |
| 2021/0252969 | A1 | 8/2021 | Wildgrube et al. |
| 2021/0276423 | A1 | 9/2021 | Lombardo et al. |
| 2021/0276841 | A1 | 9/2021 | Borofka et al. |
| 2021/0276845 | A1 | 9/2021 | Gilbride et al. |
| 2021/0276847 | A1 | 9/2021 | Neubauer et al. |
| 2021/0276848 | A1 | 9/2021 | Miller et al. |
| 2021/0279991 | A1 | 9/2021 | Shankar et al. |
| 2021/0298220 | A1 | 9/2021 | Kean et al. |
| 2022/0018096 | A1 | 1/2022 | Nishi |
| 2022/0063965 | A1 | 3/2022 | Minami |
| 2022/0135385 | A1 | 5/2022 | Lombardo et al. |
| 2022/0154423 | A1 | 5/2022 | Bruflodt et al. |
| 2022/0227364 | A1 | 7/2022 | Chase |
| 2022/0234873 | A1 | 7/2022 | Miller et al. |
| 2022/0315404 | A1 | 10/2022 | Mohlman et al. |
| 2022/0371864 | A1 | 11/2022 | Shankar et al. |
| 2023/0001854 | A1 | 1/2023 | Bruflodt et al. |
| 2023/0005356 | A1 | 1/2023 | Maley |
| 2023/0074065 | A1 | 3/2023 | Howells |
| 2023/0114366 | A1 | 4/2023 | Eguchi et al. |
| 2023/0202552 | A1 | 6/2023 | Williams et al. |
| 2023/0234456 | A1 | 7/2023 | Messina et al. |
| 2023/0234462 | A1 | 7/2023 | Messina et al. |
| 2023/0234821 | A1 | 7/2023 | Messina et al. |
| 2023/0237809 | A1 | 7/2023 | Ishizaki et al. |
| 2023/0256849 | A1 | 8/2023 | Messina et al. |
| 2023/0264931 | A1 | 8/2023 | Tressler et al. |
| 2023/0273612 | A1 | 8/2023 | Datema et al. |
| 2023/0278842 | A1 | 9/2023 | Mohlman et al. |
| 2023/0286570 | A1 | 9/2023 | Hao et al. |
| 2023/0286571 | A1 | 9/2023 | Hao et al. |
| 2023/0286792 | A1 | 9/2023 | Prasetiawan et al. |
| 2023/0294528 | A1 | 9/2023 | Messina et al. |
| 2023/0311641 | A1 | 10/2023 | Wildgrube et al. |
| 2023/0312317 | A1 | 10/2023 | Puszkiewicz et al. |
| 2023/0356992 | A1 | 11/2023 | Brulo et al. |
| 2023/0416061 | A1 | 12/2023 | Shankar et al. |
| 2023/0416062 | A1 | 12/2023 | Borofka et al. |
| 2024/0034607 | A1 | 2/2024 | Shankar et al. |
| 2024/0059537 | A1 | 2/2024 | Lombardo et al. |
| 2024/0092620 | A1 | 3/2024 | Gilbride et al. |
| 2024/0124286 | A1 | 4/2024 | Bhatia et al. |
| 2024/0246801 | A1 | 7/2024 | Howells |
| 2024/0308832 | A1 | 9/2024 | Shankar et al. |
| 2024/0400353 | A1 | 12/2024 | Baskett et al. |

FOREIGN PATENT DOCUMENTS

| | | | |
|---|---|---|---|
| CN | 205320209 | U | 6/2016 |
| CN | 208285431 | U | 12/2018 |
| CN | 112248936 | A | 1/2021 |
| CN | 112519735 | A | 3/2021 |
| CN | 213623134 | U | 7/2021 |
| CN | 114132870 | A | 3/2022 |
| CN | 115123973 | A | 9/2022 |
| CN | 115142653 | A | 10/2022 |
| EP | 3 037 135 | A1 | 6/2016 |
| EP | 4 206 113 | A1 | 7/2023 |
| FR | 2836468 | A1 | 8/2003 |
| JP | H08-158407 | A | 6/1996 |
| JP | 2541613 | B2 | 10/1996 |
| JP | H1072851 | A | 3/1998 |
| JP | H10-140619 | A | 5/1998 |
| JP | 2592085 | Y2 | 9/1999 |
| JP | 2002-201676 | A | 7/2002 |
| JP | 2003-144572 | A | 5/2003 |
| JP | 2005-132242 | A | 5/2005 |
| JP | 2006-161306 | A | 6/2006 |
| JP | 2009-167747 | A | 7/2009 |
| JP | 4465551 | B2 | 5/2010 |
| JP | 2010-241548 | A | 10/2010 |
| JP | 4670488 | B2 | 4/2011 |
| JP | 2011-151742 | A | 8/2011 |
| JP | 4782714 | B2 | 9/2011 |
| JP | 2011-241643 | A | 12/2011 |
| JP | 5132924 | B2 | 1/2013 |
| JP | 5382694 | B2 | 1/2014 |
| JP | 5554251 | B2 | 7/2014 |
| JP | 2015-168973 | A | 9/2015 |
| JP | 2015-175227 | A | 10/2015 |
| JP | 5870779 | B2 | 3/2016 |
| JP | 6269569 | B2 | 1/2018 |
| JP | 6755672 | B2 | 9/2020 |
| JP | 7087790 | B2 | 6/2022 |
| JP | 7119442 | B2 | 8/2022 |

(56) References Cited

FOREIGN PATENT DOCUMENTS

| | | | |
|---|---|---|---|
| JP | 7152048 | B2 | 10/2022 |
| JP | 2023-099912 | A | 7/2023 |
| KR | 20080100523 | A | 11/2008 |
| KR | 101283567 | B1 | 7/2013 |
| KR | 20140140444 | A | 12/2014 |
| KR | 102042781 | B1 | 11/2019 |
| KR | 102102857 | B1 | 4/2020 |
| WO | WO-2012/107238 | A1 | 8/2012 |
| WO | WO-2018/055246 | A1 | 3/2018 |
| WO | WO-2022/059334 | A1 | 3/2022 |
| WO | WO-2022/194955 | A1 | 9/2022 |

OTHER PUBLICATIONS

International Search Report and Written Opinion issued in connection with PCT/US2024/019568 dated Jun. 11, 2024.

* cited by examiner

SYSTEMS AND METHODS FOR DIRECTION OF TRAVEL

CROSS-REFERENCE TO RELATED PATENT APPLICATIONS

This application claims the benefit of and priority to U.S. Provisional Patent Application No. 63/451,817, filed on Mar. 13, 2023. This application also claims the benefit of and priority U.S. Provisional Patent Application No. 63/451,823, filed on Mar. 13, 2023. The entirety of both of these applications are incorporated by reference herein.

BACKGROUND

The present disclosure relates to boom lifting devices.

SUMMARY

One embodiment relates to a vehicle. The vehicle can include a chassis. The vehicle can also include a turntable. The turntable can be movably coupled with the chassis. The vehicle can also include a first camera and a second camera. The vehicle can also include a control system. The control system can include one or more memory devices. The one or more memory devices can store instructions thereon. The instruction can, when executed by one or more processors, cause the one or more processors to receive first data indicating movement of the vehicle. The instructions can also cause the one or more processors to generate a first user interface including image data from the first camera. The instructions can also cause the one or more processors to in response to the first data indicating the movement of the vehicle, generate a second user interface including image data from the second camera.

One embodiment relates to a control system of a lift device. The control system can be in communication with a first camera of the lift device and a second camera of the lift device. The control system can include one or more memory devices. The one or more memory devices can store instructions thereon. The instruction can, when executed by one or more processors, cause the one or more processors to receive first data indicating movement of the lift device. The instructions can also cause the one or more processors to generate a first user interface including image data from the first camera. The instructions can also cause the one or more processors to in response to the first data indicating the movement of the lift device, generate a second user interface including image data from the second camera.

One embodiment relates to a lift device. The lift device can include a chassis. The lift device can also include a turntable. The turntable can be movably coupled with the chassis. The lift device can also include a first camera and a second camera. The lift device can also include a control system. The control system can include one or more memory devices. The one or more memory devices can store instructions thereon. The instructions can, when executed by one or more processors, cause the one or more processors to receive, via a first user interface, a request to initiate a registration process for the first camera and the second camera. The first camera and the second camera can be connected to a network that includes the lift device. The instructions can also cause the one or more processors to detect, responsive to receipt of the request, the first camera and the second camera. The instructions can also cause the one or more processors to determine, using information pertaining to the first camera and the second camera, that the first camera was previously absent from the network. The instructions can also cause the one or more processors to generate, for the first camera, an identifier for use in the network. The instructions can also cause the one or more processors to generate a second user interface to include a window to register the first camera. The window can include one or more selectable regions configured to receive input pertaining to the registration process for the first camera and the second camera. The instructions can also cause the one or more processors to detect, responsive to an interaction with the second user interface, an indication that identifies a position of the first camera relative to the lift device.

One embodiment relates to a vehicle. The vehicle can include a chassis. The vehicle can also include a turntable. The turntable can be rotatably coupled to the chassis. The turntable can include a counterweight. The vehicle can also include a boom assembly. The boom assembly can have a proximal end portion coupled to the turntable and a distal end portion opposite the proximal end portion. The vehicle can also include a camera directly coupled to the counterweight. The camera can have a field of view extending away from the boom assembly.

One embodiment relates to a vehicle. The vehicle can include a chassis. The vehicle can also include a turntable rotatably coupled to the chassis. The vehicle can also include a boom assembly having a proximal end portion coupled to the turntable and a distal end portion opposite the proximal end portion. The vehicle can also include a platform coupled to the distal end portion of the boom assembly. The platform can support an operator. An obstructed area rearward of the platform can be obstructed from view from the platform by the turntable. The vehicle can also include a camera coupled to the turntable. The camera can have a field of view including at least a portion of the obstructed area. The vehicle can also include a display coupled to the platform. The display can display image data from the camera.

One embodiment relates to a vehicle. The vehicle can include a first component. The vehicle can also include a second component rotatably coupled to the first component. The vehicle can also include an assembly having a first portion coupled to the second component and a second portion opposite the first portion. The vehicle can also include a camera coupled to the second component. The camera can have a field of view extending away from the assembly.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
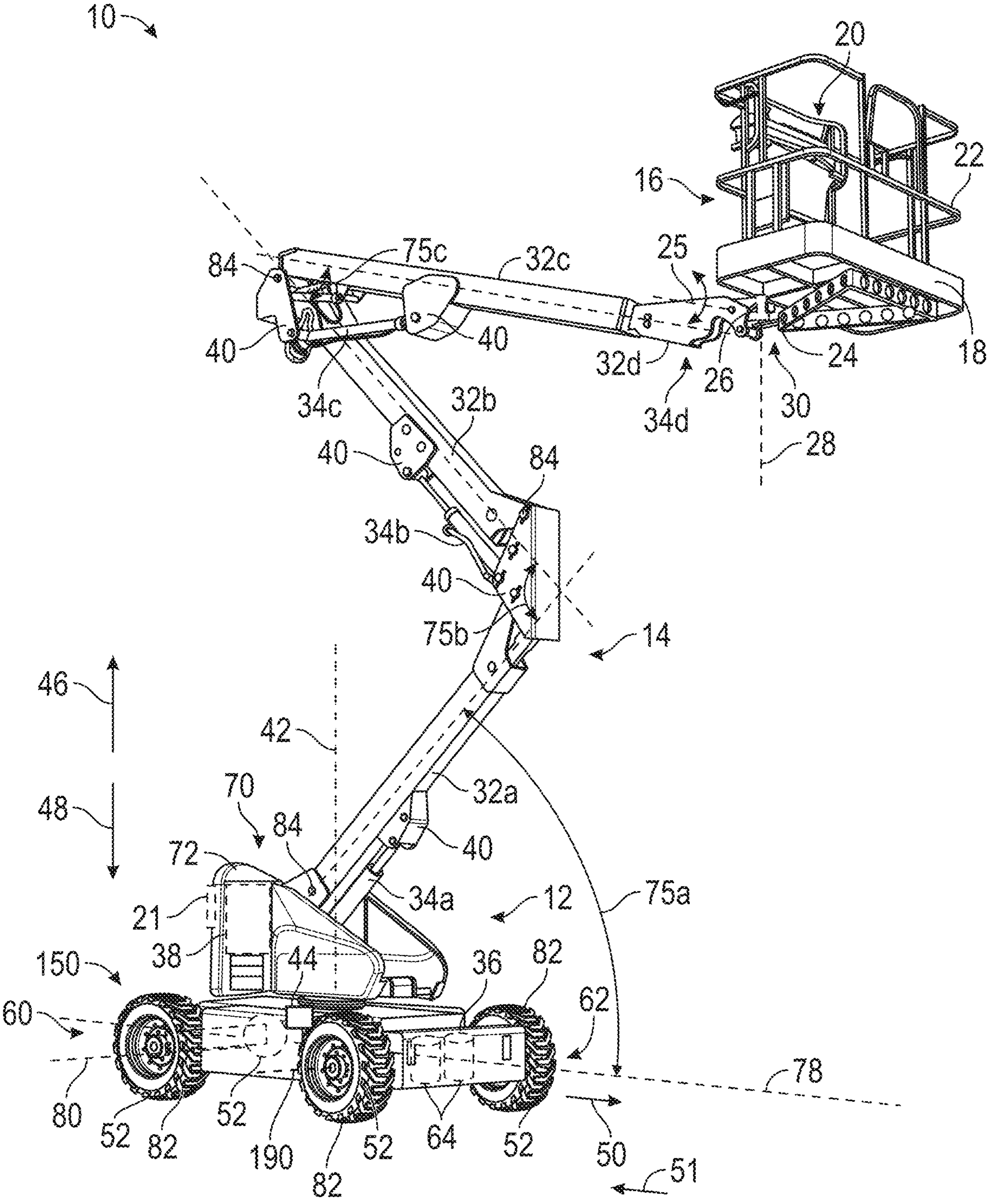
FIG. 1 is a perspective view of a fully electric boom, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a fully electric boom is shown, according to various exemplary embodiments. The fully electric boom includes a platform assembly, a lift assembly, and a base assembly. The base assembly supports the lift assembly and the platform assembly. The platform assembly is positioned at a top end of the lift assembly. The lift assembly can include one or more articulated arms that are hingedly coupled with each other. The one or more articulated arms are configured to be driven to pivot by electric linear actuators. As the articulated arms pivot, the lift assembly increases or decreases in height, thereby raising and lowering the platform assembly.

The base assembly include a turn table and a base. The turn table is rotatably coupled with the base. The lift assembly is rotatably coupled with the turn table. The turn table is driven to rotate relative to the base assembly by an electric turn table motor. The base assembly also includes one or more tractive elements. The tractive elements each include an electric motor configured to drive the corresponding tractive element. The tractive elements can be independently driven by the corresponding electric motor. The base assembly includes a steering system. The steering system includes an electric linear actuator that extends and retracts. An end of a rod of the electric linear actuator is fixedly coupled with an end of one or more arcuate/curved steering members. The one or more arcuate/curved steering members are pivotally coupled with a steering knuckle of the tractive element. An end of the housing of the electric linear actuator is pivotally/rotatably coupled with the base. The electric linear actuator can be extended or retracted to pivot the corresponding tractive element for a turn.

The electric turntable motor is rotatably coupled with a gear box. The gear box receives rotational kinetic energy from the electric turntable motor and outputs rotational kinetic energy with a higher torque. Depending on the orientation/configuration of the electric turntable motor and the gear box, a transmission can be used to transfer the rotational kinetic energy into an axis that is substantially parallel to an axis that a ring gear of the turntable rotates about (e.g., using bevel gears). In other embodiments, the transmission or the gear box includes a worm and the ring gear is a worm gear.

The fully electric boom can include energy storage devices (e.g., batteries). Any of the motors, electric linear actuators, etc., of the fully electric boom can receive electrical power from the energy storage devices. A controller is configured to receive user inputs from one or more human machine interfaces and operate any of the motors, electric linear actuators, etc., of the fully electric boom. The controller may generate control signals for any of the electric motors, electric linear actuators, etc. The controller can also monitor feedback (e.g., voltage feedback, current feedback, etc.) from any of the electric linear actuators, electric motors, etc.

The fully electric boom can include a boom arm and a jib arm. The boom arm is configured to lower and raise by one or more electric linear actuators. The jib arm is coupled to an end of the boom arm and is configured to rotate and pivot the platform assembly. The jib arm includes a platform rotator that pivotally couples the platform assembly with the jib arm.

The platform rotator pivotally couples the platform assembly with the jib arm. The platform rotator can include a barrel formed by two portions that couple with the platform assembly. The barrel can fixedly couple with one or more structural support members that protrude outwards from the platform assembly.

The barrel is supported on either side (e.g., an upper side and a lower side) by structural support members that extend from the end of the jib arm. The barrel can slidably interface with the structural support members. The barrel and the structural support members are configured to rotatably or pivotally couple with each other.

The platform rotator includes an electric motor, a brake, and one or more gear boxes. The electric motor is configured to drive the one or more gear boxes to pivot the barrel relative to the structural support members that support the barrel. The one or more gear boxes can be reduction gear boxes that increase the output torque provided to the barrel. The brake can be an electric brake that transitions between an activated state and a deactivated state. When in the activated state, the brake facilitates restricting relative rotation between the barrel and the structural support members that support the barrel.

The electric motor and the brake of the platform rotator can receive electrical energy from the batteries of the electric boom. The electric motor and the brake can be operated by a controller in response to the controller receiving a user input from a human machine interface. The controller can operate the electric motor to pivot/rotate the platform assembly in either direction. The controller may transition the brake into the activated state to facilitate locking a current angular position of the platform assembly.

The fully electric boom can include a boom arm and a jib arm. The boom arm can include lower members, upper members, and two upright members. The lower members are pivotally coupled with the turntable at a lower end. The lower members are pivotally coupled at an upper end with a first one of the upright members. The upper members are pivotally coupled at a lower end with the first upright member, and pivotally coupled with the second upright member at the upper end. The jib arm is pivotally coupled with the second upright member. The lower members can pivot about the lower end to raise and lower the first upright member. The upper members can pivot about their lower ends to raise and lower the second upright member and the jib arm.

An electric linear actuator is pivotally coupled at a lower end with one of the lower members. The electric linear actuator is mounted with a trunnion mount to one of the upper members at an upper end. The trunnion mount includes a collar that surrounds a cylinder of the electric linear actuator. The collar can be a single-piece clamping collar or a two-piece clamping collar. The collar includes protrusions that extend radially outwards and pivotally couple with apertures of one of the upper members. The trunnion mount facilitates using an electric linear actuator with a longer overall stroke length. The electric linear actuator can be operated to pivot the upper members about their bottom ends, and thereby raise/lower the second upright member.

Another electric linear actuator can be pivotally coupled at a lower end with the turntable and pivotally coupled with one of the lower members with a trunnion mount. The electric linear actuator can be operated to extend and retract to pivot the lower members about their lower ends.

The electric boom further includes an axle lock out system configured to selectively limit rotation of the axle assemblies relative to the chassis. The axle assemblies are configured to rotate relative to the chassis about a longitudinal axis. A pair of electric linear actuators (i.e., axle actuators) are coupled to the chassis on opposites sides of the longitudinal axis. The electric linear actuators extend downward from the chassis to engage the corresponding axle assembly. During a driving mode of operation, the axle actuators permit free rotation of the axle assembly. In some embodiments, during the driving mode, the axle actuators are held in a retracted configuration to permit the axle to rotate through a first range of motion without contacting the axle actuators. In other embodiments, during the driving mode, the axle actuators engage the axle assemblies, but are configured to extend and retract freely (e.g., with minimal resistance) such that the axle assembly can rotate through the first range of motion.

During an operating mode, the axle actuators limit rotation of the axle assemblies to a second range of motion smaller than the first range of motion. In embodiments where the axle actuators are held in the retracted position during the driving mode, the axle actuators are extended until they engage the axle assembly. A controller may determine that the axle actuators have engaged the axle assembly in response to the current supplied to each actuator reaching a threshold current. Once the axle actuators have engaged the axle assembly, the axle actuators may lock to a fixed length. In embodiments where the axle actuators extend and retract freely during the driving mode, the axle actuators may lock to a fixed length in response to entering the operating mode.

Advantageously, the fully electric boom does not use any hydraulic systems, hydraulic pumps, engines, internal combustion engines, etc. to perform the respective functions of the various motors and actuators. All of the motors and actuators are fully electric. Other systems use electric motors to rotate pumps of various hydraulic systems. The fully electric boom facilitates a quieter, more environmentally friendly, more efficient lift device.

Electric Boom

Referring to FIG. 1, an electric lifting apparatus, an electric telehandler, an electric boom lift, a towable electric boom lift, a lift device, a fully electric boom lift, etc., shown as electric boom 10 includes a base assembly 12 (e.g., a support assembly, a drivable support assembly, a support structure, etc.), a platform assembly 16 (e.g., a platform, a terrace, etc.), and a lift assembly 14 (e.g., a boom lift assembly, a lifting apparatus, an articulated arm, a scissors lift, a boom assembly, etc.). If electric boom 10 is a telehandler, platform assembly 16 can be replaced with a fork apparatus, a bucket apparatus, a material lifting apparatus, a mechanical lifting apparatus attachment, etc. Electric boom 10 includes a front end (e.g., a forward facing end, a front portion, a front, etc.), shown as front 62, and a rear end (e.g., a rearward facing end, a back portion, a back, a rear, etc.,) shown as rear 60. Lift assembly 14 is configured to elevate platform assembly 16 in an upwards direction 46 relative to base assembly 12. Lift assembly 14 is also configured to translate platform assembly 16 in a downwards direction 48. Lift assembly 14 is also configured to translate platform assembly 16 in either a forwards direction 50 or a rearwards direction 51. Lift assembly 14 generally facilitates performing a lifting function to raise and lower platform assembly 16, as well as movement of platform assembly 16 in various directions.

In some embodiments, electric boom 10 may be outfitted and/or implemented for use in different applications. Accordingly, the electric boom 10 can include a common vehicle that can be configured for a variety of different uses simply by selecting an appropriate application kit 80. By way of example, the electric boom 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle.

Base assembly 12 defines a longitudinal axis 78 and a lateral axis 80. Longitudinal axis 78 defines forwards direction 50 of electric boom 10 and rearwards direction 51. Electric boom 10 is configured to translate in forwards direction 50 and to translate backwards in rearwards direction 51. Base assembly 12 includes one or more wheels, tires, wheel assemblies, tractive elements, rotary elements, treads, etc., shown as tractive elements 82. Tractive elements 82 are configured to rotate to drive (e.g., translate, steer, move, etc.) electric boom 10. Tractive elements 82 can each include an electric motor 52 (e.g., electric wheel motors) configured to drive tractive elements 82 (e.g., to rotate tractive elements 82 to facilitation motion of electric boom 10). In other embodiments, tractive elements 82 are configured to receive power (e.g., rotational mechanical energy) from electric motors 52 through a drive train (e.g., a combination of any number and configuration of a shaft, an axle, a gear reduction, a gear train, etc.). Tractive elements 82 and electric motors 52 can facilitate a driving and/or steering function of electric boom 10.

Platform assembly 16 is configured to provide a work area for an operator of electric boom 10 to stand/rest upon. Platform assembly 16 can be pivotally coupled to an upper end of lift assembly 14. Electric boom 10 is configured to facilitate the operator accessing various elevated areas (e.g., lights, platforms, the sides of buildings, building scaffolding, trees, power lines, etc.). Electric boom 10 uses various electrically powered motors and electrically powered linear actuators to facilitate elevation of platform assembly 16 (e.g., relative to base assembly 12, or to a ground surface that base assembly 12 rests upon).

Platform assembly 16 includes a base member, a base portion, a platform, a standing surface, a shelf, a work platform, a floor, a deck, etc., shown as deck 18. Deck 18 provides a space (e.g., a floor surface) for a worker to stand upon as platform assembly 16 is raised and lowered.

Platform assembly 16 includes various members, beams, bars, guard rails, rails, railings, etc., shown as rails 22. Rails 22 extend along substantially an entire perimeter of deck 18. Rails 22 provide one or more members for the operator of electric boom 10 to grasp while using electric boom 10 (e.g., to grasp while operating electric boom 10 to elevate platform assembly 16). Rails 22 can include members that are substantially horizontal to deck 18. Rails 22 can also include vertical structural members that couple with the substantially horizontal members. The vertical structural members can extend upwards from deck 18.

Platform assembly 16 can include a human machine interface (HMI) (e.g., a user interface), shown as HMI 20. HMI 20 is configured to receive user inputs from the operator at platform assembly 16 to facilitate operation of electric boom 10. HMI 20 can include any number of buttons, levers, switches, keys, etc., or any other user input device configured to receive a user input to operate electric boom 10. HMI 20 can be supported by one or more of rails 22.

Platform assembly 16 includes a frame 24 (e.g., structural members, support beams, a body, a structure, etc.) that extends at least partially below deck 18. Frame 24 can be integrally formed with deck 18. Frame 24 is configured to provide structural support for deck 18 of platform assembly 16. Frame 24 can include any number of structural members (e.g., beams, bars, I-beams, etc.) to support deck 18. Frame 24 couples platform assembly 16 with lift assembly 14. Frame 24 may rotatably or pivotally coupled with lift assembly 14 to facilitate rotation of platform assembly 16 about an axis 28 (e.g., a centerline). Frame 24 can also rotatably/pivotally couple with lift assembly 14 such that frame 24 and platform assembly 16 can pivot about an axis 25 (e.g., a centerline).

Lift assembly 14 includes one or more beams, articulated arms, bars, booms, arms, support members, boom sections, cantilever beams, etc., shown as lift arms 32. Lift arms 32 are hingedly or rotatably coupled with each other at their ends. Lift arms 32 can be hingedly or rotatably coupled to facilitate articulation of lift assembly 14 and raising/lowering of platform assembly 16. Electric boom 10 includes a lower lift arm 32_a_, a central or medial lift arm 32_b_, and an upper lift arm 32_c_. Lower lift arm 32_a_ is configured to hingedly or rotatably couple at one end with base assembly 12 to facilitate lifting (e.g., elevation) of platform assembly 16. Lower lift arm 32_a_ is configured to hingedly or rotatably couple at an opposite end with medial lift arm 32*b*. Likewise, medial lift arm 32*b* is configured to hingedly or rotatably couple with upper lift arm 32*c*. Upper lift arm 32*c* can be configured to hingedly interface/couple and/or telescope with an intermediate lift arm 32*d*. Upper lift arm 32*c* can be referred to as "the jib" of electric boom 10. Intermediate lift arm 32*d* may extend into an inner volume of upper lift arm 32*c* and extend/retract. Lower lift arm 32*a* and medial lift arm 32*b* may be referred to as "the boom" of electric boom 10. Intermediate lift arm 32*d* can be configured to couple (e.g., rotatably, hingedly, etc.), with platform assembly 16 to facilitate levelling of platform assembly 16.

Lift arms 32 are driven to hinge or rotate relative to each other by electric actuators 34 (e.g., electric linear actuators, linear electric arm actuators, etc.). Electric actuators 34 can be mounted between adjacent lift arms 32 to drive adjacent lift arms 32 to hinge or pivot (e.g., rotate some angular amount) relative to each other about pivot points 84. Electric actuators 34 can be mounted between adjacent lift arms 32 using any of a foot bracket, a flange bracket, a clevis bracket, a trunnion bracket, etc. Electric actuators 34 are configured to extend or retract (e.g., increase in overall length, or decrease in overall length) to facilitate pivoting adjacent lift arms 32 to pivot/hinge relative to each other, thereby articulating lift arms 32 and raising or lowering platform assembly 16.

Electric actuators 34 can be configured to extend (e.g., increase in length) to increase a value of angle 74 formed between adjacent lift arms 32. Angle 74 can be defined between centerlines of adjacent lift arms 32 (e.g., centerlines that extend substantially through a center of lift arms 32). For example, electric actuator 34*a* is configured to extend/retract to increase/decrease angle 74*a* defined between a centerline of lower lift arm 32*a* and longitudinal axis 78 (angle 74*a* can also be defined between the centerline of lower lift arm 32*a* and a plane defined by longitudinal axis 78 and lateral axis 80) and facilitate lifting of platform assembly 16 (e.g., moving platform assembly 16 at least partially along upwards direction 46). Likewise, electric actuator 34*b* can be configured to retract to decrease angle 74*a* to facilitate lowering of platform assembly 16 (e.g., moving platform assembly 16 at least partially along downwards direction 48). Similarly, electric actuator 34*b* is configured to extend to increase angle 74*b* defined between centerlines of lower lift arm 32*a* and medial lift arm 32*b* and facilitate elevating of platform assembly 16. Similarly, electric actuator 34*b* is configured to retract to decrease angle 74*b* to facilitate lowering of platform assembly 16. Electric actuator 34*c* is similarly configured to extend/retract to increase/decrease angle 74*c*, respectively, to raise/lower platform assembly 16.

Electric actuators 34 can be mounted (e.g., rotatably coupled, pivotally coupled, etc.) to adjacent lift arms 32 at mounts 40 (e.g., mounting members, mounting portions, attachment members, attachment portions, etc.). Mounts 40 can be positioned at any position along a length of each lift arm 32. For example, mounts 40 can be positioned at a midpoint of each lift arm 32, and a lower end of each lift arm 32.

Intermediate lift arm 32*d* and frame 24 are configured to pivotally interface/couple at a platform rotator 30 (e.g., a rotary actuator, a rotational electric actuator, a gear box, etc.). Platform rotator 30 facilitates rotation of platform assembly 16 about axis 28 relative to intermediate lift arm 32*d*. In some embodiments, platform rotator 30 is between frame 24 and upper lift arm 32*c* and facilitates pivoting of platform assembly 16 relative to upper lift arm 32*c*. Axis 28 extends through a central pivot point of platform rotator 30. Intermediate lift arm 32*d* is also configured to extend/retract along upper lift arm 32*c*. Intermediate lift arm 32*d* can also be configured to pivotally/rotatably couple with upper lift arm 32*c* such that intermediate lift arm 32*d* pivots/rotates about axis 25. Intermediate lift arm 32*d* can be driven to rotate/pivot about axis 25 by extension and retraction of electric actuator 34*d*.

Platform assembly 16 is configured to be driven to pivot about axis 28 (e.g., rotate about axis 28 in either a clockwise or a counter-clockwise direction) by an electric motor 26 (e.g., a rotary electric actuator, a stepper motor, a platform rotator, a platform electric motor, an electric platform rotator motor, etc.). Electric motor 26 can be configured to drive frame 24 to pivot about axis 28 relative to upper lift arm 32*c* (or relative to intermediate lift arm 32*d*). Electric motor 26 can be configured to drive a gear train to pivot platform assembly 16 about axis 28.

Lift assembly 14 is configured to pivotally or rotatably couple with base assembly 12. Base assembly 12 include a rotatable base member, a rotatable platform member, a fully electric turntable, etc., shown as turntable 70. Lift assembly 14 is configured to rotatably/pivotally couple with base assembly 12. Turntable 70 is rotatably coupled with a base, frame, structural support member, carriage, etc., of base assembly 12, shown as base 36. Turntable 70 is configured to rotate or pivot relative to base 36. Turntable 70 can pivot/rotate about central axis 42 relative to base 36. Turntable 70 facilitates accessing various elevated and angularly offset locations at platform assembly 16. Turntable 70 is configured to be driven to rotate or pivot relative to base 36 by an electric motor, an electric turntable motor, an electric rotary actuator, etc., shown as turntable motor 44. Turntable motor 44 can be configured to drive a ring gear that is rotatably coupled with base 36 to produce relative rotation of turntable 70 relative to base 36. Lower lift arm 32*a* is pivotally coupled with turntable 70 (or with a turntable member 72 of turntable 70) such that lift assembly 14 and platform assembly 16 rotate as turntable 70 rotates about central axis 42. In some embodiments, turntable 70 is configured to rotate a complete 360 degrees about central axis 42 relative to base 36. In other embodiments, turntable 70 is configured to rotate an angular amount less than 360 degrees about central axis 42 relative to base 36 (e.g., 270 degrees, 120 degrees, etc.).

Base assembly 12 includes one or more energy storage devices (e.g., capacitors, batteries, Lithium-Ion batteries, Nickel Cadmium batteries, etc.), shown as batteries 64. Batteries 64 are configured to store energy in a form (e.g., in the form of chemical energy) that can be converted into electrical energy for the various electric motors and electric actuators of electric boom 10. Batteries 64 can be stored within base 36. Electric boom 10 includes a controller 38 configured to operate any of the electric motors, electric actuators, etc., of electric boom 10. Controller 38 can be configured to receive sensory input information from various sensors of electric boom 10, user inputs from HMI 20 (or any other user input device such as a key-start or a push-button start), etc. Controller 38 can be configured to generate control signals for the various electric motors, electric actuators, etc., of electric boom 10 to operate any of the electric motors, electric actuators, electrically powered movers, etc., of electric boom 10. Batteries 64 are configured to power any of the electrical motors, sensors, actuators, electric linear actuators, electrical devices, electrical movers, stepper motors, etc., of electric boom 10. Base assembly 12 can include a power circuit including any necessary transformers, resistors, transistors, thermistors, capacitors, etc., to provide appropriate power (e.g., electrical energy with appropriate current and/or appropriate voltage) to any of the electric motors, electric actuators, sensors, electrical devices, etc., of electric boom 10.

Batteries 64 are configured to deliver power to electric motors 52 to drive tractive elements 82. A rear set of tractive elements 82 can be configured to pivot to steer electric boom 10. In other embodiments, a front set of tractive elements 82 are configured to pivot to steer electric boom 10. In still other embodiments, both the front and the rear set of tractive elements 82 are configured to pivot (e.g., independently) to steer electric boom 10.

Base assembly 12 can include one or more laterally extending frame members (e.g., laterally extending structural members) and one or more longitudinally extending frame members (e.g., longitudinally extending structural members).

Base assembly 12 includes a steering system 150. Steering system 150 is configured to drive tractive elements 82 to pivot for a turn of electric boom 10. Steering system 150 can be configured to pivot tractive elements 82 in pairs (e.g., to pivot a front pair of tractive elements 82), or can be configured to pivot tractive elements 82 independently (e.g., four-wheel steering for tight-turns).

Base assembly 12 can include an HMI 21 (e.g., a user interface, a user input device, a display screen, etc.). In some embodiments, HMI 21 is coupled with base 36. In other embodiments, HMI 21 is positioned on turntable 70. HMI 21 can be positioned on any side or surface of base assembly 12 (e.g., on the front 62 of base 36, on the rear 60 of base 36, etc.)

Controller 38 can receive user inputs from HMI 21 and/or HMI 20 and operate any of electric motors 52, electric actuators 34, electric motor 26, turntable motor 44, and axle actuators 56 to operate electric boom 10. For example, controller 38 may receive a user input from HMI 21 or HMI 20 to elevate platform assembly 16 and may operate electric actuators 34 to raise or lower platform assembly 16. Likewise, controller 38 can receive a user input from HMI 21 or HMI 20 to rotate turntable 70 about axis 42 relative to base 36 and can operate turntable motor 44 to rotate turntable 70 based on the user input. Controller 38 can also receive a user input from HMI 21 or HMI 20 to drive or steer electric boom 10 and can operate electric motors 52 and electric actuator(s) to drive and steer tractive elements 82. Controller 38 operates any of electric motors 52, electric actuators 34, electric actuators 122, electric motor 26, and turntable motor 44 by generating control signals and providing the control signals to the various controllable elements to perform requested operations of electric boom 10.

Controller 38 can receive sensor inputs from sensors of electric boom 10. Sensors can include proximity sensors, distance sensors, position sensors, etc. Sensors can include any safety sensors that measure relative distance between electric boom 10 and objects. Sensors can include sensors that monitor an approximate elevation of lift assembly 14. In other embodiments, sensors can include temperature sensors configured to measure a temperature of batteries 64 to determine a condition of batteries 64. Controller 38 can also receive feedback from any of electric motors 52, electric actuators 34, electric motor 26, turntable motor 44, and axle actuators 56. In some embodiments, the feedback information includes voltage or current indicative of a position (e.g., linear position, degree of extension, angular position, etc.) of any of the controllable elements, a speed (e.g., a speed of extension, a speed of rotation, etc.) of any of the controllable elements, etc.

For example, the feedback received from turntable motor 44 can indicate a current angular position of turntable motor 44. Controller 38 can use any of the feedback from electric motors 52, electric actuators 34, electric motor 26, turntable motor 44, and axle actuators 56 to track, monitor, etc., angular or linear position of any of the controllable elements. In some embodiments, the feedback is received from a sensor associated with each of the controllable elements. For example, a position sensor can be mounted to each of electric actuators 34 to monitor a degree of extension or retraction of electric actuators 34. Controller 38 can use any of the feedback information to monitor operations of electric boom 10 and to generate control signals for the controllable elements.

Controller 38 can monitor whether any of the controllable elements of electric boom 10 are operating properly based on the feedback received from the controllable elements. For example, controller 38 may receive feedback from any of the controllable elements (e.g., linear electric actuators of lift assembly 14, turntable motor 44, platform rotator 30, etc.) and detect failure of any of the controllable elements based on the received feedback. In some embodiments, controller 38 notifies an operator regarding any failed controllable elements. For example, if controller 38 determines that electric actuator **34*a* is not operating properly, controller 38 can notify the operator by providing a message to the operator through HMI 20 and/or HMI 21**.

Controller 38 can also monitor sensory information measured by sensors to determine if any of the controllable elements are not operating properly. For example, if the sensory information from sensors indicates that a particular one of electric actuators (or any of the controllable elements) has not extended an expected amount, controller 38 can determine that the particular one of electric actuators is not operating properly. Controller 38 can provide a notification to the operator through HMI 20 and/or HMI 21 regarding any detected failures of the controllable elements (e.g., any of the electric motors, any of the electric actuators, etc.).

Electric boom 10 can also include one or more weight sensors configured to measure a load applied to platform assembly 16 (or forks, lifting apparatus, buckets, etc., if electric boom 10 is a telehandler). Controller 38 can receive sensor measurements from the weight sensors indicating the load applied to platform assembly 16. Controller 38 can generate control signals for any of the controllable elements (e.g., electric actuators, electric motors, electric rotary actuators, etc.) of electric boom 10 based on the load applied to platform assembly 16. For example, if the load applied to platform assembly 16 is greater than a threshold value, controller 38 can restrict operation of lift assembly 14.

Controller 38 can include a communications interface. The communication interface can facilitate communications between controller 38 and external systems, devices, sensors, etc. (e.g., sensors, HMI 20, HMI 21, electric motors 52, electric actuators 34, electric motor 26, turntable motor 44, axle actuators 56, etc.) for allowing user control, monitoring, and adjustment to any of the communicably connected devices, sensors, systems, primary movers, etc. The communications interface can also facilitate communications between controller 38 and HMI 21 and/or HMI 20 (e.g., a touch screen, a display screen, a personal computer, etc.) or with a network.

Controller 38 can includes a processing circuit. The processing circuit can include a processor and memory. The processing circuit can be communicably connected to the communications interface such that the processing circuit and the various components thereof can send and receive data via the communications interface. The processor can be implemented as a general purpose processor, an application specific integrated circuit (ASIC), one or more field programmable gate arrays (FPGAs), a group of processing components, or other suitable electronic processing components.

Memory (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory can be or include volatile memory or non-volatile memory. Memory can include database components, object code components, script components, or any other type of information structure for supporting the various activities and information structures described in the present application. According to some embodiments, memory is communicably connected to the processor via the processing circuit and includes computer code for executing (e.g., by the processing circuit and/or the processor) one or more processes described herein.

Electric motors 52, electric actuators 34, electric motor 26, turntable motor 44, and axle actuators 56 can receive electrical power from batteries 64 to perform any of their respective operations. Controller 38 can generate control signals for any of the controllable elements to perform their respective operation in response to receiving a user input from HMI 21 and/or HMI 20. When the controllable elements receive the control signals from controller 38, the controllable elements use the electrical power provided by batteries 64 to perform their respective operations.

Controller 38 can receive a user input from HMI 21 and/or HMI 20 to raise or lower platform assembly 16 and generates control signals to cause electric actuators 34 to raise or lower platform assembly 16 (e.g., to raise or lower platform assembly 16 the amount desired/input by the user/operator). Likewise, controller 38 can receive a user input from HMI 21 and/or HMI 20 to rotate turntable 70 and can generate control signals for turntable motor 44 to rotate turntable 70 (e.g., to rotate turntable 70 the desired amount as input by the user/operator).

Controller 38 can also generate and provide control signals to turntable brakes to restrict rotation of turntable 70. The turntable brake can receive electric power from batteries 64 and actuates between an activated state and a deactivated state to restrict and allow rotation of a ring gear, respectively. Controller 38 may operate turntable motor 44 in response to receiving a user input from HMI 20 and/or HMI 21. Controller 38 can receive feedback from turntable motor 44 indicating an angular position of turntable motor 44 or an angular speed of turntable motor 44. In some embodiments, controller 38 receives sensory information from a turntable sensor that indicates an angular position of turntable 70. In some embodiments, the user input received from HMI 20 and/or HMI 21 indicates a direction of rotation of turntable 70. Controller 38 generates control signals and provides the control signals to turntable motor 44 to operate turntable motor 44 to rotate turntable 70 in the desired direction of rotation.

Controller 38 can also provide control signals to an electric actuator to raise/lower the boom arm of lift assembly 14. The electric actuator can use electric power from batteries 64 to operate an electric motor. Controller 38 can operate the electric actuator to extend or retract by operating the electric motor to operate in a forwards direction or a backwards direction. Controller 38 can operate the electric motor to cause the electric actuator to extend in response to receiving a user input from HMI 20 and/or HMI 21 to raise platform assembly 16. Likewise, controller 38 can operate the electric motor to cause the electric actuator to retract in response to receiving a user input from HMI 20 and/or HMI 21 to lower platform assembly 16.

Controller 38 can also generate and provide control signals to electric motor 26 and/or brakes. Controller 38 can generate and provide the control signals to electric motor 26 to operate electric motor 26 in either direction, thereby pivoting platform assembly 16 about axis 28 in either direction. Controller 38 can operate electric motor 26 in response to receiving user inputs from HMI 20 and/or HMI 21. For example, an operator can provide controller 38 with a user input to pivot/rotate platform assembly 16 in a clockwise direction at HMI 20 and/or HMI 21 (e.g., by pressing a button, pulling a lever, moving a joy-stick, etc.). Controller 38 can operate electric motor 26 as long as the user input from HMI 20 and/or HMI 21 is received. In some embodiments, controller 38 can receive a user input from HMI 20 and/or HMI 21 to lock platform assembly 16 at a current angular position. Controller 38 can generate and provide control signals to the brakes to lock platform assembly 16 (e.g., to activate brake 26) at a current angular position in response to receiving the user input from HMI 20 and/or HMI 21. Likewise, controller 38 can receive a user input from HMI 20 and/or HMI 21 to de-activate the brakes. Controller 38 can generate and provide control signals to the brakes to transition the brakes into the de-activated state in response to receiving a user input from HMI 20 and/or HMI 21.

Figure 2:
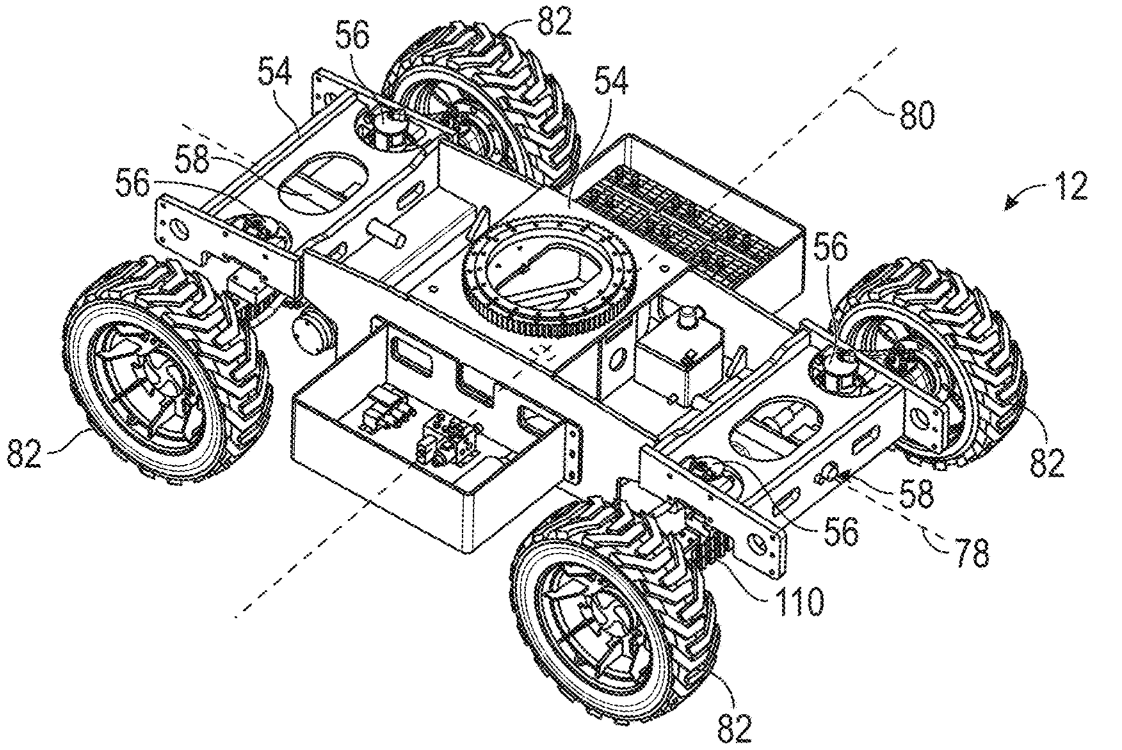
FIG. 2 is a perspective view of a portion of a base assembly of the fully electric boom of FIG. 1, according to an exemplary embodiment.
Figure 3:
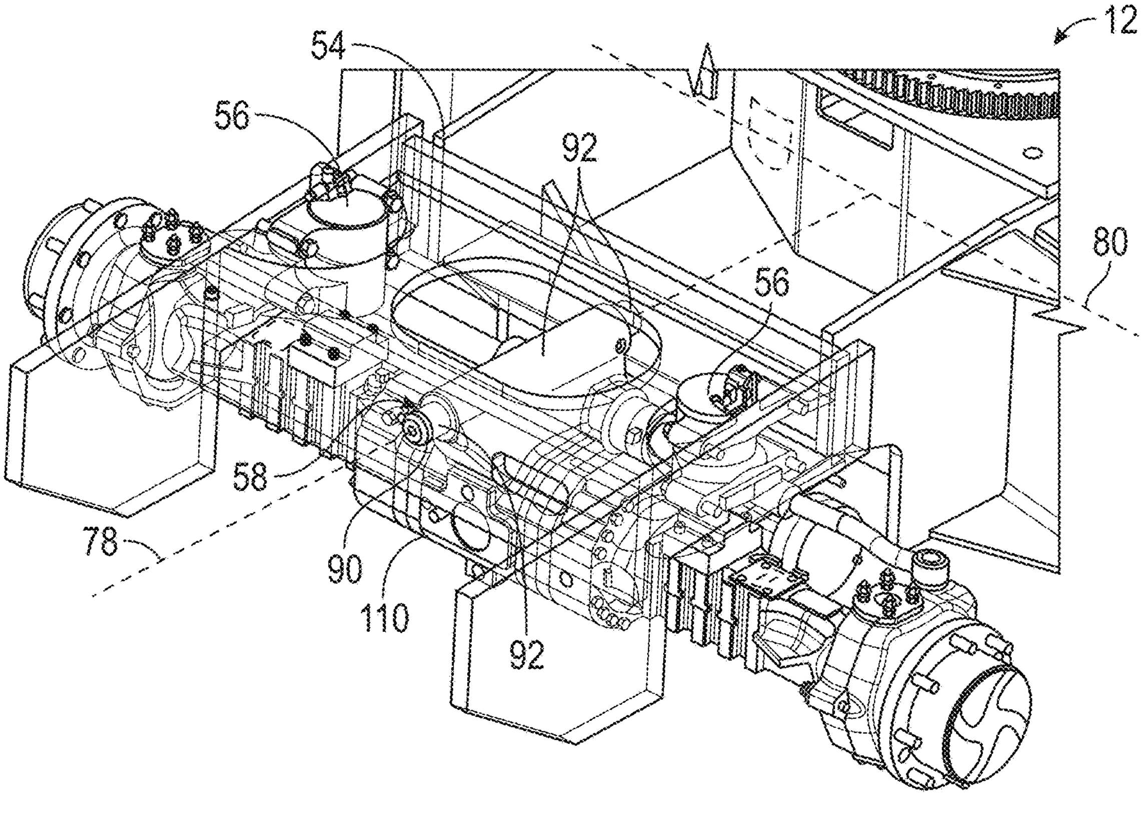
FIG. 3 is a perspective view of a portion of a base assembly of the fully electric boom of FIG. 1, according to an exemplary embodiment.

Referring now to FIGS. 2-3, base assembly 12 includes a longitudinally extending frame member 54 (e.g., a rigid member, a structural support member, an axle, a base, a frame, a carriage, etc.). Longitudinally extending frame member 54 provides structural support for turntable 70 as well as tractive elements 82. Longitudinally extending frame member 54 is pivotally coupled with lateral frame members 110 (e.g., axles, frame members, beams, bars, etc.) at opposite longitudinal ends of longitudinally extending frame member 54. For example, lateral frame members 110 may be pivotally coupled with longitudinally extending frame member 54 at a front end and a rear end of longitudinally extending frame member 54. Lateral frame members 110 can be configured to pivot about a pivot joint 58. Pivot joint 58 can include a pin and a receiving portion (e.g., a bore, an aperture, etc.). The pin of pivot joint 58 is coupled to one of lateral frame member 110 (e.g., a front lateral frame member 110 or a rear lateral frame member 110) or longitudinally extending frame member 54 and the receiving portion is coupled to the other of longitudinally extending frame member 54 and lateral frame member 110. For example, the pin may be coupled with longitudinally extending frame member 54 and the receiving portion can be coupled with one of lateral frame members 110 (e.g., integrally formed with the front lateral frame member 110).

In some embodiments, longitudinally extending frame member 54 and lateral frame members 110 are integrally formed or coupled (e.g., fastened, welded, riveted, etc.) to define base 36. In still other embodiments, base 36 is integrally formed with longitudinally extending frame member 54 and/or lateral frame members 110. In still other embodiments, base 36 is coupled with longitudinally extending frame member 54 and/or lateral frame members 110.

Base assembly 12 includes one or more axle actuators 56 (e.g., electric linear actuators, electric axle actuators, electric levelling actuators, etc.). Axle actuators 56 can be linear actuators configured to receive power from batteries 64. Axle actuators 56 can be configured to extend or retract to contact a top surface of a corresponding one of lateral frame members 110.

When axle actuators 56 extend, an end of a rod of electric levelling actuators can contact the surface of lateral frame member 110 and prevent relative rotation between lateral frame member 110 and longitudinally extending frame member 54. In this way, the relative rotation/pivoting between lateral frame member 110 and longitudinally extending frame member 54 can be locked (e.g., to prevent rolling of longitudinally extending frame member 54 relative to lateral frame members 110 during operation of lift assembly 14). Axle actuators 56 can receive power from batteries 64. Axle actuators 56 receive control signals from controller 38. Axle actuators 56 receive electrical power (e.g., to extend or retract) from batteries 64.

Control System

Figure 4:
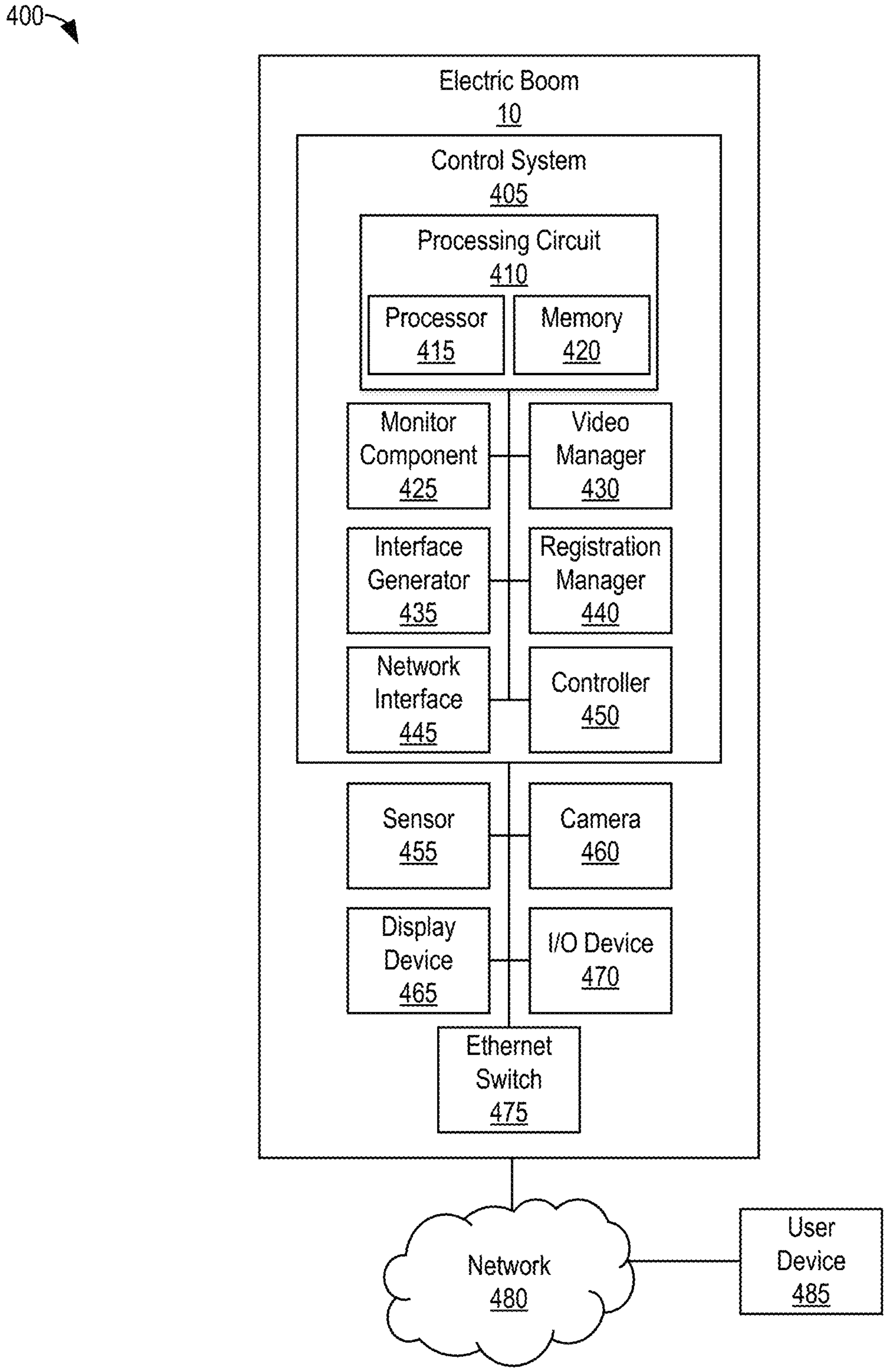
FIG. 4 is a block diagram of a system including the electric boom illustrated in FIG. 1 and a control system, according to an exemplary embodiment.

FIG. 4 depicts a block diagram of a system 400 including the electric boom illustrated in FIG. 1 and a control system, according to an exemplary embodiment. Each system and/or component of the system 400 can include one or more processors, memory, network interfaces, communication interfaces, and/or user interfaces. The memory can store programming logic that, when executed by the processor, controls the operation of the corresponding computing system or device. The memory can also store data in databases. The network interfaces can allow the systems and/or components of the system 400 to communicate wirelessly. The communication interfaces can include wired and/or wireless communication interfaces and the systems and/or components of the system 400 can be connected via the communication interfaces. The various components in the system 400 can be implemented via hardware (e.g., circuitry), software (e.g., executable code), or any combination thereof. Systems, devices, and components in FIG. 4 can be added, deleted, integrated, separated, and/or rearranged.

The system 400 can include the electric boom 10, at least one network 480, and at least one user device 485. The electric boom 10 and/or a component thereof can communicate, via the network 480, with the user device 485. The electric boom 10 can be at least one of the vehicles described herein. The electric boom 10 can include at least one control system 405, at least one sensor 455, at least one camera 460, at least one display device 465, at least one input/output (I/O) device 470, and at least one Ethernet Switch 475. The components of the electric boom 10 and/or the system 400 can be electrically coupled with one another. For example, the control system 405 can be electrically coupled with the sensor 455. The components of the electric boom 10 and/or the components of the system 400 can also communicate with, interact with, and/or otherwise interface with one another via a controller area network (CAN). For example, the control system 405 can communicate, via a CAN, with the display device 465.

The sensors 455 can be and/or include an accelerometer, a tachometer, a speedometer, a GPS device/sensor, a temperature sensor, a voltmeter, an ammeter, a radar sensor, a pressure sensor, a tactile sensor, a photodetector, a motion sensor, a proximity sensor, and/or among other possible sensors and/or devices. For example, the sensors 455 can be a tactile sensor. The sensors 455 can be and/or include any additional sensor and/or type of sensor described herein. The sensors 455 can also collect and/or otherwise provide information similar to that of any sensor described herein. The sensor 455 can provide operational data associated with the electric boom 10 to the control system 405. The operational data associated with the electric boom 10 can be and/or include at least one of a speed of the electric boom 10, an acceleration of the electric boom 10, a location of the electric boom 10, an operator input (e.g., an input provided by an operator of the electric boom 10), movement and/or actions performed and/or pertaining to the controllable elements of the electric boom 10 and/or an environmental condition of the electric boom 10. For example, the operational data can include information pertaining to operation of the turntable 70 (e.g., the turntable 70 rotated and/or otherwise moved).

The cameras 460 can be and/or include at least one of a video camera that captures video, a camera that captures images and/or among other possible optical instruments and/or optical devices that can capture, record, produce and/or otherwise provide video. The cameras 460 can also include audio devices. For example the cameras 460 can include at least one of a speaker, a microphone, a headphone, and/or among other possible audio and/or sound devices. The camera 460 can provide video data to the control system 405. The video data can be and/or include video feeds, images, recordings, audio files, audio signals, field of views, and/or any other possible information that can be captured, produced and/or otherwise provided by the cameras 460. The cameras 460 can be placed, located, situated, positioned, coupled and/or otherwise disposed on various components and/or locations on the electric boom 10. For example, a camera 460 can be disposed on the platform assembly 16.

The display devices 465 can be and/or include a screen, a monitor, a visual display device, a television, a video display, a liquid crystal display (LCD), a light emitting diode (LED) display, an infotainment system, a mobile device, and/or among other possible displays and/or devices. For example, the display device 465 can be an LCD. The display device 465 can generate, produce, provide and/or otherwise display a user interface. For example, the display device 465 can display a user interface that includes video feeds provided by the cameras 460.

The I/O device 470 can be and/or include a joystick, a button, a toggle switch, a handle, a lever, a steering wheel, a key, a keypad, a console, a mouse, a keyboard, a knob, a dial, a vehicle shifter, a smart phone, a computer, a wearable device, and/or among other possible I/O devices. For example, the I/O device 470 can be a joystick. An operator of the electric boom 10 can interact with, interface with and/or otherwise engage with the I/O device 470. For example, the operator can select a vehicle mode button on a joystick (e.g., the I/O device 470). The operating engaging with the I/O device 470 can result in the I/O device 470 communicating with the control system 405 and/or a component of the system 400.

The Ethernet switch 475 can be and/or include at least one of a network switch, a modem, a router, a switch and/or among any other possible device and/or component that connect components to one another over a network. For example, the Ethernet switch 475 can connect, over the network 480, the turntable 70 with the base assembly 12.

The network 480 can be and/or include a local area network (LAN), wide area network (WAN), telephone network (such as the Public Switched Telephone Network (PSTN)), wireless link, intranet, the Internet, a cellular network and/or combinations thereof. The user device 485 can be and/or include at least one of a mobile computing device, a desktop computer, a smartphone, a tablet, a smart watch, a smart sensor and/or any other device configured to facilitate providing, receiving, displaying and/or otherwise interacting with content (e.g., webpages, mobile applications, etc.).

An operator of the user device 485 can perform various actions and/or access various types of information. The information can be provided over the network 480 (e.g., the Internet, LAN, WAN, cellular, etc.). Similarly, the user device 485 can be perform similar functionality to that of the display device 465. The user device 485 can include an application to receive and display information and to receive user interactions with the content. For example, the application can be a web browser and/or a mobile application.

The control system 405 can include at least one processing circuit 410, at least one monitor component 425, at least one video manager 430, at least on interface generator 435, at least one registration manager 440, at least one network interface 445, and at least one controller 450. The control system 405 and/or a component thereof can be and/or include components that can be used to control various aspect of the electric boom 10. For example, the control system 405 can control movement of the electric boom 10.

The processing circuit 410 can include at least one processor 415 and memory 420. Memory 420 can be one or more devices (e.g., RAM, ROM, Flash memory, hard disk storage) for storing data and/or computer code for completing and/or facilitating the various processes described herein. For example, memory 420 can store instructions and the instructions can cause the processor 415 to perform functionality similar to that of the control system 405 and/or a component thereof. Memory 420 can be or include non-transient volatile memory, non-volatile memory, and non-transitory computer storage media. Memory 420 can include database components, object code components, script components, or any other type of information structure for supporting the various activities and information structures described herein. Memory 420 can be communicably coupled with the processor 415. Memory 420 can also be electrically coupled with the processor 415. Memory 420 can include computer code or instructions for executing one or more processes described herein. The processor 415 can be implemented as one or more application specific integrated circuits (ASICs), one or more field programmable gate arrays (FPGAs), a group of processing components, and/or other suitable electronic processing components.

The network interface 445 can be and/or include wired or wireless communications interfaces (e.g., jacks, antennas, transmitters, receivers, transceivers, wire terminals, etc.) for conducting data communications with sensors, devices, systems, etc., of electric boom 10 or other external systems or devices (e.g., the user device 485). The network interface 445 can be direct (e.g., local wired or wireless communications) or via a communications network (e.g., the network 480). For example, the network interface 445 can include an Ethernet card and port for sending and receiving data via an Ethernet-based communications link or network. The network interface 445 can also include a Wi-Fi transceiver for communicating via a wireless communications network (e.g., the network 480). The network interface 445 can include a power line communications interface. The network interface 445 can include an Ethernet interface, a USB interface, a serial communications interface, and/or a parallel communications interface. The network interface 445 can interface with, interact with and/or otherwise communicate with at least one of the user device 485, the sensors 455, the camera 460, the display device 465, the I/O device 470, the Ethernet switch 475, and/or any other possible component of the electric boom 10.

The controller 450 can control various controllable elements described herein pertaining to the electric boom 10. The controller 450 can be and/or include the controller 38. The controller 450 can receive a request to move and/or otherwise control a controllable element of the electric boom 10. For example, the controller 450 can receive the request responsive to the operator of the electric boom 10 selecting an icon displayed on a user interface. The controller 450 can, responsive to receiving the request, provide control signals to the controllable element associated with the request. For example, the request can be a request to rotate the turntable 70 and the controller 450 can send control signals to the turntable motor 44 causing the turntable motor 44 to rotate the turntable 70.

The monitor component 425 can determine at least one of a position, an orientation, a movement and/or any other possible action performed and/or taken by the electric boom 10. For example, the monitor component 425 can determine that the turntable 70 has rotated with respect to the base assembly 12. The monitor component 425 can receive, from the sensors 455, a set of data pertaining to an operation of the electric boom 10. For example, the monitor component 425 can receive a set of data pertaining to the turntable 70 rotating. The set of data provided by the sensors 455 can be and/or include information generated by the controllable elements of the electric boom 10. For example, the set of data can include information indicating a position, a placement and/or a degree of extension or retraction of any of the controllable elements described herein. For example, the set of data can indicate a position of the turntable motor 44.

The monitor component 425 can, using the set of data, determine a position of a first component on the electric boom 10 with respect to a second component on the electric boom 10. For example, the monitor component 425 can determine a position of the turntable 70 (e.g., the first component) with respect to the base assembly 12 (e.g., the second component). For example, the monitor component 425 can determine that the turntable 70 is placed 90 degrees (e.g., the position of the first component) from the base assembly 12. The position of the first component with respect to the second component can be the same and/or different. For example, the position of the first component can be the same as a position of the second component (e.g., the first component and the second component are aligned). As another example, the position of the first component with respect to the second component can be based on an axis that runs through the first component and an axis that runs through the second component (e.g., an angular difference between the axis of the first component with respect to the axis of the second component). The position of the first component with respect to the second component can be used to determine a quadrant and/or sector (on a coordinate grid) that the first component and/or the second component are located in. For example, the monitor component 425 can determine that the first component is located in the first quadrant and that the second component is located in the third quadrant.

The monitor component 425 can also determine, using the set of data pertaining to the operation of the electric boom 10, a first orientation of a first portion of the first component and a first orientation of a second portion of the first component. For example, the monitor component 425 can determine that the portion of the turntable 70 coupled with the platform assembly 16 (e.g., the first portion) has a first orientation and that the portion (e.g., the second portion) of the turntable 70 near the rear of the electric boom 10 has a second orientation. The first orientation and/or the second orientation can be and/or include at least one of a placement of the portion in space (e.g., an area that is occupied by the portion and the location of said area with respect to the electric boom 10), an elevation (e.g., the platform assembly 16 is raised with respect to base assembly 12), a configuration of the portion (e.g., how the portion is situated with respect to other components of the electric boom 10).

The monitor component 425 can also determine, using the set of data pertaining to the operation of the electric boom 10, a first orientation of a first portion of the second component and a first orientation of a second portion of the second component. The first orientation and the second orientation of the second component can be and/or include similar characteristics to that of the first orientation and the second orientation of the first component. For example, the first orientation of the second component can indicate that the chassis (e.g., the frame 54) is offset from the turntable 70. To continue this example, the first component and the second component can both have a neutral orientation. The neutral orientation can be and/or include at least one of a natural placement (e.g., where components rest while the electric boom 10 is inactive), a placement of the components with respect to a set point (e.g., a central axis of the electric boom 10), and/or a user-defined placement.

The neutral orientation of the first component and the neutral orientation of the second component can be used to determine the first orientation and the second orientation of the first component and/or the second component. For example, the orientation of the first component and/or the second component can be considered unchanged when the orientations align with the neutral orientations. Additionally, the orientations of the first component and/or the second component can be relative to their respective neutral orientations.

The monitor component 425 can, responsive to determining the first orientation and the second orientation for the first component, establish a position of the first component with respect to an axis. The axis can be the central axis described herein and the axis can run, while the first component and the second component are in their respective neutral orientations, through the first portion and the second portion of both the first component and the second component. The position of the first component with respect to the axis can be based on an angular different between the first component and the axis. For example, the position of the first component with respect to the axis can be determined responsive to determining a difference between a central point on the first component and the axis.

The monitor component 425 can, using the first orientation of the first portion of the second component and the first orientation of the second portion of the second component, establish a position of the second component with respect to the axis. For example, the monitor component 425 can determine a position of the base assembly 12 with respect to the axis.

The monitor component 425 can provide, to the video manager 430, the position of the first component with respect to the second component. For example, the monitor component 425 can provide, to the video manager 430, a signal that indicates that the first component is the second quadrant and that the second component is in the first quadrant. The video manager 430 can receive, from the monitor component 425, the position of the first component with respect to the second component.

The video manager 430 can, using a number of rules, determine a first set of cameras 460 from the cameras 460 that are associated with the position of the first component. The number of rules can be located in memory 420. The number of rules can be and/or include at least one of logic tables, truth tables, k-maps, Boolean expressions, and/or among other possible rules. For example, the number of rules can be a logic table and the logic table can include which cameras are associated with different sectors. To continue this example, the number of rules can include that if the base assembly 12 is in the first sector and if the turntable 70 is also in the first sector that a first set of cameras 460 of the cameras 460 are associated with that positioning of the first component (e.g., the turntable 70) with respect to the second component (e.g., the base assembly 12).

The video manager 430 can, responsive to determining which cameras 460 are associated with the position of the first component, retrieve, access and/or otherwise obtain video feeds and/or other data produced by the cameras 460 associated with the position of the first component. The video manager 430 can, responsive to retrieving the data produced by the cameras 460, communicate with the interface generator 435. The video manager 430 can provide, to the interface generator 435, the data produced by the cameras 460. Additionally, the video manager 430 can provide a signal, to the interface generator 435, including a data stream that is generated by the cameras 460 (e.g., a live video feed). The video manager 430 can also provide at least one of the position of the first component with respect to the second component, a quadrant including the first component and/or a quadrant including the second component.

The interface generator 435 can receive, from the video manager 430, the position of the first component with respect to the second component and the video feed pertaining to the first set of cameras 460. The interface generator 435 can generate a user interface and/or otherwise generate information that can be used to generate a user interface. For example, the interface generator 435 can provide signals to a display device (e.g., the display device 465) that causes the display device to display a user interface that includes information generated by the interface generator 435.

The interface generator 435 can include the position of the first component with respect to the second component and the video feed of the first set of cameras 460 in the signals that are provided to the display device. The interface generator 435 can, responsive to generating the user interface, communicate with the network interface 445. For example, the interface generator 435 can provide, to the network interface 445, the user interface and/or the signals associated with the user interface. The network interface 445 can, responsive to communicating with the interface generator 435, provide the user interface and/or the signals corresponding to the user to the display device 465. The display device 465 can, responsive to receiving the user interface, produce, provide, and/or otherwise display the user interface that was generated by the interface generator 435.

The monitor component 425 can, responsive to a second operation of the electric boom 10, receive a second set of data pertaining to the second operation of the electric boom 10. The monitor component 425 can receive the second set of data from the sensors 455. The monitor component 425 can, using the second set of data pertaining to the second operation of the electric boom 10, determine a function associated with the second operation of the electric boom 10. The function associated with the second operation of the electric boom 10 can be and/or include at least one of the electric boom 10 moving forward (e.g., driving forward), the electric boom 10 moving backwards (e.g., driving in reverse), the turntable 70 swinging (e.g., rotating), the platform assembly 16 being raised, the platform assembly 16 being lowered, and/or among other possible operations and/or combinations of operations.

The monitor component 425 can, responsive to determining the function associated with the second operation of the electric boom 10, communicate with the video manager 430. The monitor component 425 can provide, to the video manager 430, the function associated with the second operation of the electric boom 10. The video manager 430 can, responsive to receiving the function associated with the second operation of the electric boom 10, determine a second set of cameras 460 from the cameras 460 associated with the function. The video manager 430 can determine the second set of cameras 460 using the number of rules. For example, the number of rules can include logic tables that indicate that when the first component is in the first quadrant, when the second component is in the second quadrant, and when the base assembly 12 is being raised that given cameras 460 of the cameras 460 should be used. The video manager 430 can retrieve, access, and/or otherwise obtain video feeds and/or other data produced by the second set of cameras 460.

The video manager 430 can, responsive to determining the second set of cameras 460, communicate with the interface generator 435. The video manager 430 can provide, to the interface generator 435, the data produced by the second set of cameras 460. The video manager 430 can also provide the function associated with the second operation of the electric boom 10. Additionally, the video manager 430 can provide a signal, to the interface generator 435, including a data stream that is generated by the second set of cameras 460 (e.g., a live video feed, a field of view, etc.). The video manager 430 can also provide an orientation, a position, a configuration and/or among other possible component information that can change responsive to the second operation of the electric boom 10.

The interface generator 435 can receive, from the video manager 430, the data pertaining to second set of cameras 460. The interface generator 435 can generate a user interface, update the user interface previously generated by the interface generator 435 and/or otherwise generate information that can be used to generate a user interface. The user interface can replace at least one video feed provided by the first set of cameras 460 with at least one video feed provided by the second set of cameras 460. The interface generator 435 can provide signals to the display device 465 that causes the display device 465 to display a user interface including the at least one video feed of the second set of cameras 460.

The registration manager 440 can add, adjust, delete, modify and/or otherwise configure the cameras 460. For example, the registration manager 440 can update the number of cameras 460 to include a new camera 460 responsive to the new camera 460 being added to the electric boom 10. The registration manager 440 can associated the cameras 460 with a position on the electric boom 10. For example, the registration manager 440 can associate a first camera 460 with being positioned on center portion of a counterweight of the turntable 70.

The registration manager 440 can detect, responsive to receiving a request to initiate a registration process from a number of cameras 460, the number of cameras 460. For example, the registration manager 440 can detect the request responsive to an operator of the electric boom 10 and/or the user device 485 selecting an icon on a user interface. The selection of the icon can result in the registration manager 440 detecting the number of cameras 460. For example, the registration manager 440 can scan, explore, search, and/or otherwise survey the network 480 to detect the number of cameras 460. Additionally, the registration manager 440 can detect the number of cameras 460 responsive to the number of cameras being coupled with the electric boom 10 via the Ethernet switch 475.

The registration manager 440 can determine, using information pertaining to the number of cameras 460, that a camera 460 of the number of cameras 460 was previously absent from the network 480. For example, the registration manager 440 can include a database of all configured cameras 460 that connected to the network 480 and the registration manager 440 can determine the camera 460 is not in the database. To continue this example, the registration manager 440 can determine that the camera 460 was previously absent from the network.

The registration manager 440 can, responsive to determining that the camera 460 was previously absent from the network, generate an identifier for the camera 460 for use in the network 480. The identifier can be and/or include at least one of an IP address, a numeric string, an alphanumeric string and/or among other possible strings of data that can uniquely identify the camera 460 within the network 480. The registration manager 440 can, responsive to generating the identifier for the camera 460, retrieve a video feed pertaining to the camera 460. The registration manager 440 can provide the video feed to the interface generator 435.

The interface generator 435 can, responsive to receiving the video feed, generate a user interface including the video feed. The user interface can also include additional information pertaining to the camera 460. For example, the user interface can include selectable portions that can be used to indicate placement of the camera 460 on the electric boom 10. The interface generator 435 can provide signals to the display device 465 that causes the display device 465 to display the user interface including the video feed of the camera 460.

The registration manager 440 can detect, responsive to an interaction with the user interface, an indication identifying the position of the camera 460. For example, the registration manager 440 can detect an operator of the display device 465 selecting an icon that pertains to the location of the camera 460. The icon could display a certain position on the electric boom 10 and/or other receive a user input identifying the certain on the electric boom 10. The registration manager 440 can, responsive to identifying the position of the camera 460, associate with the camera 460 with at least one component of the electric boom 10. For example, the indication can include that the camera 460 is disposed on the platform assembly 16.

The registration manager 440 can, responsive to associating the camera 460 with the at least one component of the electric boom 10, update a record to reflect that the camera 460 is associated with the at least one component of the electric boom 10. For example, the registration manager 440 can update a data file that includes information pertaining to the cameras 460 to include information pertaining to the new camera 460. The registration manager 440 can, using the record, identify a second camera 460 that is associated with the at least one component of the electric boom 10. For example, the record can indicate the second camera 460 is disposed on the turntable 70 and the camera 460 can also be disposed on the turntable 70.

The registration manager 440 can, responsive to identifying the second camera 460 that is also associated with the at least one component of the electric boom 10, retrieve data and/or a video feed generated by the camera 460 and the second camera 460. The registration manager 440 can provide the video feed to the interface generator 435. The interface generator 435 can, responsive to receiving the video feed, generate a user interface including the video feed of the camera 460 and the second camera 460. The registration manager 440 can determine, responsive to an interaction with the user interface, a relative position of the camera 460 with respect to the second camera 460. For example, the interaction can specify that the camera 460 is position on the rear of the base assembly 12 and the second camera 460 is positioned on the front of the base assembly 12.

Figure 5:
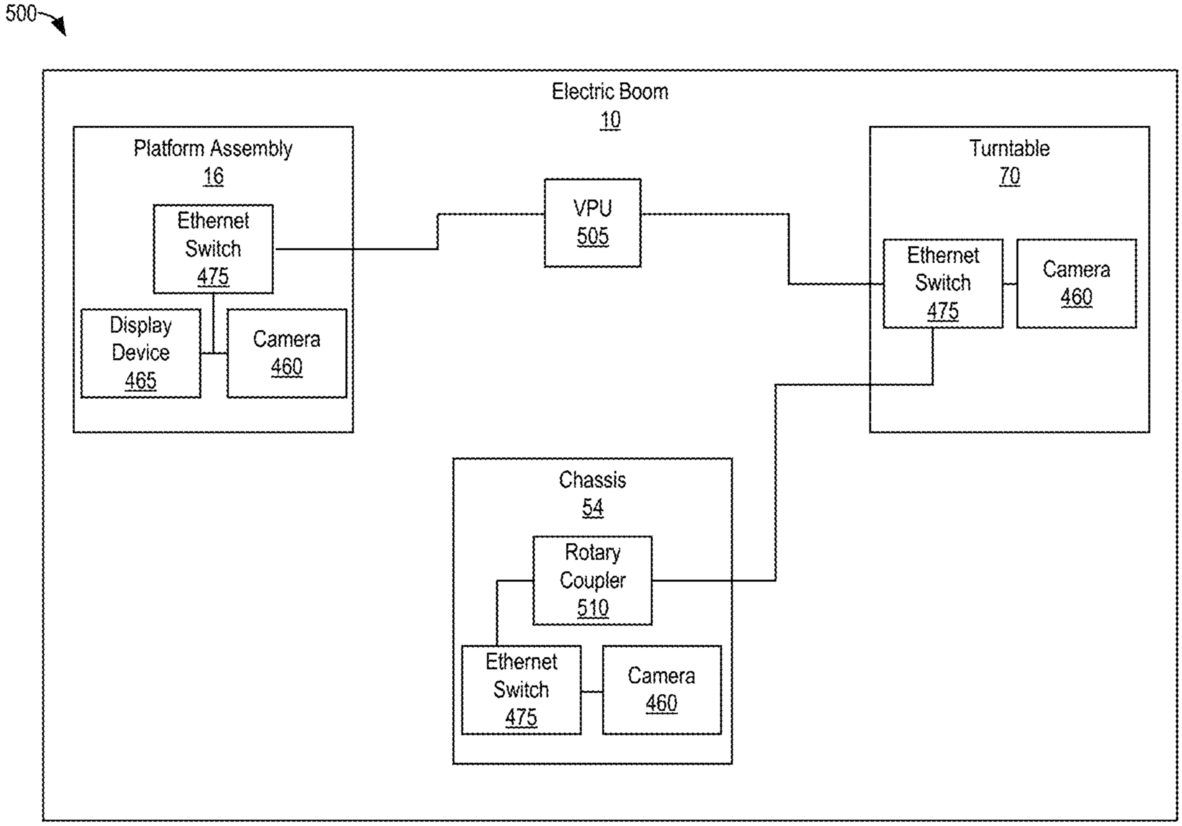
FIG. 5 is a block diagram of components included in the electric boom illustrated in FIG. 1, according to an exemplary embodiment.

FIG. 5 depicts a block diagram of a system 500 including components of the electric boom 10, according to an exemplary embodiment. The system 500 can include components that are connected via a network (e.g., the network 480). The lines connecting the components to one another can be wired connections (e.g., an Ethernet cable that is electrically coupling the components to one another) and/or a wireless connections. The system 500 can include the electric boom 10. The electric boom 10 can include the platform assembly 16, the turntable 70, the chassis 54 (e.g., the frame 54), and at least one video processing unit (VPU) 505. While FIG. 5 depicts the VPU 505 as being separate from the additional components of the electric boom 10, the VPU 505 can included in at least one component of the electric boom 10. For example, the VPU 505 can be included in the display device 465. The VPU 505 can be and/or include at least one a graphical processing unit (GPU), a tensor processing unit (TPU), a neural processing unit (NPU), and/or among other possible processing devices and/or components. The VPU 505 can perform object detection. For example, the VPU 505 can detect that an object is near the electric boom 10.

The display device 465 and the cameras 460 of the platform assembly 16 are shown to be connected with the additional components of the electric boom via the Ethernet switch 475. Similarly, the cameras 460 of the turntable 70 are shown to also be connected with the additional components of the electric boom via the Ethernet switch 475. Additionally, the chassis 54 is shown to include a rotary coupler 510 that is connected to the additional components of the electric boom 10 and that the cameras 460 of the chassis 54 are connected with the rotary coupler 510 via the Ethernet switch 475.

Figure 6:
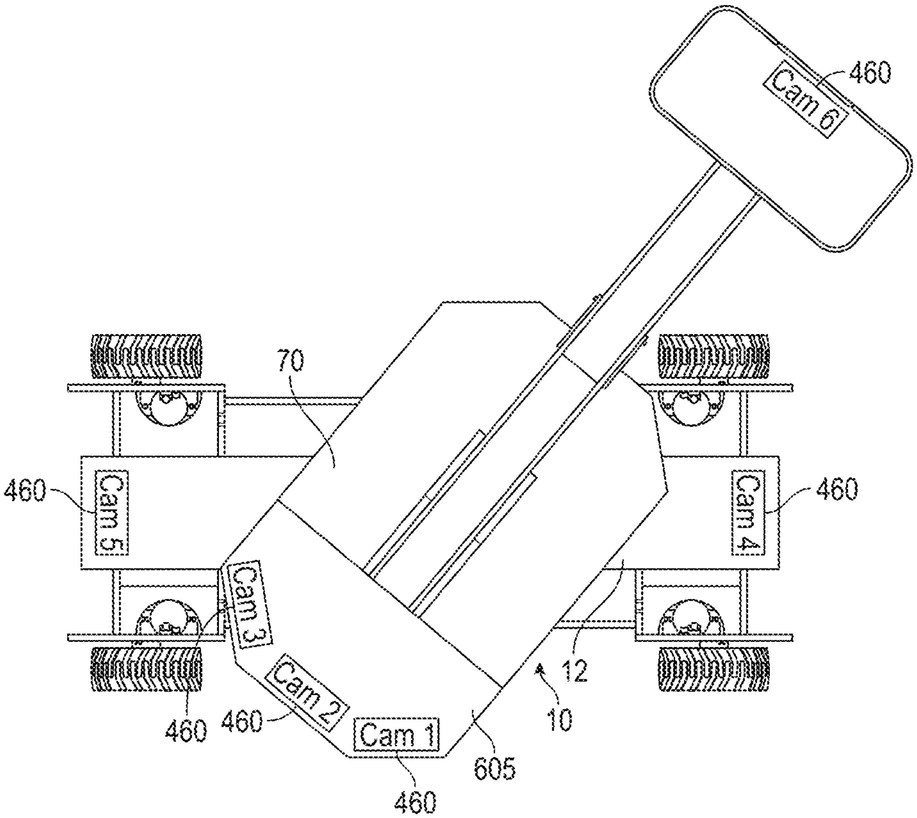
FIG. 6 is an aerial view of the electric boom illustrated in FIG. 1, according to an exemplary embodiment.

FIG. 6 is an aerial view of the electric boom 10, according to an exemplary embodiment. FIG. 6 depicts an example of the turntable 70 having been rotated, and an example of the turntable 70 in a position relative to the base assembly 12. FIG. 6 depicts a counterweight 605 of the turntable 70 including cameras 460 (e.g., CAM 1, CAM 2, and CAM 3), the base assembly 12 including cameras 460 (e.g., CAM 4, and CAM 5), and the platform assembly 16 including cameras 460 (e.g., CAM 6). While FIG. 6 depicts the components including a certain number of cameras 460 the components can include any possible number of cameras 460.

The placement of the cameras 460, on their respective components of the electric boom 10, provide different fields of view and/or otherwise produce video feeds that captures different areas around the electric boom 10 based on the orientation of the components of the electric boom 10. For example, CAM 1, as illustrated in FIG. 6, can produce a video feed that can capture a different area around the electric boom 10 with respect to a video feed produced by CAM 5. As another example, CAM 1 can produce a field of view that can capture a difference area around the electric boom 10 with respect to a field of view produced by the CAM 5.

As described herein, the video manager 430 can use a number of rules to determine video feeds that can be used and/or included in user interfaces. Table 1 provides an example of the number of rules being a logic table. Table 1 is produced below:

TABLE 1

| Quadrant Logic Table | | |
|---|---|---|
| A | B | Quadrant |
| 0 | 0 | 1 |
| 0 | 1 | 2 |
| 1 | 0 | 3 |
| 1 | 1 | 4 |

Table 1 depicts an example logic table that can be used to determine a position, with respect to a quadrant, of a component of the electric boom 10. For example, the turntable 70 can include a sensor and the sensor can produce a two bit signal that can be used to identify the quadrant of the turntable 70. For example, as the turntable 70 rotates the two bit signal can be incremented and/or otherwise changed to reflect the rotation of the turntable 70. Table 1 shows that the component of the electric boom 10 can be in quadrant 1 when the two bit signal equals 0, that the component of the electric boom 10 can be in quadrant 2 when the two bit signal equals 1, component of the electric boom 10 can be in quadrant 3 when the two bit signal equals 2, and that the component of the electric boom 10 can be in quadrant 4 when the two bit signal equals 3. The logic depicted in table 1 can be used by the control system 403 to perform any of the functionality described herein.

Table 2 depicts another logic table that can be used to determine the position of the first component and the second component of the electric boom 10. While tables 2 includes the components as the turntable and the base assembly, the components used in the table 2 can be any possible components of the electric boom 10. Table 2 is produced below:

TABLE 2

| Base Assembly Logic | | Turntable Logic | | Turntable Quadrant | Base Assembly Quadrant | Camera Zone Activated |
|---|---|---|---|---|---|---|
| 0 | 0 | 0 | 0 | 1 | 1 | 0 |
| 0 | 0 | 0 | 1 | 2 | 1 | 1 |
| 0 | 0 | 1 | 0 | 3 | 1 | 2 |
| 0 | 0 | 1 | 1 | 4 | 1 | 3 |
| 0 | 1 | 0 | 0 | 1 | 2 | 4 |
| 0 | 1 | 0 | 1 | 2 | 2 | 5 |
| 0 | 1 | 1 | 0 | 3 | 2 | 6 |
| 0 | 1 | 1 | 1 | 4 | 2 | 7 |
| 1 | 0 | 0 | 0 | 1 | 3 | 8 |
| 1 | 0 | 0 | 1 | 2 | 3 | 9 |
| 1 | 0 | 1 | 0 | 3 | 3 | 10 |
| 1 | 0 | 1 | 1 | 4 | 3 | 11 |
| 1 | 1 | 0 | 0 | 1 | 4 | 12 |
| 1 | 1 | 0 | 1 | 2 | 4 | 13 |
| 1 | 1 | 1 | 0 | 3 | 4 | 14 |
| 1 | 1 | 1 | 1 | 4 | 4 | 15 |

Table 2 depicts the logic table including logic pertaining to the turntable 70, the base assembly 12, and that the logic can be used to determine a quadrant for the turntable 70, determine a quadrant for the base assembly 12, and determine a camera zone. The logic depicted in table 2 can be used by the control system 403 to perform any of the functionality described herein.

Table 3 depicts an example of the number of rules identifying which cameras correspond to which zones. Table 3 is produced below:

TABLE 3

| Camera Zone | Cameras in Zone |
|---|---|
| 0 | 1, 2, 3, 6 |
| 1 | 1, 4, 5, 6 |
| 2 | 1, 2, 3, 6 |
| 3 | 1, 2, 3, 4, 6 |
| 4 | 1, 2, 3, 4, 5, 6 |
| 5 | 1, 2, 3, 6 |
| 6 | 1, 2, 3, 5, 6 |
| 7 | 1, 2, 4, 5, 6 |
| 8 | 1, 3, 5, 6 |
| 9 | 1, 2, 3, 4, 5, 6 |
| 10 | 1, 2, 3, 6 |
| 11 | 1, 2, 3, 4, 6 |
| 12 | 1, 2, 3, 4, 5, 6 |
| 13 | 1, 3, 5, 6 |
| 14 | 1, 2, 3, 4, 5, 6 |
| 15 | 1, 2, 3, 6 |

The video manager 430 can use the information included in the table 3 to determine which cameras 460 of the cameras 460 pertain to different camera zones. As shown above in table 2, the camera zones can be determined using the information in table 2 and once the camera zones are determined, the corresponding cameras can be identified. While table 3 includes given zones including given cameras, the camera zones can include any possible combinations of cameras including some zones having extra cameras and/or some zones having less cameras in relation to the number of cameras depicted in a given zone of table 3.

Figure 7:
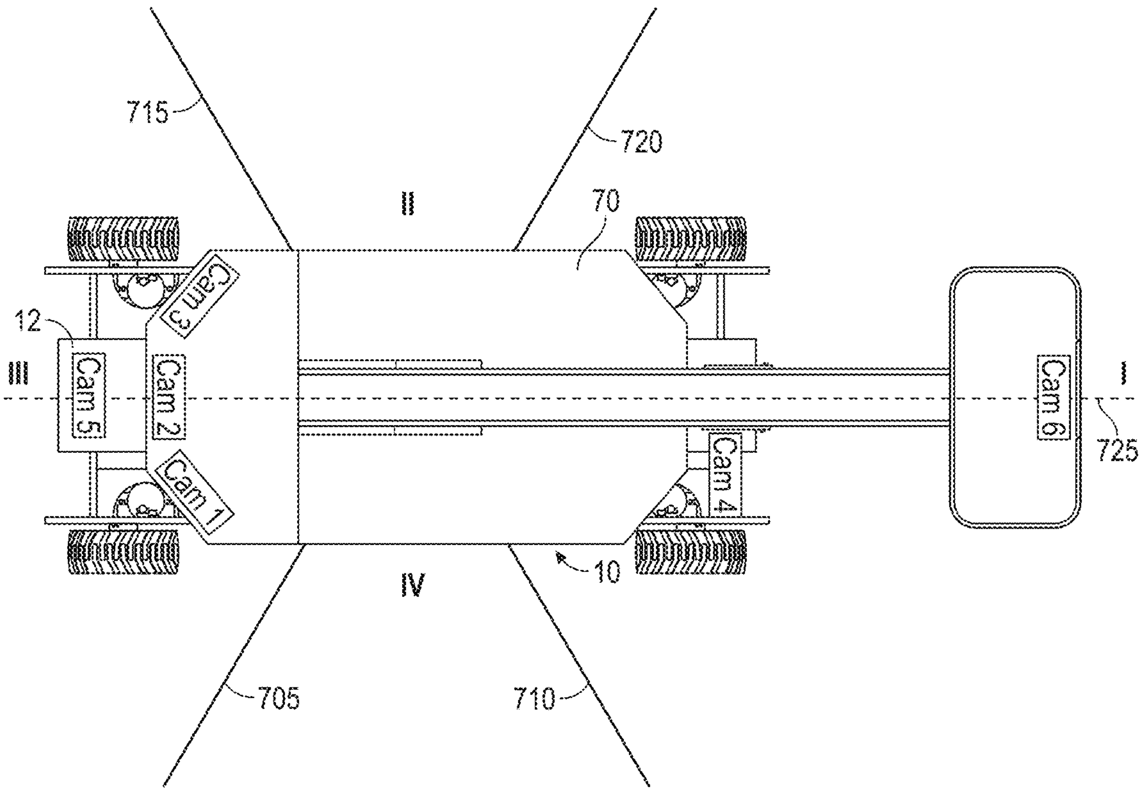
FIG. 7 is an aerial view of the electric boom illustrated in FIG. 1, according to an exemplary embodiment.

FIG. 7 is an aerial view of the electric boom 10, according to an exemplary embodiment. As described herein, the electric boom 10 and/or the components thereof can have and/or include a neutral orientation. FIG. 7 depicts an example of the turntable 70 and the base assembly 12 in their respective neutral orientations. FIG. 7 also depicts an axis 725 that runs through the center of the turntable 70 and the base assembly 12. The axis 725 can be the central axis described herein. FIG. 7 also depicts an example of the electric boom 10 located on a coordinate grid and/or system include quadrants 1,2,3,4. The quadrants can be the quadrants and/or sectors described herein. Lines 710 and 720 define quadrant 1, lines 720 and 715 define quadrant 2, lines 715 and 705 define quadrant 3, and lines 705 and 710 define quadrant 4. While FIG. 7 depicts quadrants 1 and 3 as being larger than quadrants 2 and 4, the relative size of one quadrant with respect to another quadrant can be and/or include any possible combination. For example, the 4 quadrants can be the same size.

FIG. 7 also depicts an example of the turntable 70 and the base assembly being located in the first quadrant. However, any possible configuration and/or orientation of the coordinate grid can be possible. For example, the location of the base assembly 12 and the turntable 70, as described above, is based on the position of a frontward portion of the turntable 70 and/or the base assembly 12. The location of the base assembly 12 and/or the turntable 70 can be based on the position of any portion of the turntable 70 and/or the base assembly 12. For example, a rearward portion of the turntable 70 can be used to determine the position of the turntable 70 with respect to the coordinate grid.

Figure 8:
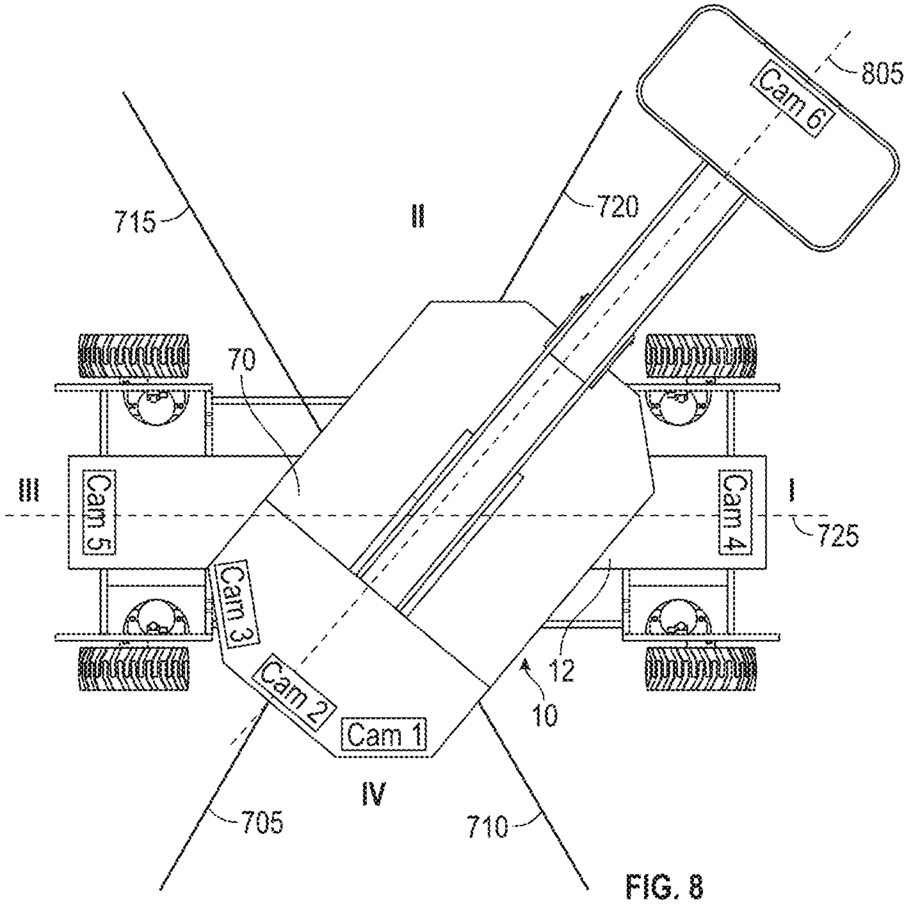
FIG. 8 is an aerial view of the electric boom illustrated in FIG. 1, according to an exemplary embodiment.

FIG. 8 is an aerial view of the electric boom 10, according to an exemplary embodiment. FIG. 8 depicts an example of the turntable 70 having been rotated from its neutral orientation and an example of the base assembly 12 in it neutral configuration. As described herein the positioning of the turntable 70 (e.g., the first component) with respect to the base assembly 12 (e.g., the second component) can determine which video feeds that are produced by the cameras 460 are displayed in a user interface. For example, the layout of the electric boom 10 and/or the components of thereof, as illustrated in FIG. 8, can be used by the control system 405.

FIG. 8 depicts an example of the turntable 70 having been rotated from quadrant 1 to quadrant 2. The turntable 70 being positioned in quadrant 2 and the base assembly 12 being positioned in quadrant 1 can be used by the control system 405 to determine which video feeds to display in a user interface. For example, the axis 725 is shown to be running through the base assembly 12 and an axis 805 is shown to be running through the turntable 70. An angle between the axis 725 and the axis 805 can be used to determine the position (e.g., which quadrant) of the turntable 70 relative to the base assembly 12.

Figure 9:
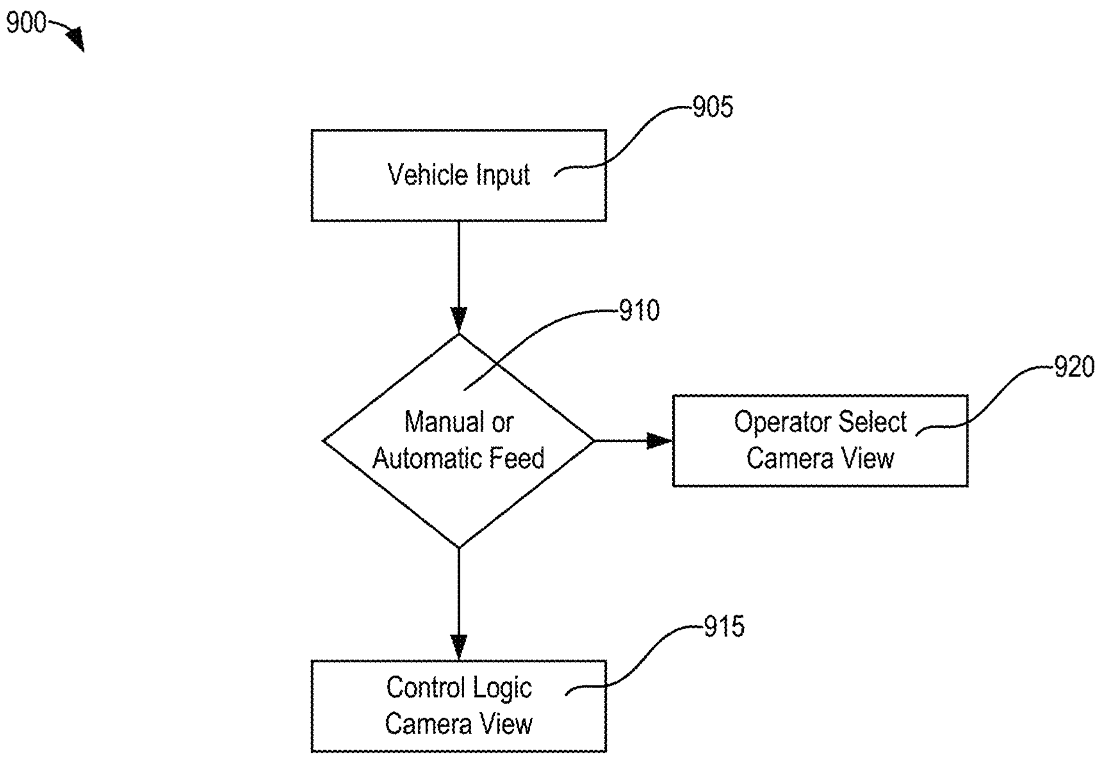
FIG. 9 is a flow chart illustrating a method of using control logic, according to an exemplary embodiment.

FIG. 9 depicts a flow chart illustrating a method 900 of using control logic to determine video feeds, according to an exemplary embodiment. The method 900 can be performed by the control system 403 and/or a component thereof. For example, the video manager 430 can perform at least one step of the method 900. The method 900 can begin at step 905. Step 905 can include receiving a vehicle input. The vehicle input can be at least one of an operator of the electric boom 10 interacting with the I/O device 470, an operator of the user device 485 selecting an icon included on a user interface, and/or an operator of the display device 465 selecting an icon included on a user interface. For example, the vehicle input can be an operator interacting with a joystick of the electric boom 10 (e.g., the I/O device 470). The interaction can be the operator using the joystick to move, control, and/or otherwise perform an operation using the electric boom 10.

The method 900 can continue to step 910. Step 910 can be a decision step (e.g., the video manager 430 can make a decision and the decision can dictate the next step in the method 900). The video manager 430 can, at step 910, determine whether an option has been selected for the control system 403 to produce automatic video feeds and/or whether an operator of the electric boom 10 has selected an option to manual select the video feed. The method 900 can move on to step 915 responsive to the video manager 430 determining that the option to produce automatic video feeds has been selected. The method 900 can move to step 920 responsive to the video manager determining that the option to manual select the video feed has been step.

Step 915 can include the video manager 430 receiving information pertaining to the position of the electric boom 10 and/or a component thereof (e.g., the first component and the second component, receiving information pertaining to a function that was performed responsive to the vehicle input received at step 905, and/or any other possible information described herein. The video manager 430 can use the number of rules to determine which quadrant the components of the electric boom 10 are in. The video manager 430 can, responsive to determining the quadrants, determine the cameras 460 to retrieve video feeds from. Step 915 can also include the video manager 430 sending control signals to the interface generator 435 and the interface generator 435 can send signals to the display device 465 causing the display device 465 to display a user interface including the video feeds produced by the cameras 460 that were determined at step 915.

Step 920 can include the video manager 430 communicating with the interface generator 435 and the interface generator 435 sending signals to the display device 465 causing the display device 465 to display a user interface including options for the operator to interact with to then manual select cameras.

Figure 10:
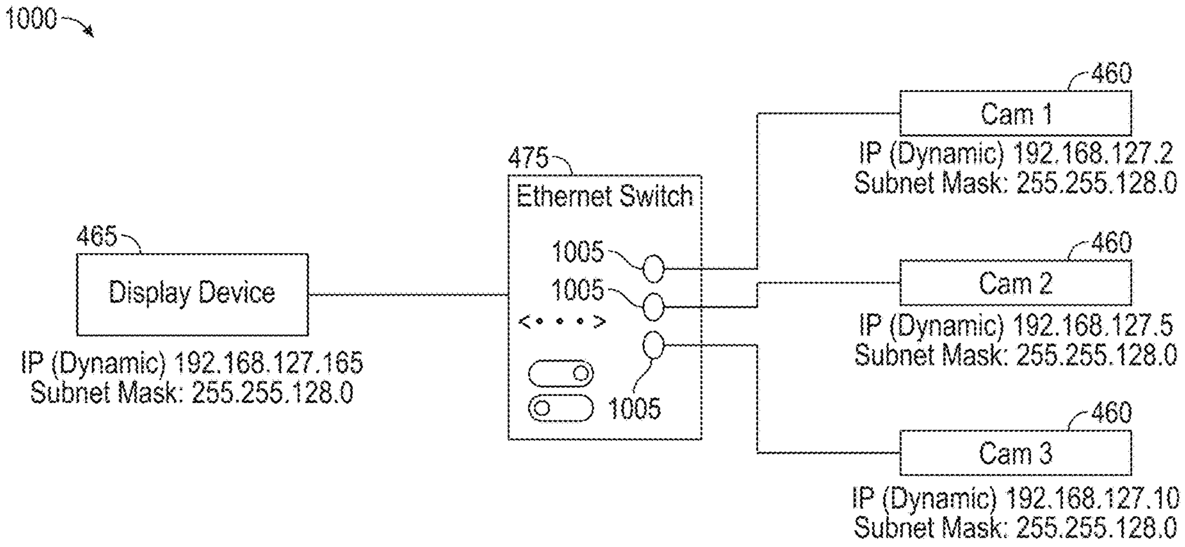
FIG. 10 is a block diagram illustrating components, according to an exemplary embodiment.

FIG. 10 is a block diagram of a system 1000 including components of the electric boom 10, according to an exemplary embodiment. FIG. 10 depicts an example of how the display device 465 can be connected and/or otherwise in communication with the cameras 460. FIG. 10 shows that the display device 465 is connected with the Ethernet switch 475. The display device being connected with the Ethernet switch 475 can result in the display device 465 being included in the network 480.

The Ethernet switch 475 can include at least one port 1005. The ports 1005 can connect components of the electric boom 10 with the Ethernet switch 475 and then also connect the components with the network 480. FIG. 10 depicts Cam 1, Cam 2, and Cam 3 (e.g., a number of cameras 460) connected with, via the ports 1005, the Ethernet switch 475. The Ethernet switch 475 can connect the display device 465 with the number of cameras 460. The display device 465 and the number of cameras 460 can include individual IP addresses and a subnet mask. The individual IP addresses can be the IP addresses generated during the registration process described herein.

Figure 11:
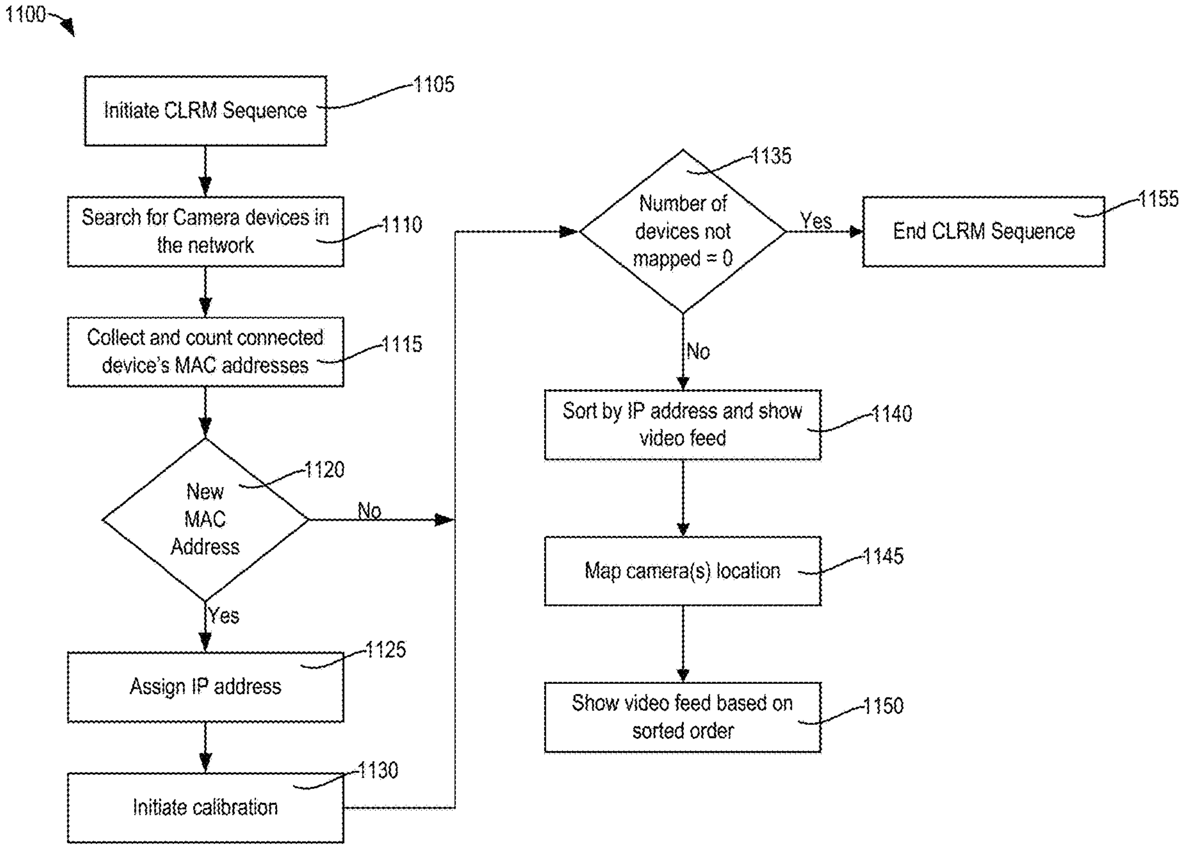
FIG. 11 is a flow chart illustrating a method of locating cameras disposed on the fully electric boom illustrated in FIG. 1, according to an exemplary embodiment.

FIG. 11 is a flow chart of a method 1100 of registering cameras with a network, according to an exemplary embodiment. The method 1100 can be and/or include the registration process described herein. The control system 403 and/or a component thereof can perform at least one step included in the method 1100. For example, the registration manager 440 can perform at least one step of the method 1100.

The method 1100 can begin at step 1105. Step 1105 can include initiated a camera location registration method (CLRM) sequence. The CLRM sequence can be initiated responsive to an operator of the electric boom 10 and/or the user device 485 selecting an icon and/or an option displayed on a user interface. The operator can select the option responsive to a camera 460 being added to the electric boom 10. For example, the camera 460 can be disposed on the electric boom 10 and prior to using the camera 460 the can 460 can be configured and/or otherwise registered.

The method 1100 can continue to step 1110. Step 1110 can include searching for cameras 460 that included and/or otherwise connected to the network 480. The method 1100 can continue to step 1115, responsive to searching for the cameras 460. Step 1115 can include collecting and counting the MAC addresses from the cameras 460. The method 1100 can continue to step 1120, responsive to the accumulating the information pertaining to the cameras 460.

Step 1120 can be a decision step (e.g., the registration manager 440 can make a decision). Step 1120 can include the registration manager 440 determining whether any of the MAC addresses collected in step 1115 are new (e.g., a camera 460 was previously absent from the network 480). The method 1100 can continue to step 1125 responsive to the registration manager 440 determining that at least one MAC address is new. The method 1100 can continue to step 1135 responsive to the registration manager 440 determining that none of the MAC addresses are new.

Step 1125 can include the registration manager 440 assign an IP address to the camera 460 corresponding to the MAC address that was determined to be new in step 1120. Step 1125 can be repeated for each additional camera 460 that included a MAC address that was determined to be new in step 1120. The method 1100 can continue to step 1130.

Step 1130 can include the registration manager 440 calibrating the cameras 460 that had IP addresses assigned to them in step 1125. The calibration can be and/or include downloading software, running a diagnostic test, and/or any possible actions that can be taken to link the cameras 460 with the network 480. The method 1100 can continue to step 1135.

Step 1135 can be a decision step (e.g., the registration manager 440 can make a decision). Step 1135 can include the registration manager 440 determining whether the number of devices (e.g., cameras) not mapped is equal to 0. As mentioned above, step 1135 can be reached after step 1120 and/or after step 1130. The registration manager 440 uses step 1135 to then determine which cameras 460 to map. The method 1100 can continue to step 1140 responsive to the registration manager 440 determining that the number of devices not mapped is not equal to 0 (e.g., at least one camera 460 has not been mapped yet). The method 1100 can continue to step 1155 responsive to the registration manager 440 determining that the number of devices not mapped is equal to 0.

Step 1140 can include the registration manager 440 sorting the cameras 460, that have not been mapped yet, by IP address and the interface generator 435 can cause the display device 465 to display a user interface including the video feeds for at least one of the cameras 460. The method 1100 can continue to step 1145.

Step 1145 can include mapping the camera locations. For example, the operator of the electric boom 10 can select icons displayed on the user interface to identify locations pertaining to the cameras (e.g., the cameras can be mapped). The locations pertaining to the cameras can be and/or include where the cameras are disposed and/or otherwise placed on the electric boom 10. The method 1100 can continue to step 1150.

Step 1150 can include displaying the video feeds of the cameras in a sort order. The sorted order can be based on the sorted order of the IP addresses that was performed in step 1140. Step 1155 can end and/or otherwise conclude the CLRM sequence and/or the registration process described herein.

Figure 12:
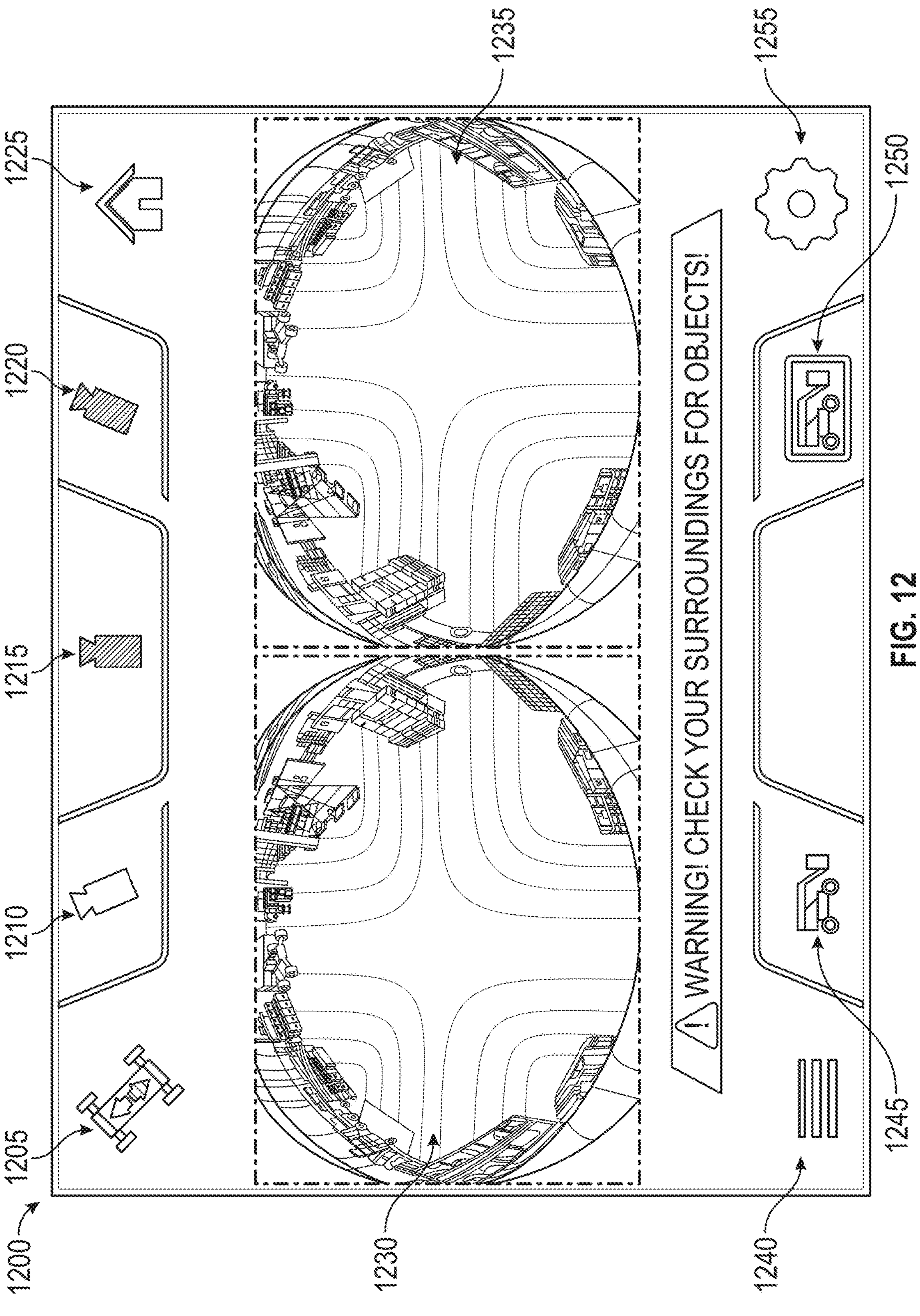
FIG. 12 is a user interface generated by a control system included in the system of FIG. 4, according to an exemplary embodiment.

FIG. 12 depicts a user interface 1200, according to an exemplary embodiment. The user interface 1200 can be provided, produced, generated and/or otherwise displayed by the display device 465 and/or the user device 485. The user interface 1200 can be generated by the interface generator 435 and the interface generator 435 can provide signals to the display device 465 and/or the user device 485 causing the display device 465 and/or the user device 485 to display the user interface 1200.

The user interface 1200 can include at least one icon (e.g., icons 1205, 1210, 1215, 1220, 1225, 1240, 1245, 1250, and 1255), and at least one video feed (e.g., video feeds 1230 and 1235). The operator of the device displaying the user interface 1200 can select, interact with and/or otherwise engage with at least one of the icons. The icon 1205 can provide a visual representation of the orientation of the chassis 54. The icon 1205 can be generated using information determined by the control system 403. For example, the monitor component 425 can determine the orientation of the chassis 54 and the monitor component 425 can provide an indication of the orientation of the chassis 54 to the interface generator 435. The icon 1205 depicts an example of the chassis 54 in an offset and/or rotated orientation.

The icons 1210, 1215, and 1220 can represent and/or otherwise identify given cameras 460 that are providing the video feeds 1230 and 1235. The icons 1215 and 1220 are shown to be a different color than that of icon 1210. The color difference can indicate which cameras 460 are producing the video feeds 1230 and 1235. The icon 1225 can be selected to reach a home page and/or among other possible pages and/or user interfaces. The icon 1240 can be selected to open and/or otherwise produce a drop down menu and/or a window. The icons 1245 and 1250 can be selected to produce and/or otherwise provide a list of options that can be performed by the highlighted component of the electric boom 10. FIG. 12 shows the icon 1245 to be associated with the chassis 54 of the electric boom and shows the icon 1250 to be associated with the turntable 70, the lift assembly 14, and/or the platform assembly 16. The icon 1255 can be selected to open and/or otherwise produce a settings window. For example, the icon 1255 can be selected and an option to turn on manual selection of video feeds can then be displayed on the user interface 1200. The video feeds 1230 and 1235 are shown to be producing images captured by the cameras 460 indicated by icons 1215 and 1220. The video feeds 1230 and 1235 can be and/or include the video feeds described herein. The user interface 1200 can also include, produce, provide, and/or otherwise display any information described herein.

Figure 13:
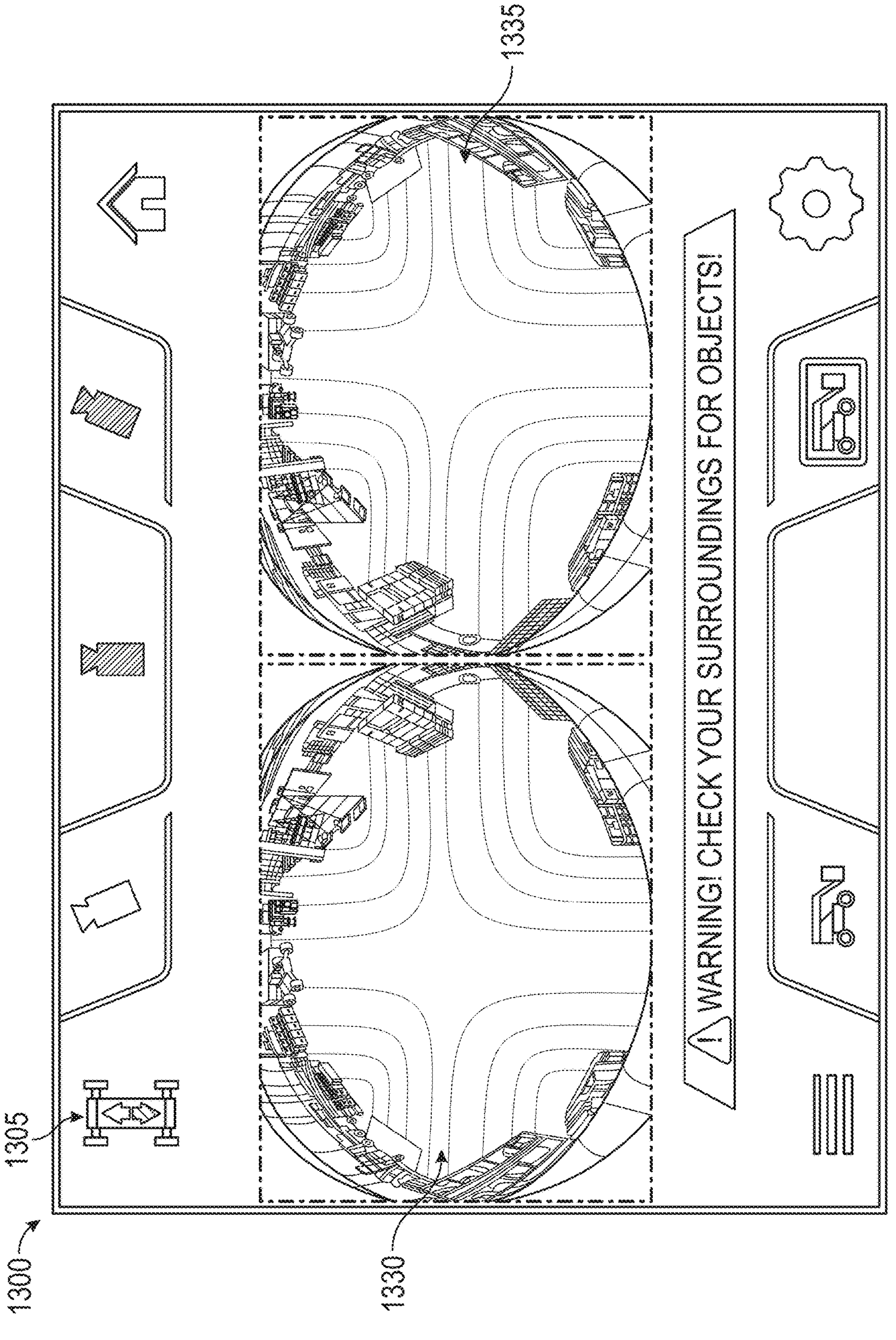
FIG. 13 is a user interface generated by the control system included in the system of FIG. 4, according to an exemplary embodiment.

FIG. 13 depicts a user interface 1300, according to an exemplary embodiment. The user interface 1300 can be provided, produced, generated and/or otherwise displayed by the display device 465 and/or the user device 485. The user interface 1300 can be generated by the interface generator 435 and the interface generator 435 can provide signals to the display device 465 and/or the user device 485 causing the display device 465 and/or the user device 485 to display the user interface 1300. The user interface 1300 can be an updated user interface with respect to the user interface 1200 (e.g., the user interface 1200 was updated to display the information shown in FIG. 13). The user interface 1300 can also be generated responsive to an operation of the electric boom 10.

The user interface 1300 can include at least one icon 1305, at least one video feed 1330, and at least on video feed 1335. The icon 1305 can provide a visual representation of the orientation of the chassis 54. The icon 1305 can be generated using information determined by the control system 403. For example, the monitor component 425 can determine the orientation of the chassis 54 and the monitor component 425 can provide an indication of the orientation of the chassis 54 to the interface generator 435. The icon 1305 can also be an updated version of the icon 1205 and the icon 1305 can be generated responsive to the orientation of the chassis 54 changing (e.g., the chassis 54 was moved). The icon 1305 depicts an example of the chassis 54 in an inline orientation. The video feeds 1330 and 1335 can include images captured by the cameras 460 associated with the orientation of the chassis 54.

Figure 14:
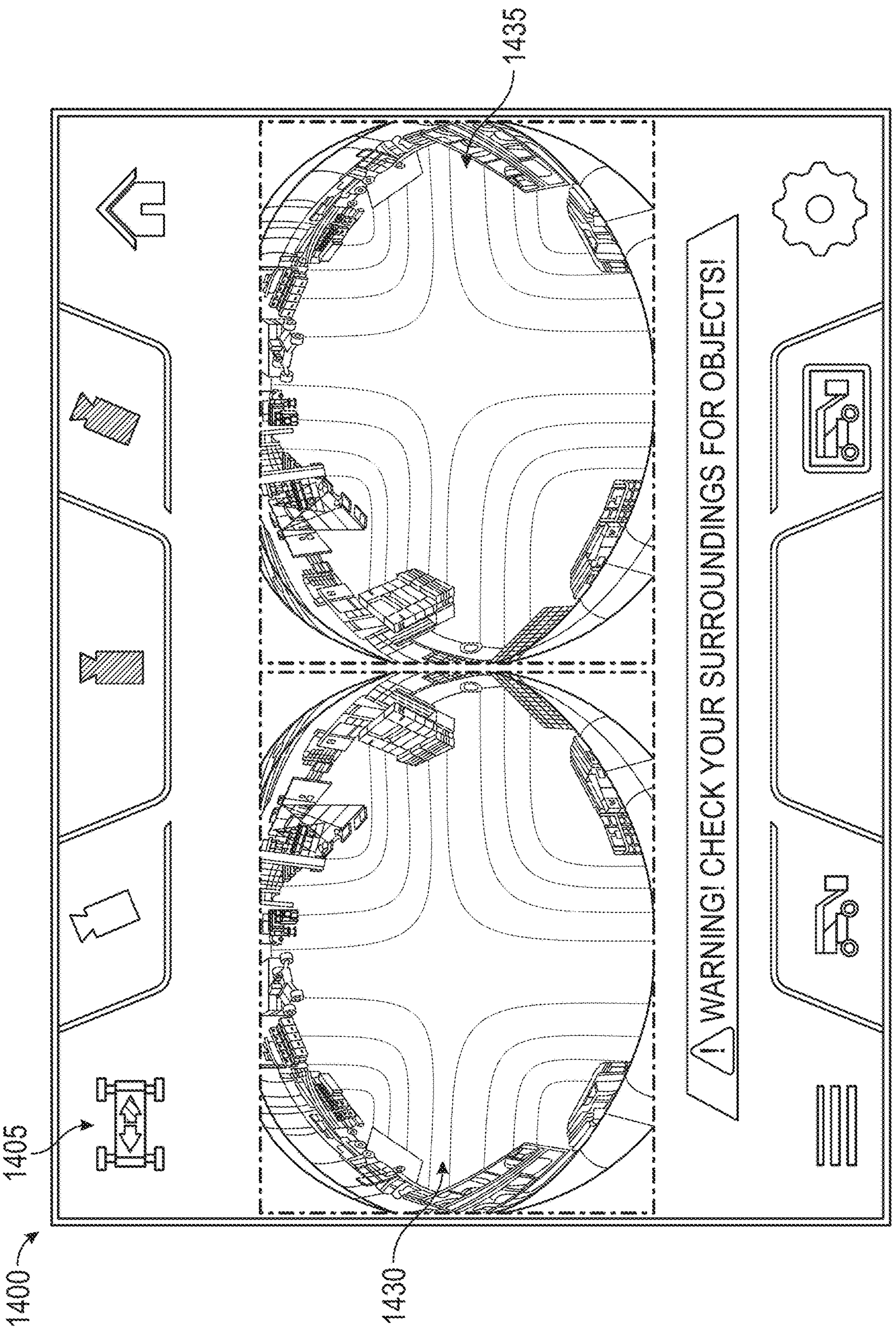
FIG. 14 is a user interface generated by a control system included in the system of FIG. 4, according to an exemplary embodiment.

FIG. 14 depicts a user interface 1400, according to an exemplary embodiment. The user interface 1400 can be provided, produced, generated and/or otherwise displayed by the display device 465 and/or the user device 485. The user interface 1400 can be generated by the interface generator 435 and the interface generator 435 can provide signals to the display device 465 and/or the user device 485 causing the display device 465 and/or the user device 485 to display the user interface 1400. The user interface 1400 can be an updated user interface with respect to the user interface 1200 (e.g., the user interface 1200 was updated to display the information shown in FIG. 14) and/or the user interface 1300 (e.g., the user interface 1300 was updated to display the information shown in FIG. 14). The user interface 1400 can also be generated responsive to an operation of the electric boom 10.

The user interface 1400 can include at least one icon 1405, at least one video feed 1430, and at least on video feed 1435. The icon 1405 can provide a visual representation of the orientation of the chassis 54. The icon 1405 can be generated using information determined by the control system 403. For example, the monitor component 425 can determine the orientation of the chassis 54 and the monitor component 425 can provide an indication of the orientation of the chassis 54 to the interface generator 435. The icon 1405 can also be an updated version of the icon 1205 and/or icon 1305. The icon 1405 can be generated responsive to the orientation of the chassis 54 changing (e.g., the chassis 54 was moved). The icon 1405 depicts an example of the chassis 54 in an orthogonal orientation. The video feeds 1430 and 1435 can include images captured by the cameras 460 associated with the orientation of the chassis 54.

Figure 15:
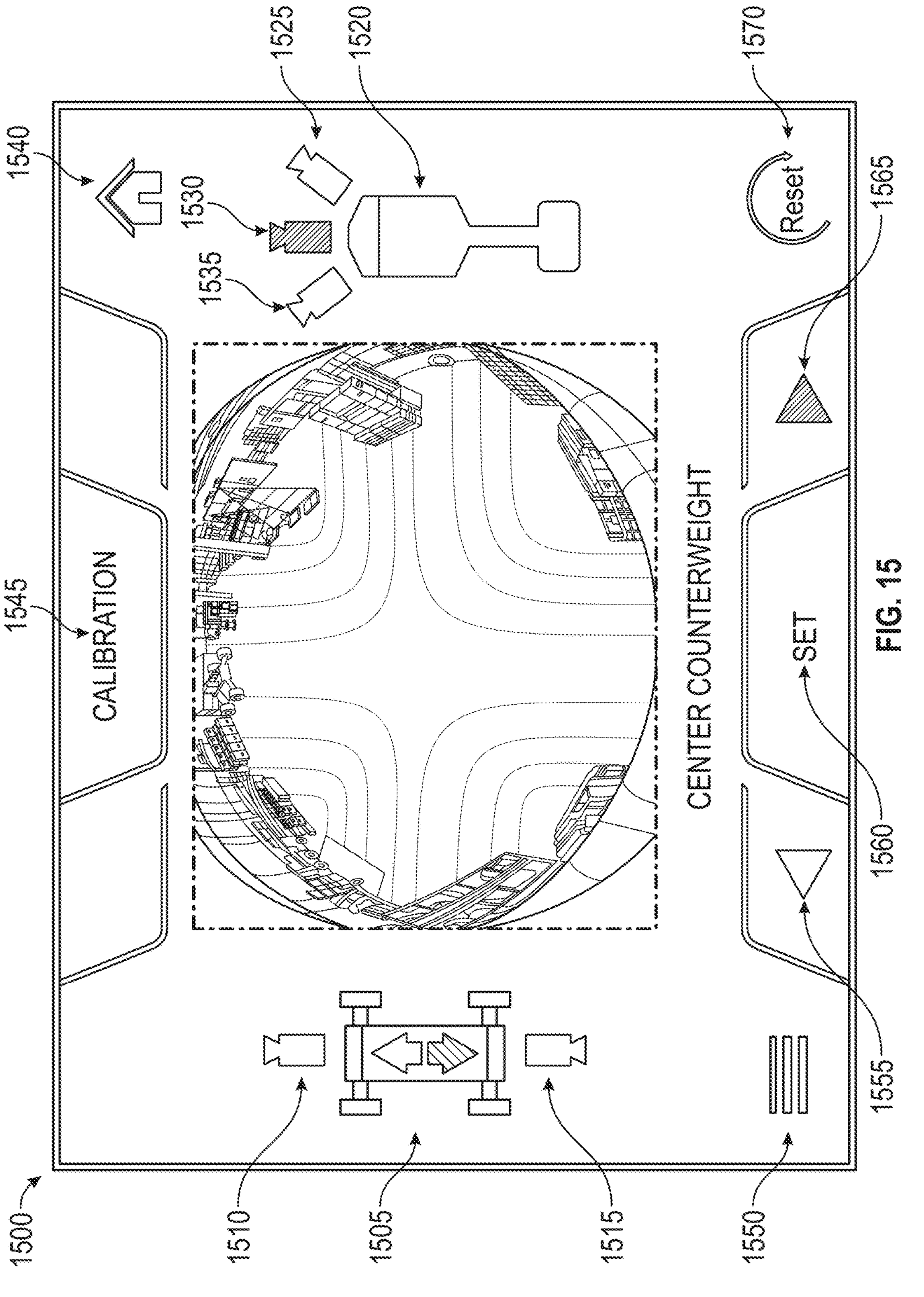
FIG. 15 is a user interface generated by a control system included in the system of FIG. 4, according to an exemplary embodiment.

FIG. 15 depicts a user interface 1500, according to an exemplary embodiment. The user interface 1500 can be provided, produced, generated and/or otherwise displayed by the display device 465 and/or the user device 485. The user interface 1500 can be generated by the interface generator 435 and the interface generator 435 can provide signals to the display device 465 and/or the user device 485 causing the display device 465 and/or the user device 485 to display the user interface 1500. The user interface 1500 can be the user interface described herein with respect to the CLRM sequence of the method 1100 and/or the registration process described herein.

The user interface 1500 can a plurality icons (e.g., icons 1505, 1510, 1515, 1520, 1525, 1530, 1540, 1545, 1550, 1555, 1560, 1565, and 1570). The operator of the device displaying the user interface 1500 can select, interact with and/or otherwise engage with at least one of the icons. The icon 1505 can provide and/or otherwise depict a visual representation of the chassis 54. The icon 1505 can also depict a visual representation of any other element and/or component included in the electric boom 10. The icon 1505 is shown to be associated with icons 1510 and 1515. The icons 1510 and 1515 are associated with cameras 460 that are disposed on respective portions of the chassis 54. The icon 1510 indicates a camera 460 that is disposed on a frontward portion of the chassis 54 and the icon 1515 indicates a camera 460 that is disposed on a rearward portion of the chassis 54.

The icon 1520 can provide and/or otherwise depict a visual representation of the turntable 70. The icon 1520 can also depict a visual representation of any other element and/or component included in the electric boom 10. The icon 1520 is shown to be associated with icons 1525, 1530, and 1535. The icons 1525, 1530, and 1535 are associated with cameras 460 that are disposed on respective portions of counterweight 605 of the turntable 70. The icon 1525 indicates a camera 460 that is disposed on a right portion of the counterweight 605. The icon 1530 indicates a camera 460 that is disposed on a center portion of the counterweight 605. The icon 1535 indicates a camera 460 that is disposed on a left portion of the counterweight 605. The icon 1535 is shown to be highlighted and/or otherwise selected. The icon 1535 being selected indicates that the video feed shown in FIG. 15 is associated with the camera 460 that is indicated by the icon 1530.

The icon 1540 can be selected to reach a home page and/or among other possible pages and/or user interfaces. The icon 1545 can provide an indication that the electric boom 10 is a calibration mode. The icon 1550 can be selected to open and/or otherwise produce a drop down menu and/or a window. The icon 1555 can be selected to switch the video feed to a previously shown video feed. The icon 1560 can be selected to set and/or otherwise map the camera 460 whose video feed is displayed in the user interface 1500 with the icon that indicates said camera. The icon 1565 can be selected to switch the video feed to a video that is yet to have been shown. The icon 1570 can be selected to reset the calibration process.

Figure 16:
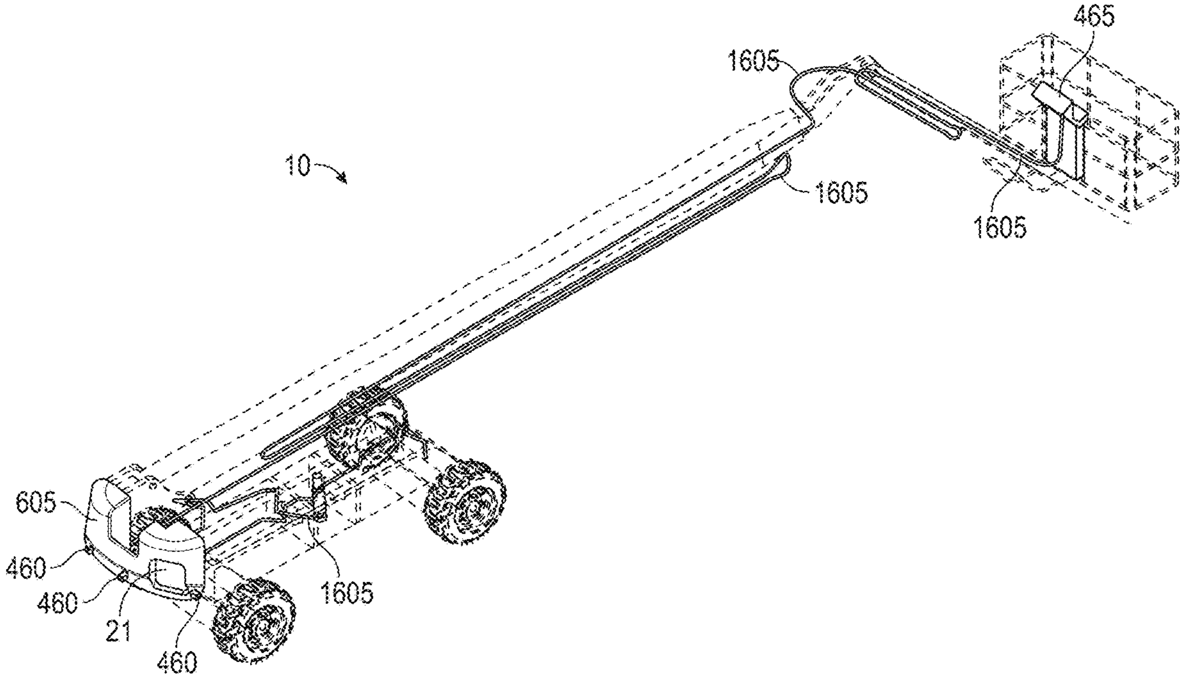
FIG. 16 is a perspective view of the electric boom illustrated in FIG. 1, according to an exemplary embodiment.

FIG. 16 depicts a perspective view of the electric boom 10. The perspective view of the electric boom 10, as shown in FIG. 16, includes a transparent view of given portions of the electric boom 10. A number of cables 1605 can be disposed throughout the electric boom 10. The cables 1605 can be and/or include at least one of Ethernet cables, fiber optic cables, Coaxial cables, twisted pair (shielded and/or unshielded) cables, and/or among other possible cables that can be used in networks. The cables 1605 can be electrically coupled with at least one of the sensors 455, the cameras 460, the display device 465 and/or the Ethernet switch 475. FIG. 16 depicts an example of the cables 1605 electrically coupled with the cameras 460 and the display device 465. The cables 1605 can electrically couple the cameras 460 and/or the display device 465 with the Ethernet switch 475. The electric coupling, via the cables 1605, of the cameras 460 and the display device 465 can connect the cameras 460 and the display device 465 with the network 480.

Figure 17:
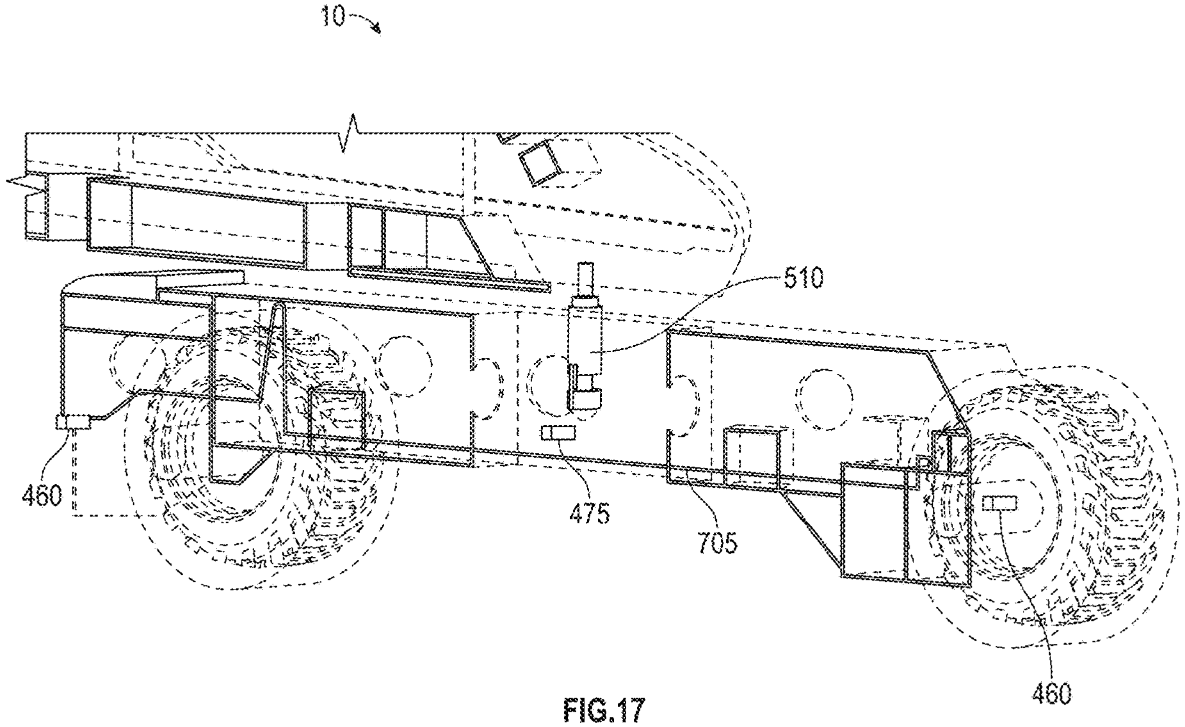
FIG. 17 is a perspective view of the electric boom illustrated in FIG. 1, according to an exemplary embodiment.

FIG. 17 depicts a perspective view of the electric boom 10, according to an exemplary embodiment. The perspective view of the electric boom 10, as shown in FIG. 17, includes a transparent view of given portions of the electric boom 10. The cables 1605 can be electrically coupled with the cameras 460, the Ethernet switch 475 and/or the rotary coupler 510. The cameras 460 can be disposed on the chassis 54. The cables 1605 can electrically couple the cameras 460 with the Ethernet switch 475 and the cables 1605 can electrically couple the Ethernet switch 475 with the rotary coupler 510.

Figure 18:
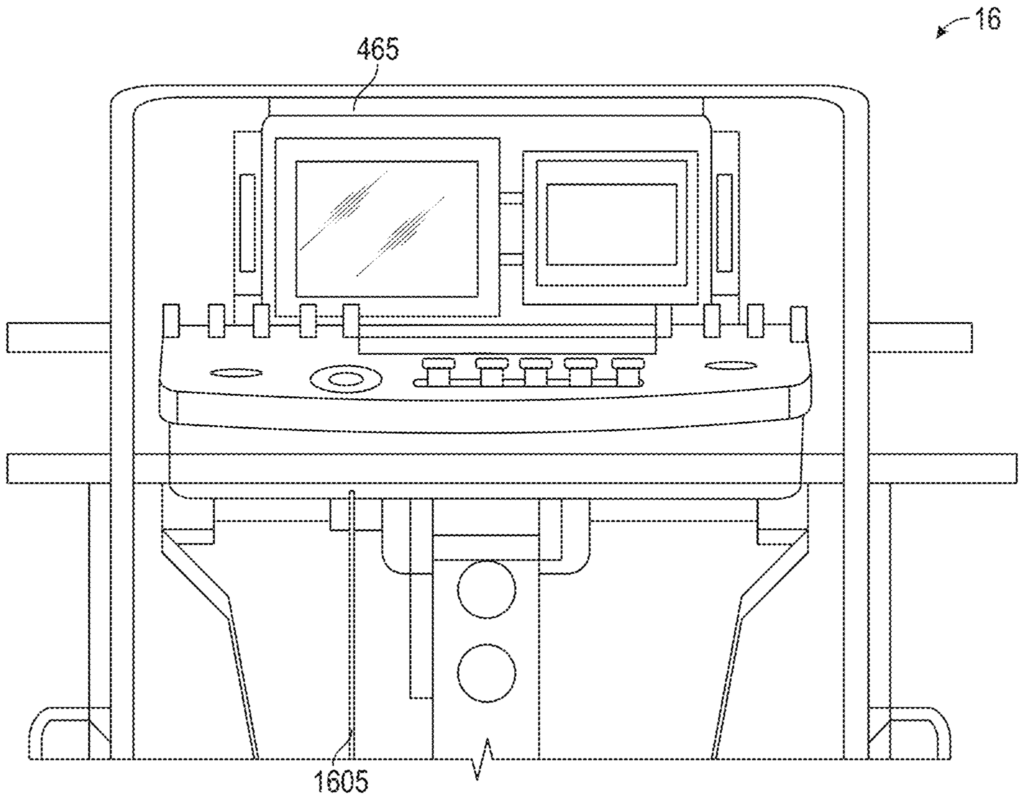
FIG. 18 is a perspective view of a platform assembly, according to an exemplary embodiment.

FIG. 18 is a perspective view of the platform assembly 16. The platform assembly 16 can include the display device 465. The display device 465 can be electrically coupled with the cables 1605. The cables 1605 can electrically couple the display device 465 with the Ethernet switch 475.

Figure 19:
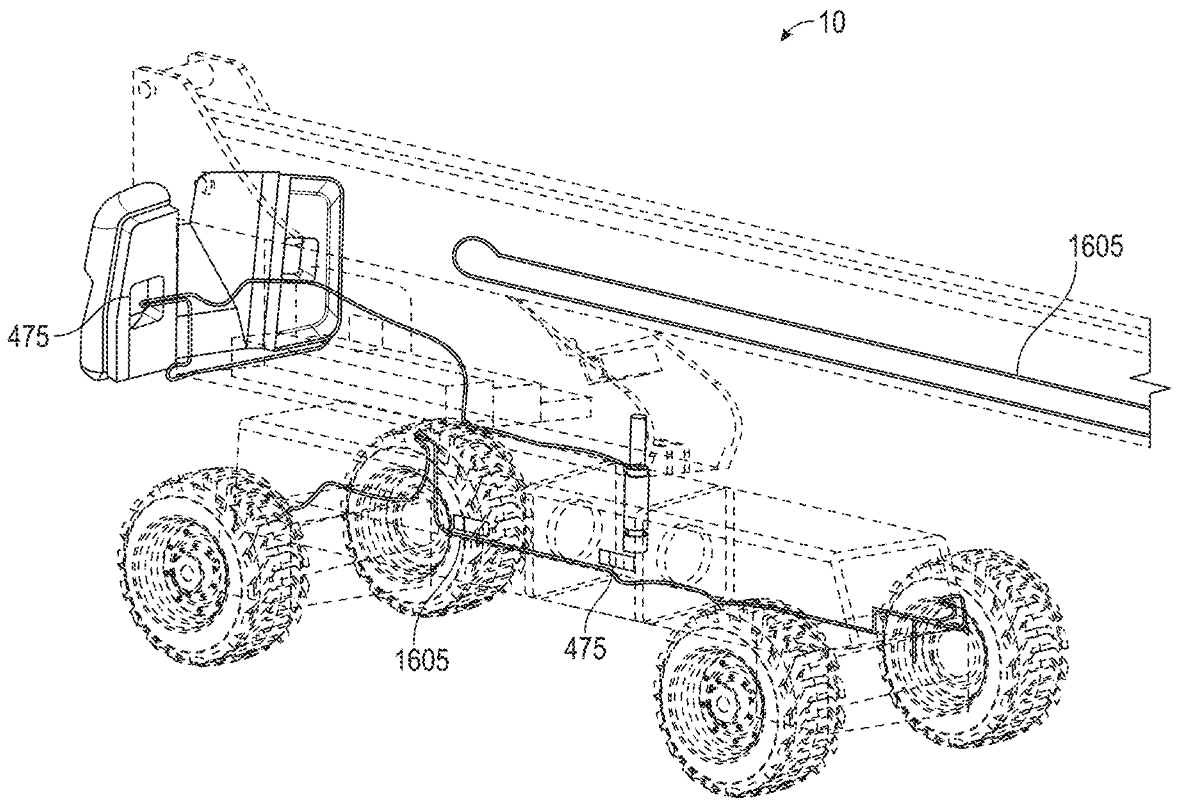
FIG. 19 is a perspective view of the electric boom illustrated in FIG. 1, according to an exemplary embodiment.

FIG. 19 is a perspective view of the electric boom 10, according to an exemplary embodiment. The cables 1605 can be electrically coupled with the Ethernet switch 475. The Ethernet switch 475 can be disposed within the counterweight 605. The counterweight 605 can be included in the turntable 70. The cameras 460 can be disposed with the counterweight 605 and the cameras 460 can produce video feeds pertaining to an area around the turntable 70. The cameras 460 can be electrically coupled with the cables 1605 and the cables 1605 can electrically couple the cameras 460 with the Ethernet switch 475.

Figure 20:
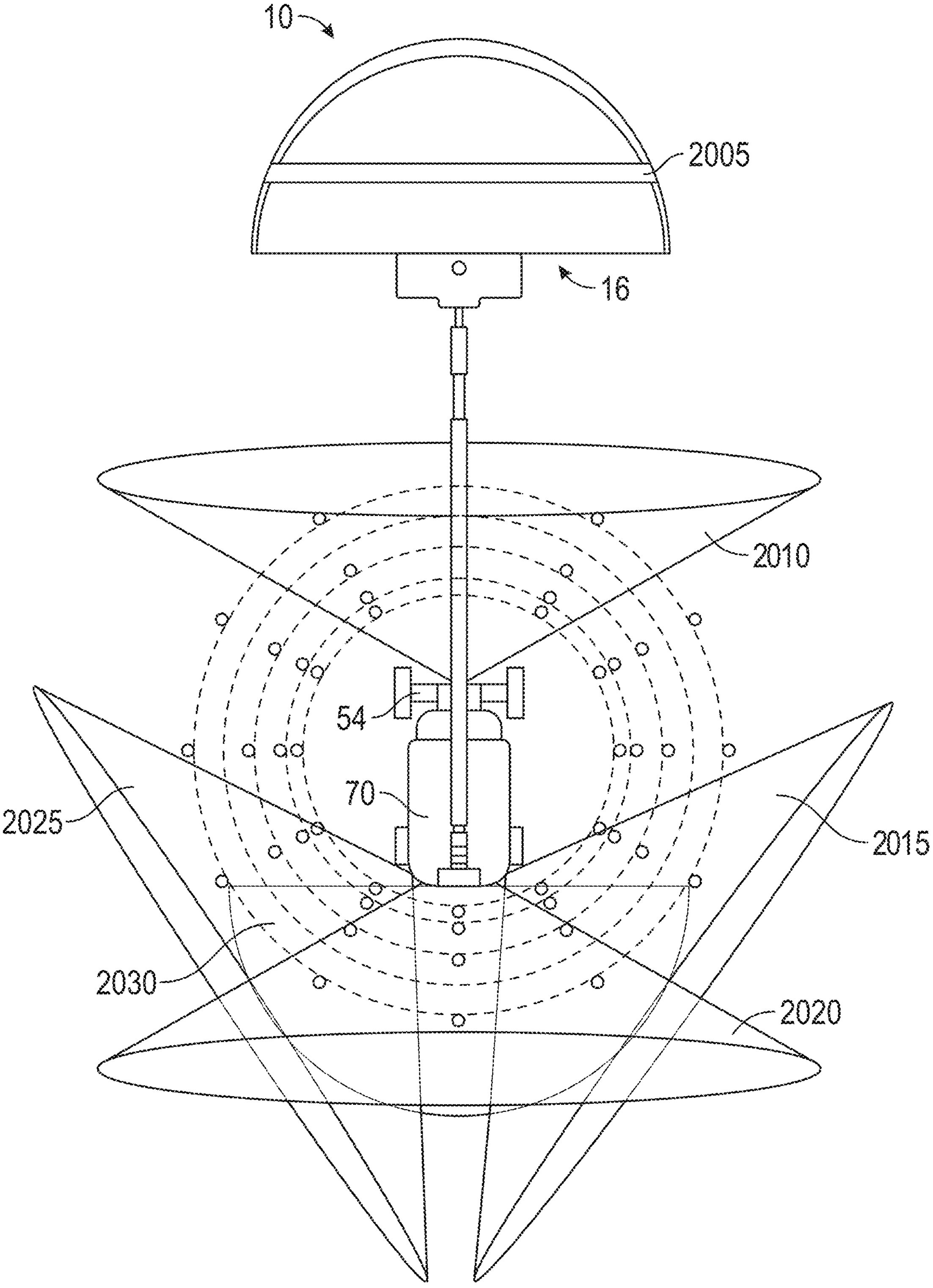
FIG. 20 is a perspective view of the electric boom illustrated in FIG. 1 including a number of video zones, according to an exemplary embodiment.

FIG. 20 is a perspective view of the electric boom 10, according to an exemplary embodiment. The electric boom 10 can include at least one moveable elements (e.g., the turntable 70, the chassis 54, the base assembly 12, the platform assembly 16, etc.) The moveable elements can have at least portion. For example, the moveable elements can have a first portion and a second portion. The cameras 460 can be disposed on the moveable elements. For example, the cameras can be disposed on the second portion of the moveable elements. The cameras 460 can produce a number of video zones (e.g., video zones 2005, 2010, 2015, 2020, 2025, and 2030). The video zones can capture an area around the electric boom 10. The video zones can include at least one field of view. The field of views can extend away from the electric boom 10. The area around the electric boom 10 can be and/or include a geographic area including the electric boom 10, an environment including the electric boom 10, and/or any other possible space that can include and/or otherwise be occupied by the electric boom 10.

The video zone 2005 can be a video zone captured by a first camera 460. The first camera 460 can disposed on a frontward portion (e.g., a first portion) of the platform assembly 16. The video zone 2005 can capture an area that is in front of the frontward portion of the platform assembly 16. The video zone 2005 can be and/or include a field of view (FOV) with respect to the platform assembly 16.

The video zone 2010 can be a video zone captured by a second camera 460. The second camera 460 can be disposed on a frontward portion (e.g., a first portion) of the chassis 54. The video zone 2010 can capture an area that is in front of the frontward portion of the chassis 54. The video zone 2020 can be a video zone captured by a third camera 460. The third camera 460 can be disposed on a rearward portion (e.g., a second portion) of the chassis 54. The video zone 2020 can capture an area that is behind the rearward portion of the chassis 54. The video zone 2010 and the video zone 2020 can be and/or include a FOV with respect to the chassis 54.

The video zone 2015 can be a video zone captured by a fourth camera 460. The fourth camera 460 can be disposed on a first rearward lateral portion (e.g., a first portion) of the turntable 70. The video zone 2015 can capture an area that is behind the first rearward lateral portion of the turntable 70. The video zone 2025 can be a video zone captured by a fifth camera 460. The fifth camera 460 can be disposed on a second rearward lateral portion of the turntable. The video zone 2025 can capture an area that is behind the second rearward lateral portion of the turntable 70. The video zone 2030 can be a video zone captured by a fifth camera 460. The fifth camera 460 can be disposed on a center rearward portion of the turntable 70. The video zone 2030 can capture an area that is behind the center rearward portion of the turntable 70.

The video zone 2015, 2025, and 2030 can be and/or include a FOV with respect to the turntable 70. The FOV with respect to the base assembly 12, the FOV with respect to the chassis 54, and the FOV with respect to the turntable 70 can be and/or include a FOV with respect to the electric boom 10. At least one video zone can change responsive to a first moveable element moving relative to a second moveable element. For example, the turntable 70 (e.g., the first moveable element) can rotate relative to the chassis 54 (e.g., the second moveable element) and the turntable 70 rotating can result in the cameras 460 disposed on the turntable 70 no longer capturing the areas depicted in FIG. 11 (e.g., the turntable 70 is now occupying a different space).

Figure 21:
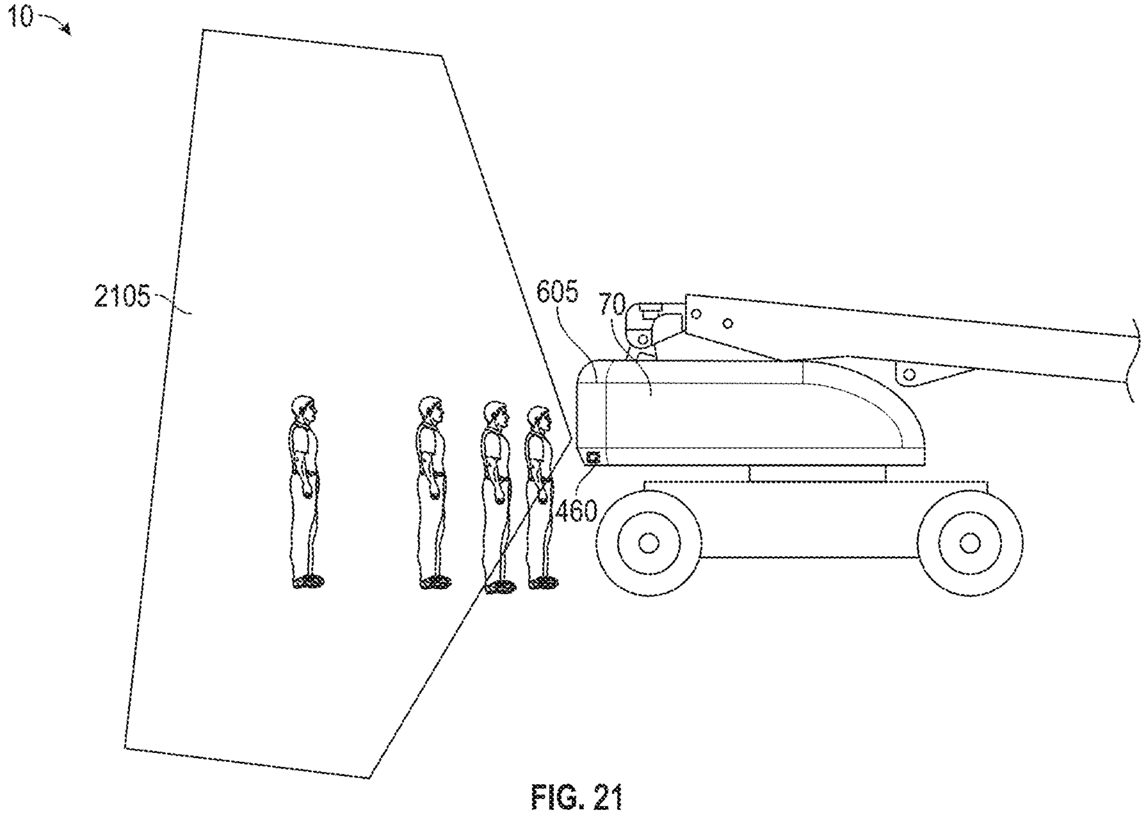
FIG. 21 is a perspective view of the electric boom illustrated in FIG. 1 including a number of video zones, according to an exemplary embodiment.

FIG. 21 is a perspective view of the electric boom 10, according to an exemplary embodiment. The cameras 460 can be disposed on a portion of the turntable 70. For example, the cameras 460 can be disposed on a rearward portion of the turntable 70. The cameras 460 can produce video zones and the video zones can capture an area that is proximate to the turntable 70 (e.g., the area in view of the cameras 460). The video zones produced by the cameras 460 can be combined to create a FOV 2105. The FOV 2105 can be and/or include areas that are captured by the cameras 460.

Figure 22:
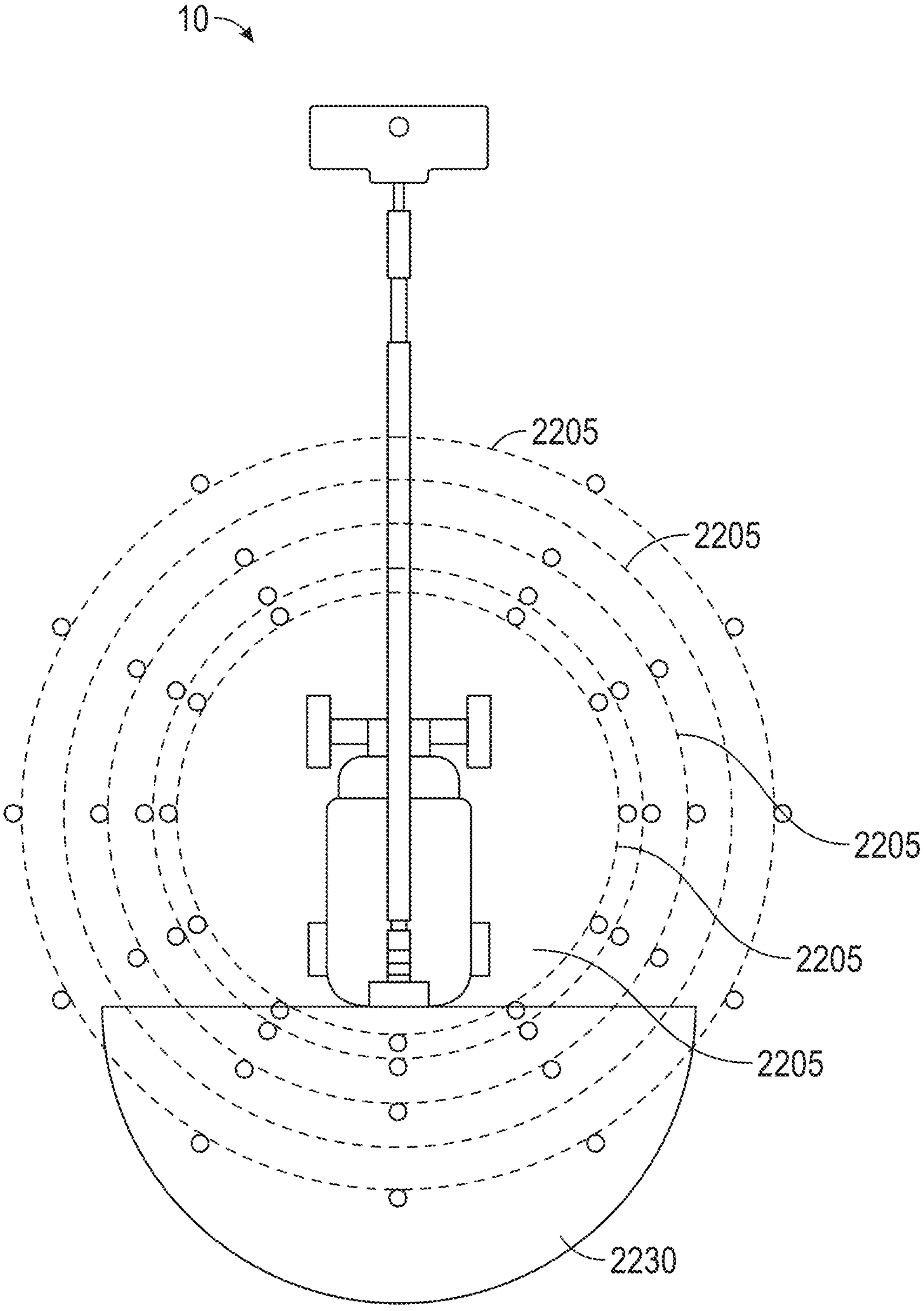
FIG. 22 is a perspective view of the electric boom illustrated in FIG. 1 including a number of video zones and a number of proximity zones, according to an exemplary embodiment.

FIG. 22 is a perspective view of the electric boom 10, according to an exemplary embodiment. The sensors 455 can be disposed on the electric boom 10. For example, the sensors 455 can be disposed on the turntable 70 (e.g., a first moveable element) and the chassis 54 (e.g., a second moveable element). The sensors can produce at least one proximity zone 2205. The proximity zones 2205 can encompass an area around the electric boom 10. For example, a first proximity zone 2205 can include a circle with a diameter surrounding the electric boom 10.

The detection of an object, within a given proximity zone 2205, can be used to determine a distance between the object and the electric boom 10. For example, the first proximity zone 2205 can have a radius starting at the electric boom 10 and ending at half the diameter of the proximity zone. When an object is detected at the first proximity zone 2205 the distance of the object can be similar to the radius of the proximity zone 2205. The area captured by the video zone 2030 can include a portion of the proximity zones 2205.

Figure 23:
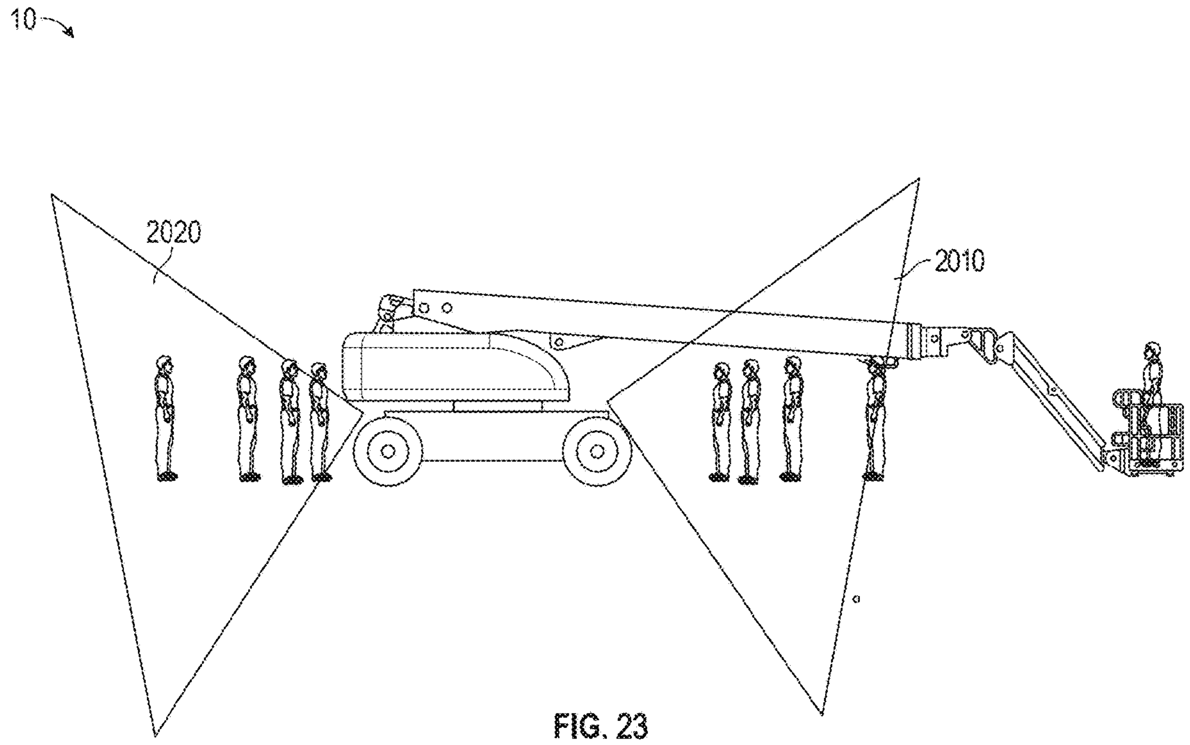
FIG. 23 is a perspective view of the electric boom illustrated in FIG. 1 including a number of video zones, according to an exemplary embodiment.

FIG. 23 is a perspective of view the electric boom 10, according to an exemplary embodiment. The cameras 460 disposed on the chassis 54 can produce the video zones 2010 and the video zones 2020. The video zone 2010 can capture a frontward area of the electric boom 10 and the video zone 2020 can capture a rearward area of the electric boom 10.

Figure 24:
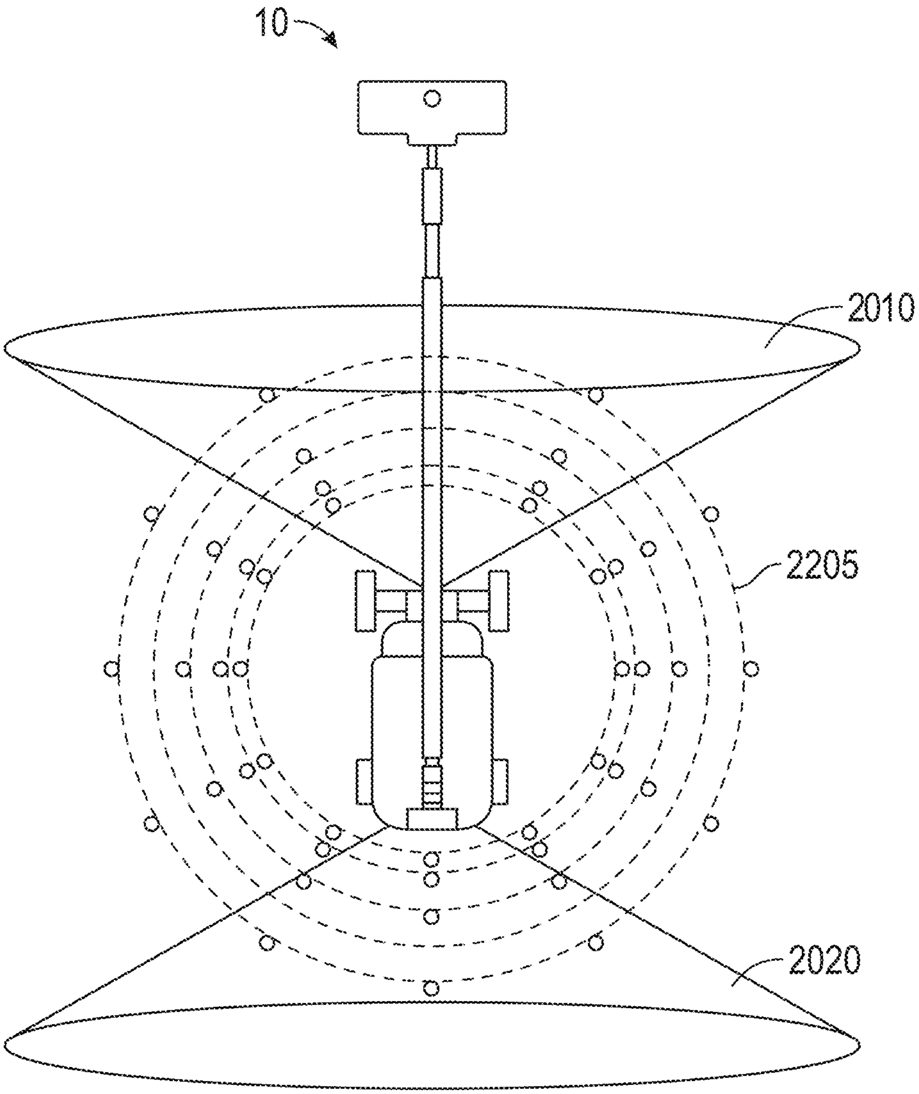
FIG. 24 is a perspective view of the electric boom illustrated in FIG. 1 including a number of video zones, according to an exemplary embodiment.

FIG. 24 is a perspective view of the electric boom 10, according to an exemplary embodiment. The sensors 455 can be disposed on the chassis 54. The sensors 455 can produce the proximity zones 2205. The proximity zones 2205, the video zone 2010 and the video zone 2020 can encompass and capture the area of the electric boom 10 with respect to the chassis 54.

Figure 25:
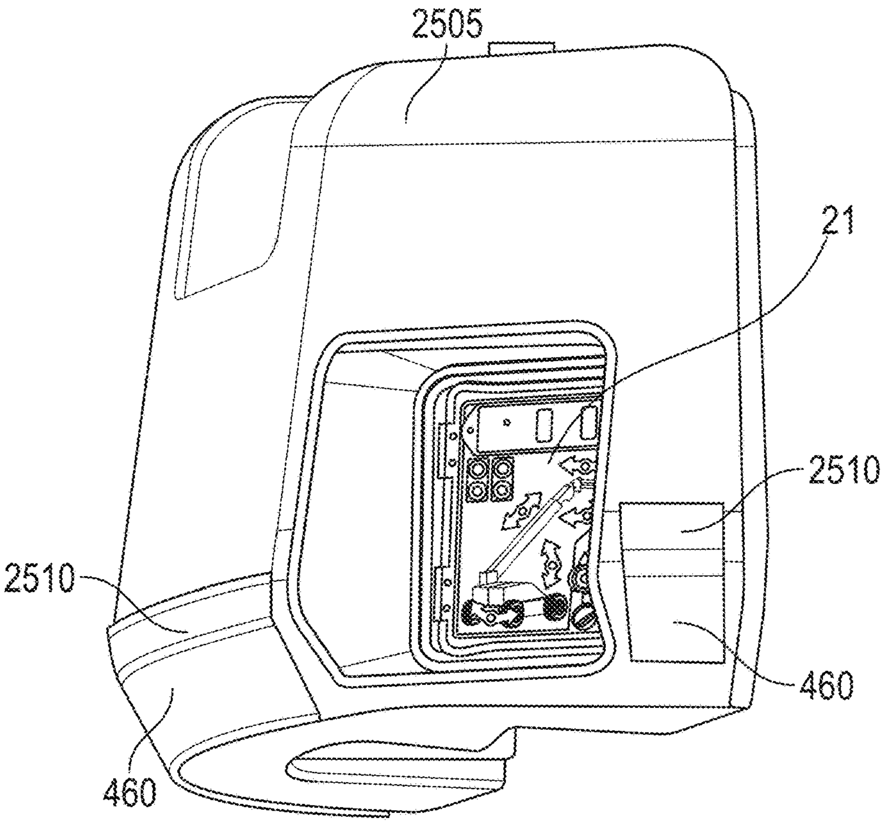
FIG. 25 is a perspective view of a panel, according to an exemplary embodiment.

FIG. 25 is a perspective view of a panel 2505, according to an exemplary embodiment. The turntable 70 can include the panel 2505. The panel 2505 can be and/or include the counterweight 605. The panel 2505 can include at least one assembly 2510. The assembly 2510 can be and/or include at least one of a body, a housing, a structure and/or a frame. The assembly 2510 can include at least one camera 460. The assemblies 2510 can be located at various portions of the panel 2505. For example, a first assembly 2510 can be disposed on a rearward lateral portion of the panel 2505 and a second assembly 2510 can be disposed on a center rearward portion of the panel 2505.

Figure 26:
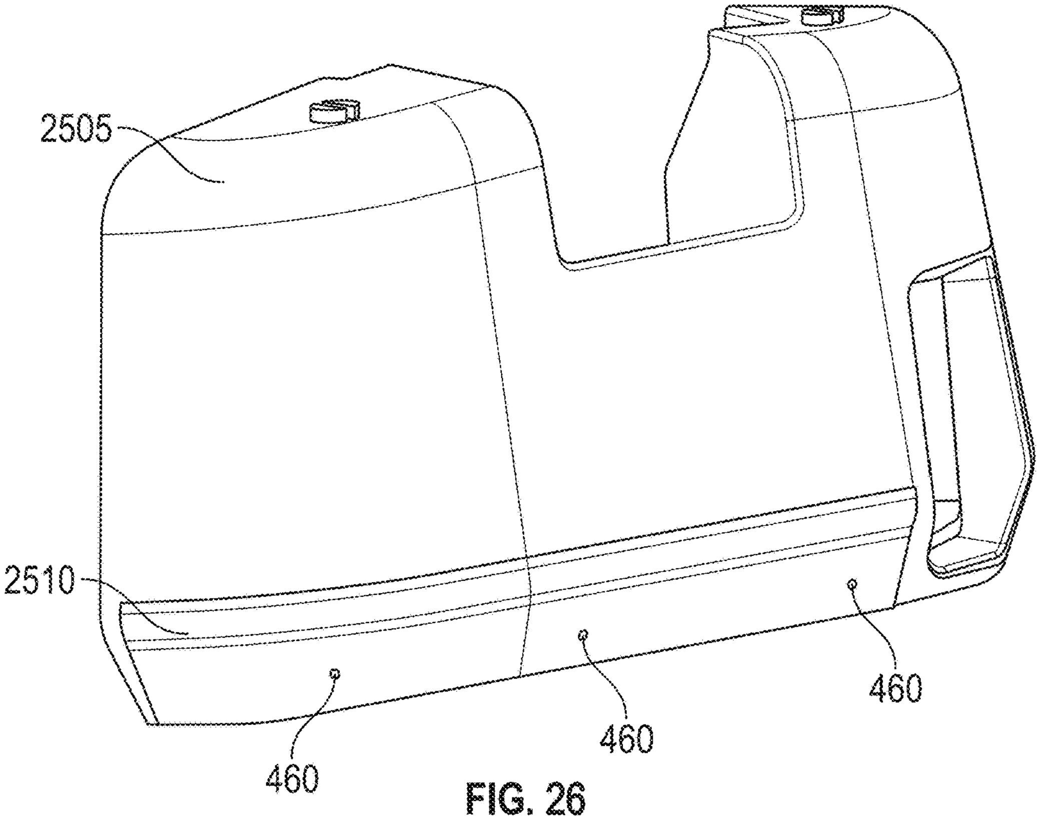
FIG. 26 is a perspective view of the panel illustrated in FIG. 25, according to an exemplary embodiment.

FIG. 26 is a perspective view of the panel 2505, according to an exemplary embodiment. The assembly 2510 can include the cameras 460. The location of the cameras 460, on the assembly 2510, can dictate the video zones produced by the cameras 460. FIG. 26 depicts an example of the cameras 460 disposed towards the center of the assembly 2510. The cameras being disposed towards the center of the assembly 2510 can result in the video feeds produced by the cameras 460 capturing a rearward view of the turntable 70.

Figure 27:
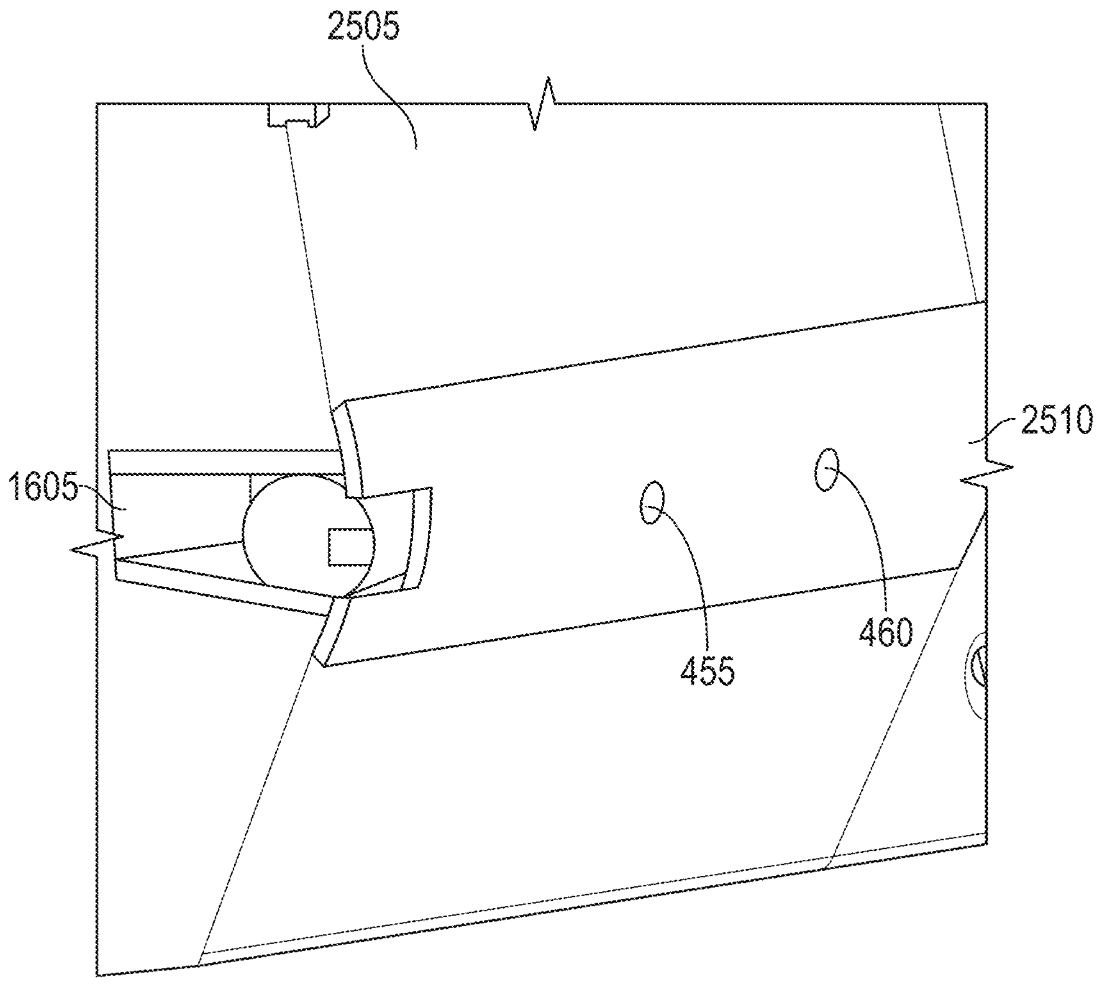
FIG. 27 is a perspective view of the panel illustrated in FIG. 25, according to an exemplary embodiment.

FIG. 27 is a perspective view of the panel 2505, according to an exemplary embodiment. The assembly 2510 can include the cameras 460 and the sensors 455. The sensors 455 and the cameras 460 can be electrically coupled with the cables 1605. The cables 1605 can electrically couple the sensors 455 and the cameras 460 with the Ethernet switch 475.

Figure 28:
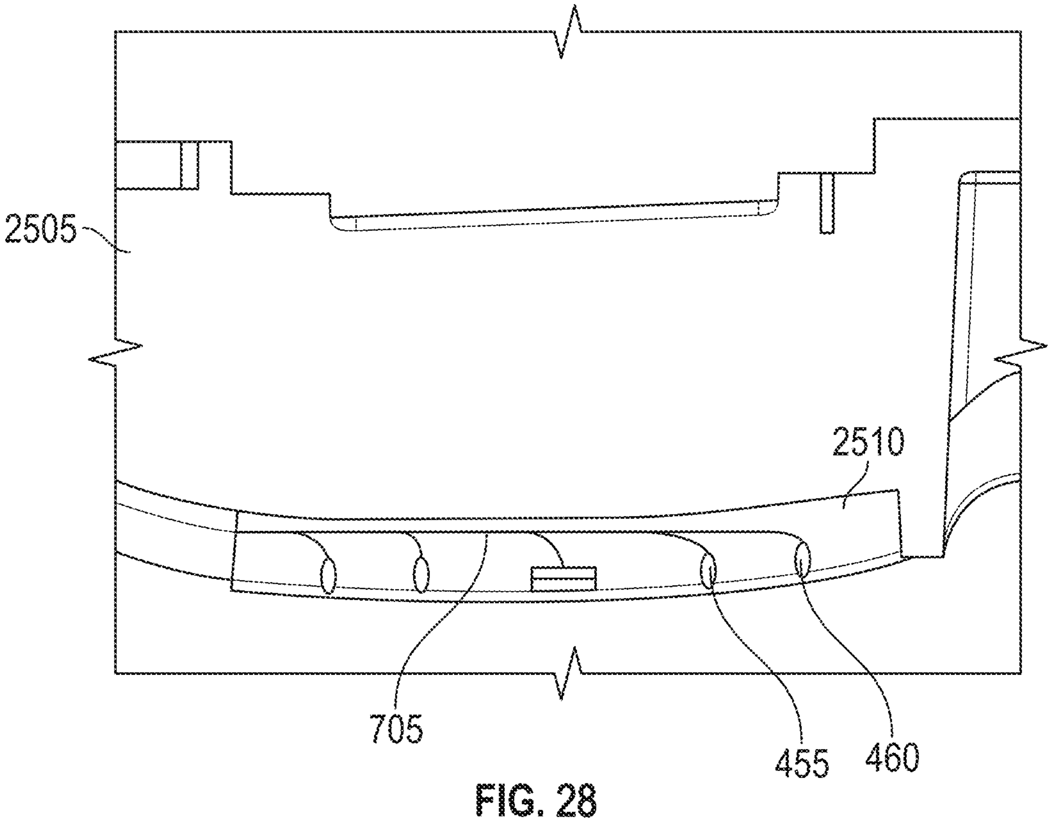
FIG. 28 is a perspective view of the panel illustrated in FIG. 25, according to an exemplary embodiment.

FIG. 28 is a perspective view of the panel 2505, according to an exemplary embodiment. The assembly 2510 can include the cameras 460 and the sensors 455. The sensors 455 and the cameras 460 can be electrically coupled with the cables 1605. The placement of the sensors 455 and/or the placement of the cameras 460 in the assembly 2510 can dictate the proximity zones produced by the sensors 455 and the video zones produced by the cameras 460.

Figure 29:
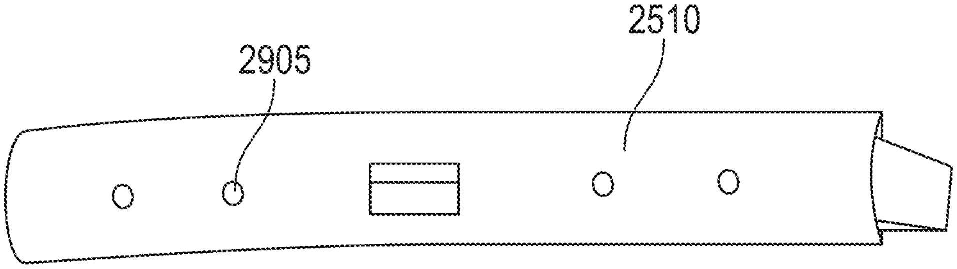
FIG. 29 is a perspective view of an assembly, according to an exemplary embodiment.

FIG. 29 is a perspective view of the assembly 2510, according to an exemplary embodiment. The assembly 2510 can include at least one aperture 2905. The apertures 2905 can provide a void and/or an opening for at least one of the cameras 460 and/or the sensors 455.

Figure 30:
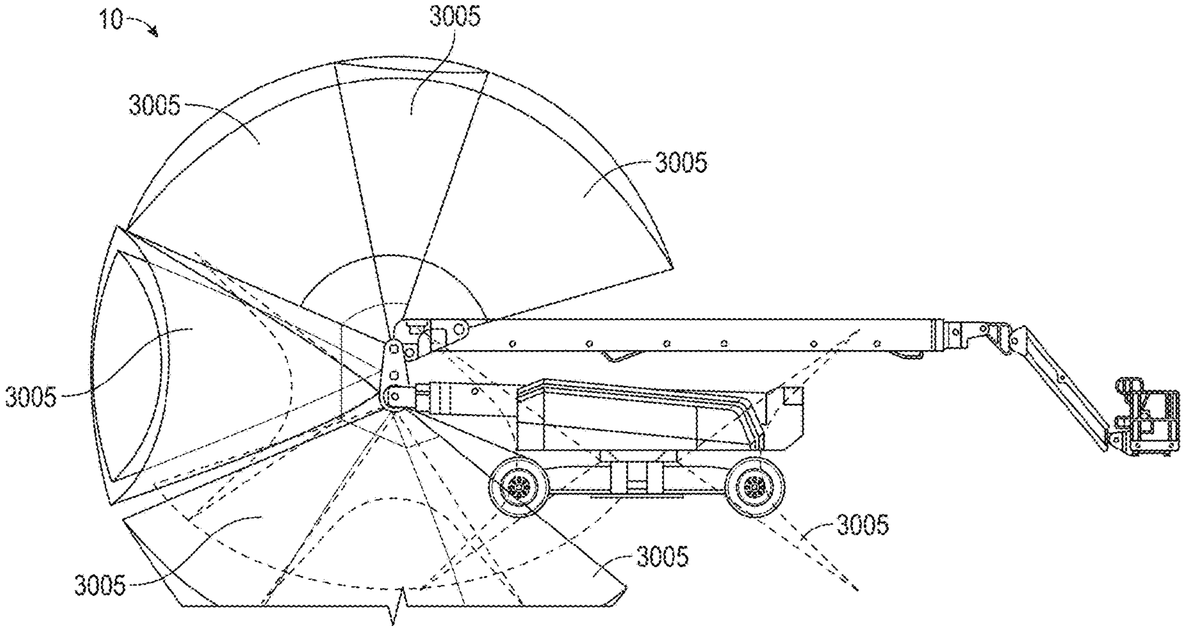
FIG. 30 is a perspective view of the electric boom illustrated in FIG. 1 including a number of proximity zones and a number of video zones, according to an exemplary embodiment.

FIG. 30 is a perspective view of the electric boom 10, according to an exemplary embodiment. The sensors 455 and the cameras 460 can produce at least one zone 3005. The zones 3005 can be and/or include the proximity zones and/or the video zones. As the moveable elements of the electric boom 10 move the zones 3005 can change and/or be maintained. For example, a proximity zone produce by the sensors 455 disposed on the lift assembly 14 can change responsive to the lift assembly 14 being raised and/or lowered. As another example, the video zones produced by the cameras 460 disposed on the turntable 70 can change responsive to the turntable 70 rotating relative to the base assembly 12. As another example, the video zones produced by the cameras 460 disposed on the chassis 54 can be maintained responsive to the position of the chassis 54 being maintained as the turntable 70 rotates relative to the base assembly 12.

Figure 31:
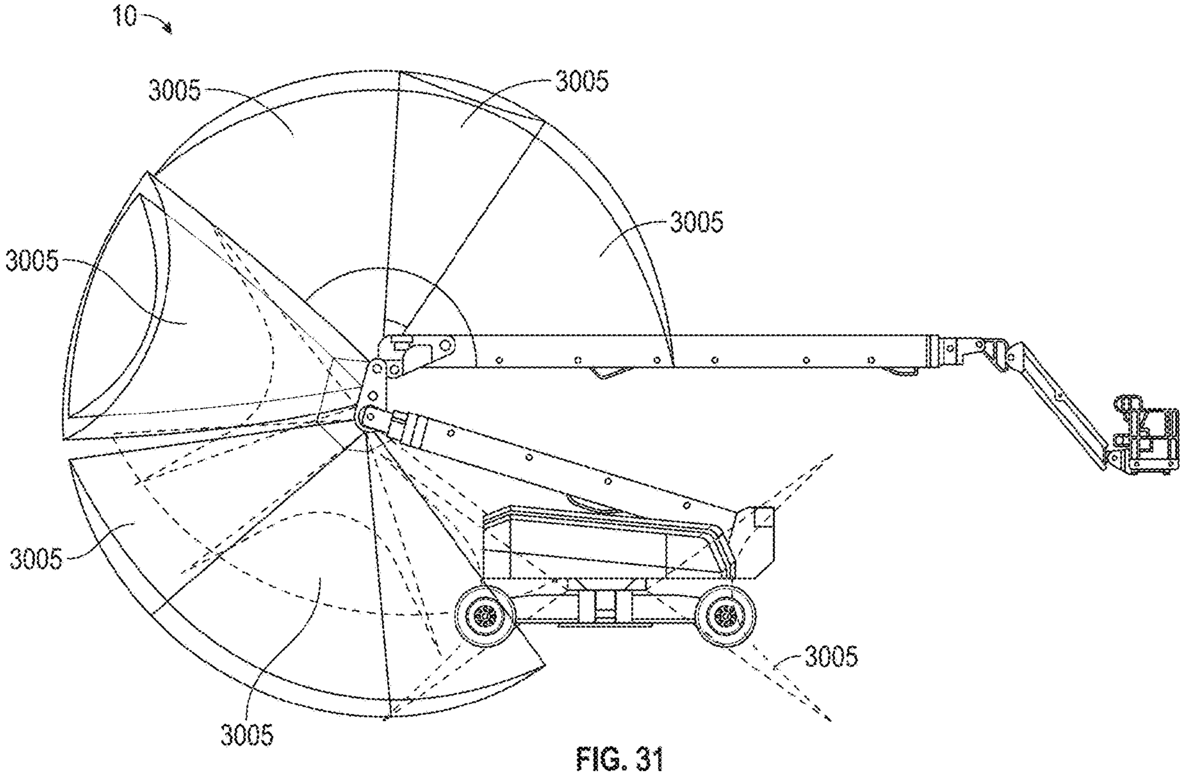
FIG. 31 is a perspective view of the electric boom illustrated in FIG. 1 including a number of proximity zones and a number of video zones, according to an exemplary embodiment.

FIG. 31 is a perspective view of the electric boom 10, according to an exemplary embodiment. FIG. 31 depicts an example of a first moveable element (e.g., the lift assembly 14) having been moved relative to a second moveable element (e.g., the base assembly 12). A first zone 3005 (e.g., a proximity zone), produced by a sensor 455 disposed on the lift assembly 14, is shown to have changed with respect to a similar zone 3005 depicted in FIG. 30.

Figure 32:
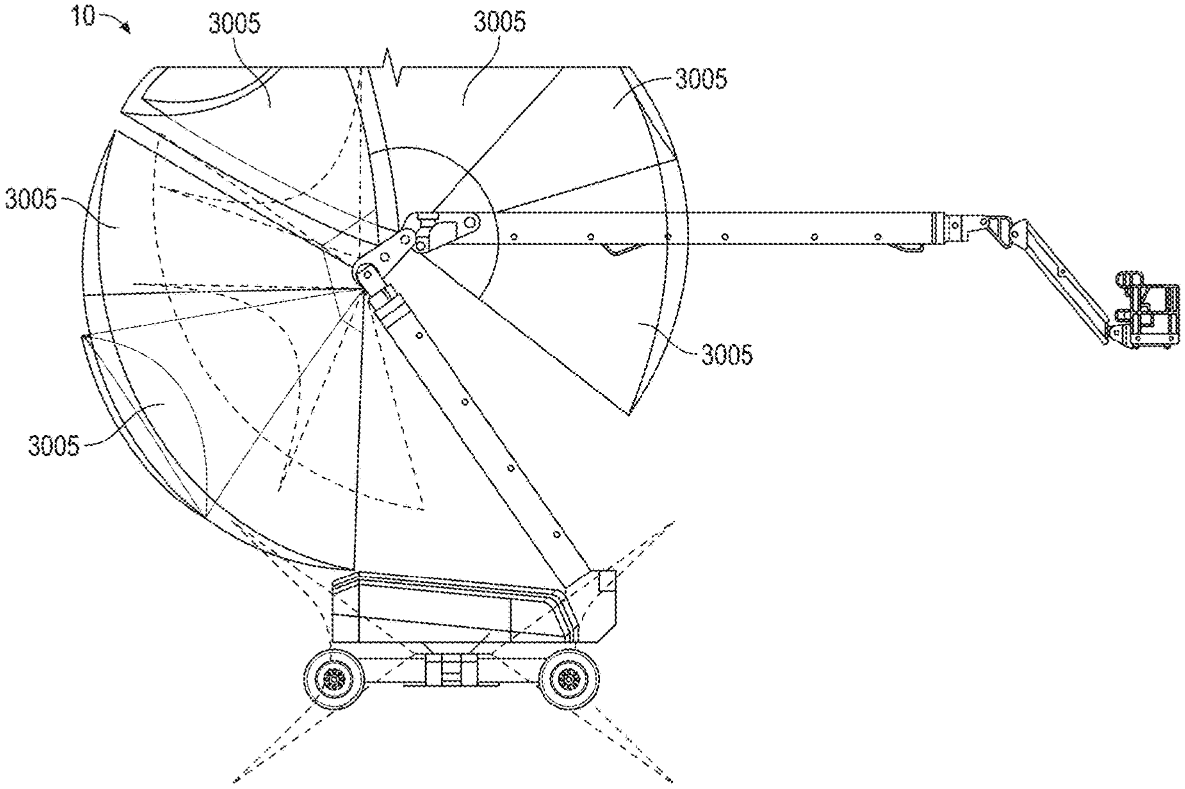
FIG. 32 is a perspective view of the electric boom illustrated in FIG. 1 including a number of proximity zones and a number of video zones, according to an exemplary embodiment.

FIG. 32 is a perspective view of the electric boom 10, according to an exemplary embodiment. FIG. 32 depicts an example of the first moveable element (e.g., the lift assembly 14) having been moved again relative to the second moveable element (e.g., the base assembly 12). The first zone 3005 (e.g., the proximity zone), produced by the sensor 455 disposed on the lift assembly 14, is shown to have changed with respect to the similar zone 3005 depicted in FIG. 31. The first zone 3005 has been changed as the lift assembly 14 has been raised (e.g., moved relative to the base assembly 12) from a first height, in FIG. 30, to a second height, in FIG. 31, and is now shown to be at a third height.

Figure 33:
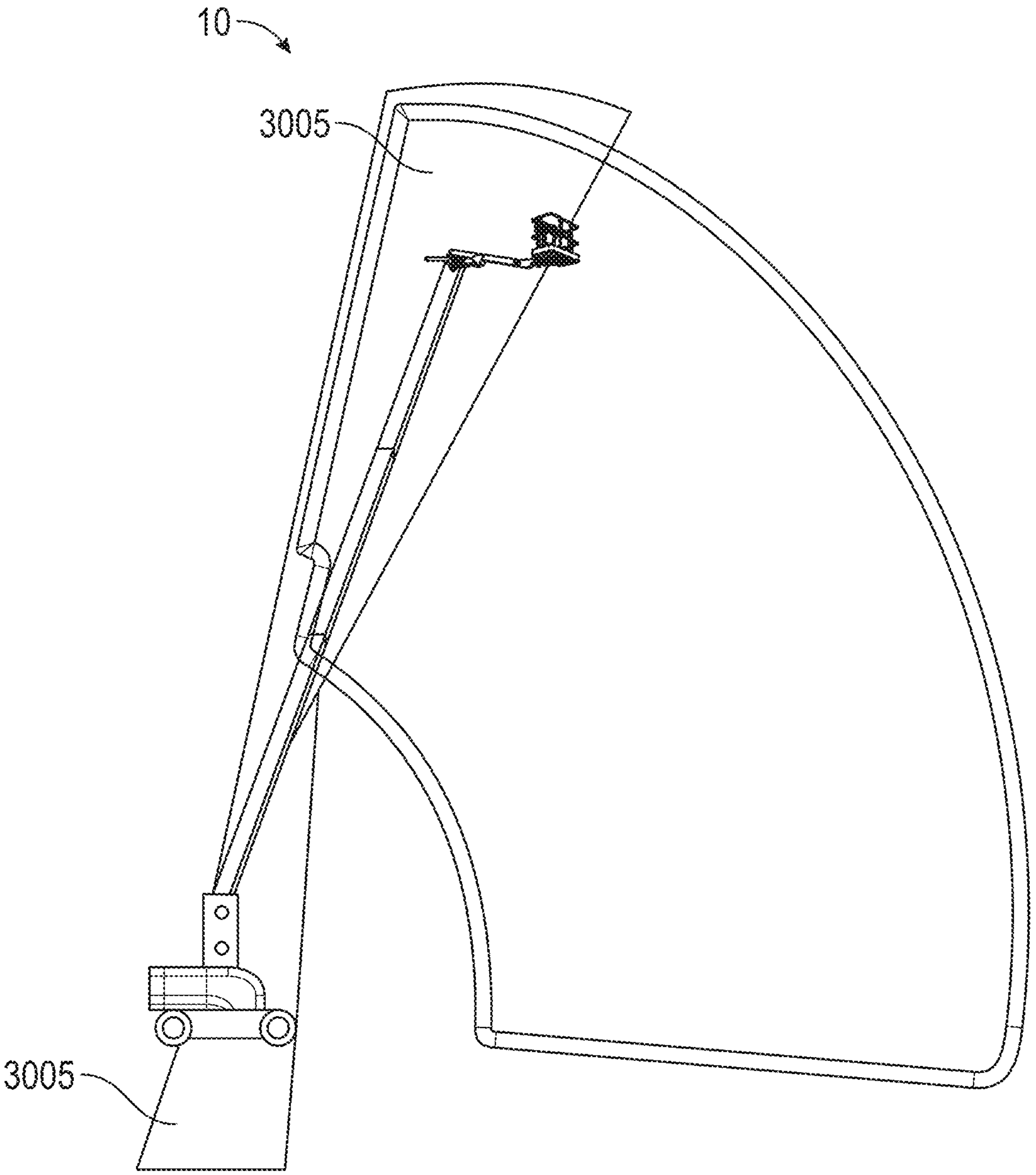
FIG. 33 is a perspective view of the electric boom illustrated in FIG. 1 including a number of proximity zones and a number of video zones, according to an exemplary embodiment.

FIG. 33 is a perspective view of the electric boom 10, according to an exemplary embodiment. The zones 2005 are shown to be capturing the lift assembly 14, the platform assembly 16, turntable 70, and the base assembly 12. The zones 2005 can be changed responsive to a first moveable element moving relative to a second moveable element.

Figure 34:
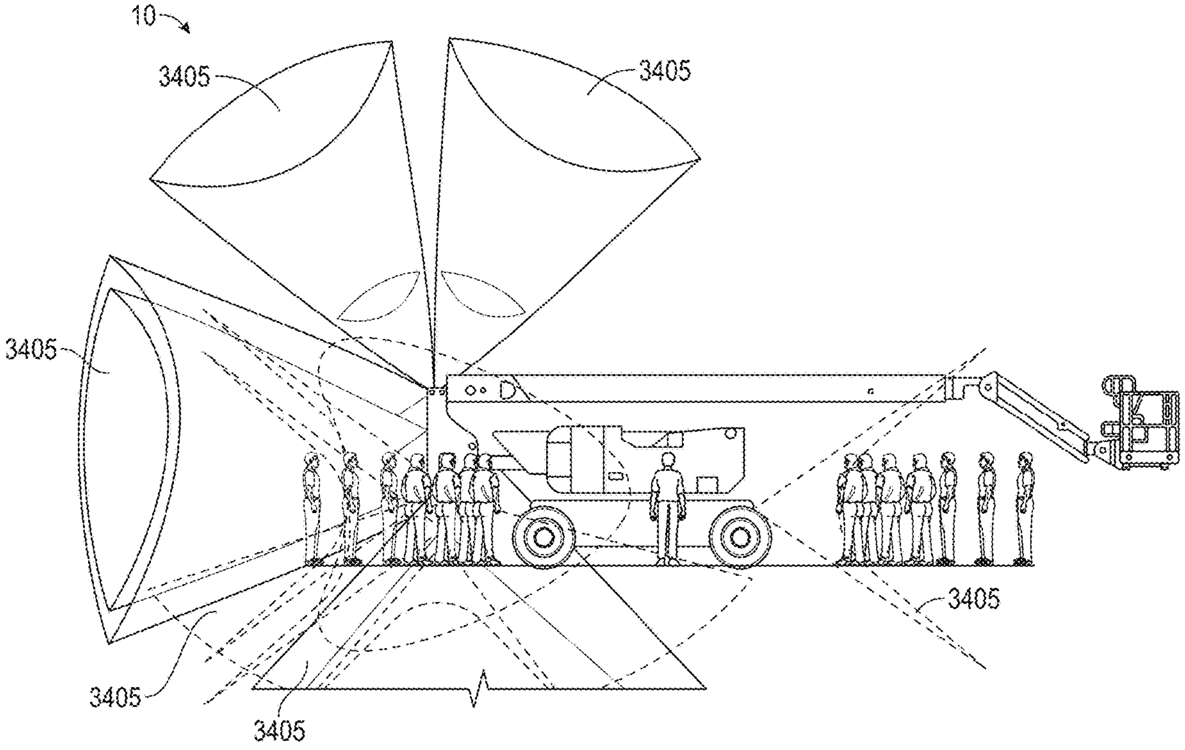
FIG. 34 is a perspective view of the electric boom illustrated in FIG. 1 including a number of proximity zones and a number of video zones, according to an exemplary embodiment.

FIG. 34 is a perspective view of the electric boom 10, according to an exemplary embodiment. The sensors 455 and the cameras 460 can produce at least one 3405. The zones 3405 can be and/or include the zones 3005. The zones 3405 can be and/or include proximity zones and/or video zones. The zones 3405 can capture the area around the electric boom 10. FIG. 34 depicts an example of objects disposed with the zones 3405. While the zones 3405 can change responsive to a first moveable element moving relative to a second moveable element, the sensors 455 and/or the cameras 460 can be placed (e.g., disposed) on given portions of the electric boom 10 and/or the moveable elements thereof resulting in at least one zone 3405 being maintained responsive to a first moveable element moving relative to a second moveable element. For example, a first zone 2105 (e.g., a video zone) produced by a camera 460 disposed on a rearward portion of the chassis 54 can be maintained responsive to the turntable 70 moving relative to the base assembly 12. The position of the chassis 54 can be maintained as the turntable 70 moves relative to the base assembly 12 and as a result a position in space of the camera 460 disposed on the chassis 54 can be maintained. The maintaining of the position of the camera 460 can result in the first zone 2105 being maintained.

Figure 35:
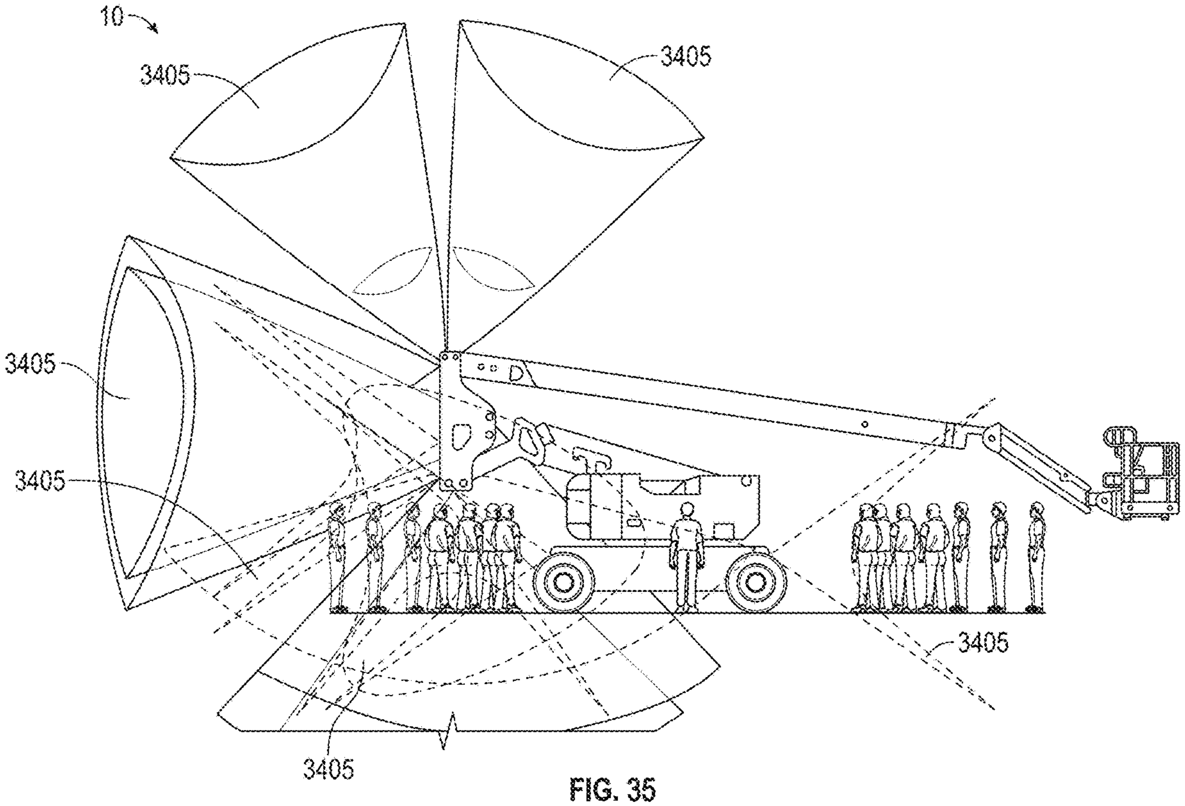
FIG. 35 is a perspective view of the electric boom illustrated in FIG. 1 including a number of proximity zones and a number of video zones, according to an exemplary embodiment.

FIG. 35 is a perspective view of the electric boom 10, according to an exemplary embodiment. FIG. 35 depicts an example of a first moveable element (e.g., the lift assembly 14) having been moved relative to a second moveable element (e.g., the base assembly 12). A first zone 3405 (e.g., a proximity zone), produced by a sensor 455 disposed on the lift assembly 14, is shown to have changed with respect to a similar zone 3405 depicted in FIG. 34. Additionally, a second zone 3405 (e.g., a video zone), produced by a camera 460 disposed on the chassis 54, is shown to have been maintained with respect to a similar zone 3405 depicted in FIG. 34. The maintaining of the second zone 3405 shows that even as the first moveable element has been moved an object proximate to the electric boom 10 is still in view of the second zone 3405.

Figure 36:
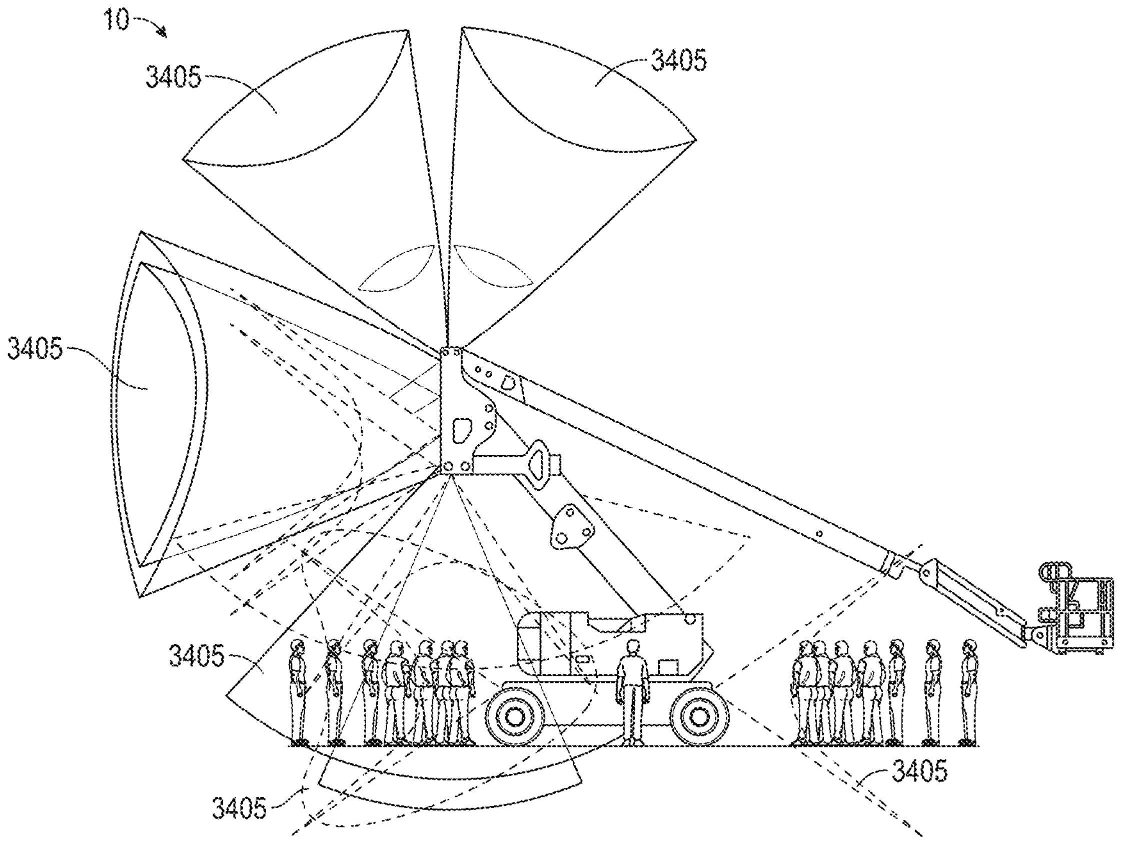
FIG. 36 is a perspective view of the electric boom illustrated in FIG. 1 including a number of proximity zones and a number of video zones, according to an exemplary embodiment.

FIG. 36 is a perspective view of the electric boom 10, according to an exemplary embodiment. FIG. 36 depicts an example of the first moveable element (e.g., the lift assembly 14) having been moved again relative to the second moveable element (e.g., the base assembly 12). The first zone 3405 (e.g., the proximity zone), produced by the sensor 455 disposed on the lift assembly 14, is shown to have changed with respect to the similar zone 3405 depicted in FIG. 35. The first zone 3405 has been changed again as the lift assembly 14 has been raised (e.g., moved relative to the base assembly 12) from a first height, in FIG. 34, to a second height, in FIG. 34, and is now shown to be at a third height. Additionally, the second zone 3405 is shown to have been maintained and the maintaining of the second zone 3405 results in the second zone capturing the object proximate to the electric boom 10.

Figure 37:
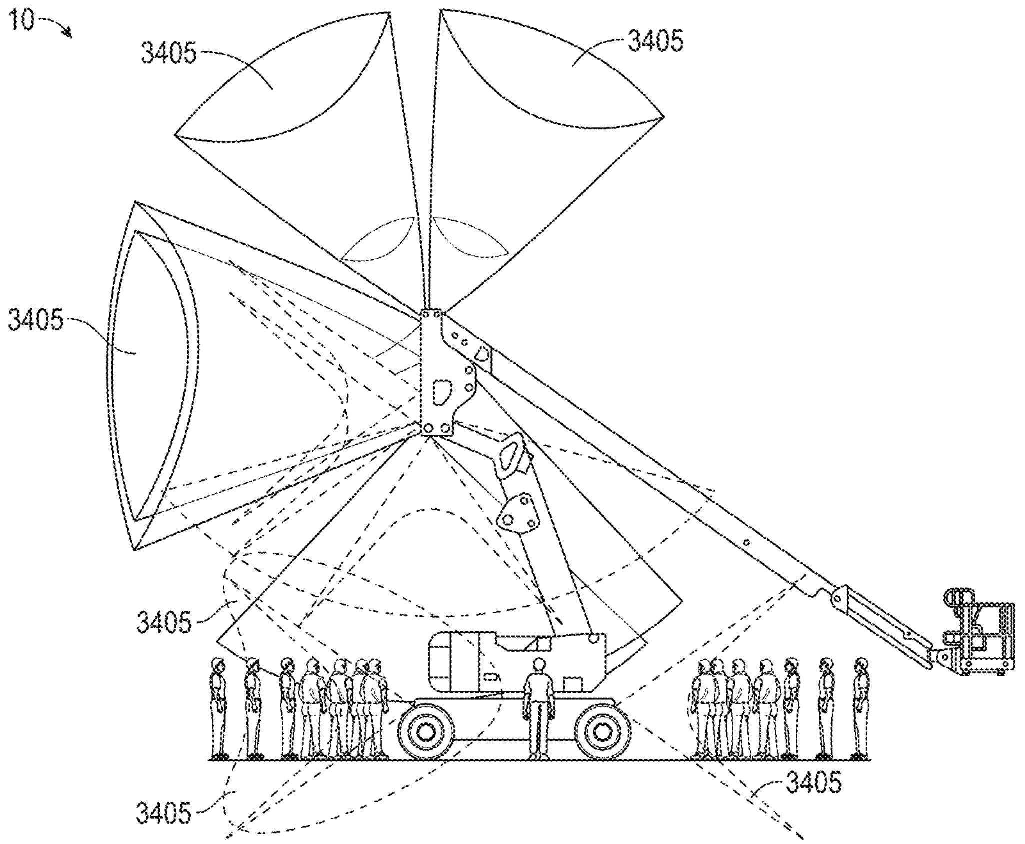
FIG. 37 is a perspective view of the electric boom illustrated in FIG. 1 including a number of proximity zones and a number of video zones, according to an exemplary embodiment.

FIG. 37 is a perspective view of the electric boom 10, according to an exemplary embodiment. FIG. 37 depicts an example of the first moveable element (e.g., the lift assembly 14) having been moved again relative to the second moveable element (e.g., the base assembly 12). The first zone 3405 (e.g., the proximity zone), produced by the sensor 455 disposed on the lift assembly 14, is shown to have changed with respect to the similar zone 3405 depicted in FIG. 36. The first zone 2505 has been changed again as the lift assembly 14 has been raised (e.g., moved relative to the base assembly 12) from a first height, in FIG. 34, to a second height, in FIG. 35, to a third height, in FIG. 36, and is now shown to be at a fourth height. Additionally, the second zone 3405 is shown to have been maintained and the maintaining of the second zone 3405 results in the second zone capturing the object proximate to the electric boom 10.

Figure 38:
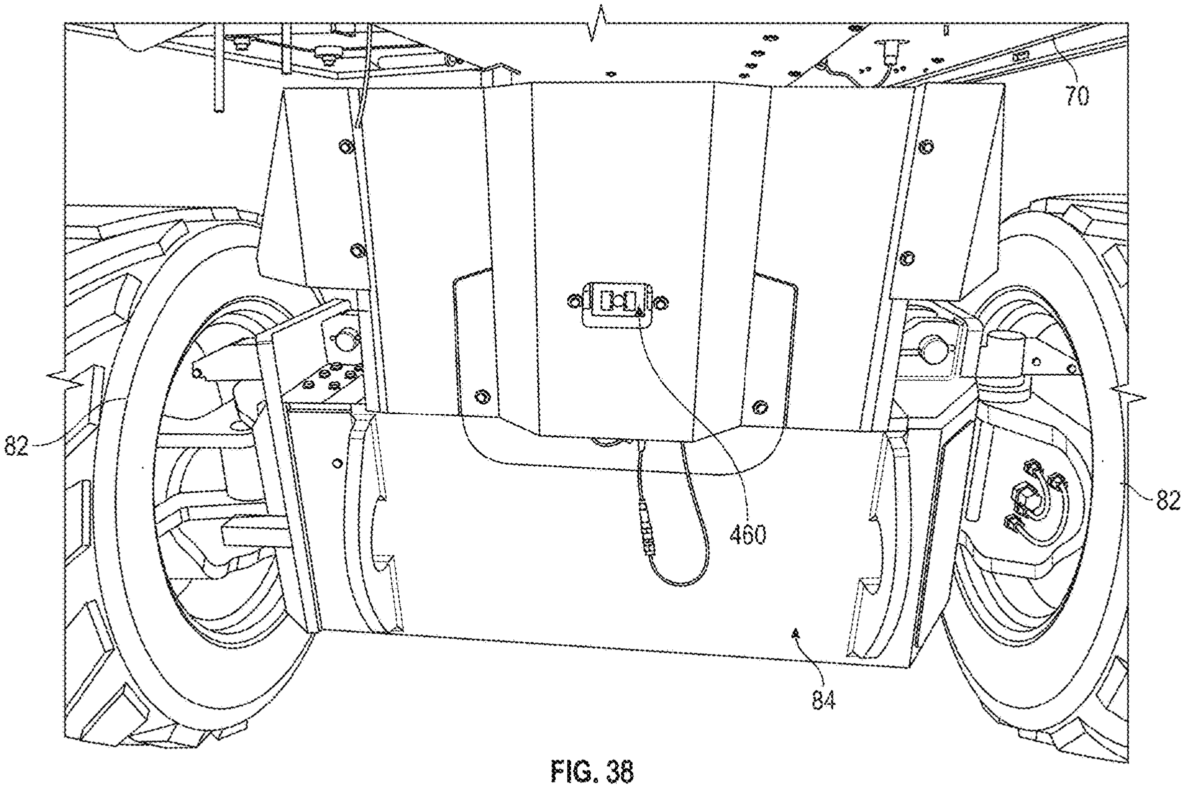
FIG. 38 is a perspective view of the electric boom illustrated in FIG. 1, according to an exemplary embodiment.

FIG. 38 is a perspective view of the electric boom 10, according to an exemplary embodiment. As shown in FIG. 38, the camera 460 can be disposed between a first tractive element 82 and a second tractive element 82. The camera 460 can also be disposed between the turntable 70 and a ground surface. For example, the camera 460 can be positioned to capture an area beneath at least a portion of the turntable 70.

Figure 39:
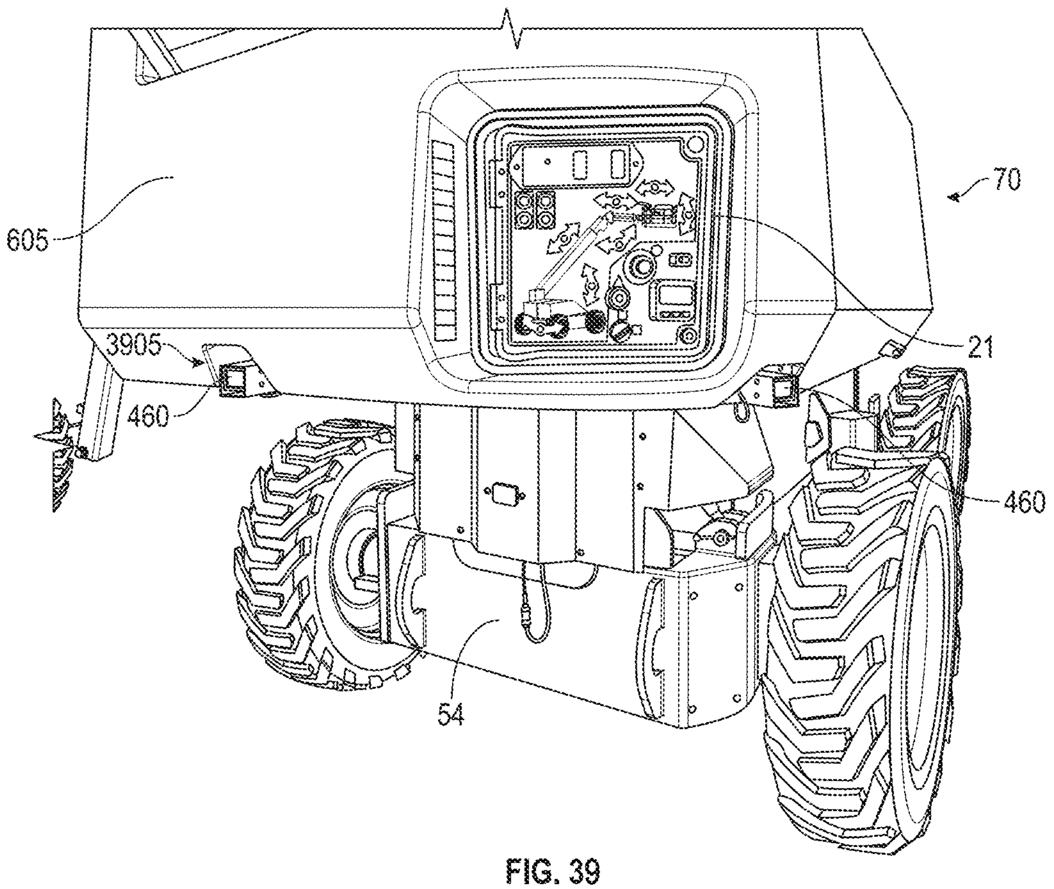
FIG. 39 is a perspective view of the electric boom illustrated in FIG. 1, according to an exemplary embodiment.

FIG. 39 is a perspective view of the electric boom 10, according to an exemplary embodiment. The counterweight 605 can define at least one recess 3905. For example, the counterweight 605 can include and/or provide one or more indents. In some embodiments, the cameras 460 can be disposed and/or located at least partially within the recesses 3905. The recesses 3905 can position the cameras 460 in one or more directions. For example, the recesses 3905 can position the cameras 460 in a downward direction.

Configuration of Exemplary Embodiments

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms “exemplary” and “example” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

Also, the term “or” is used in its inclusive sense (and not in its exclusive sense) so that when used, for example, to connect a list of elements, the term “or” means one, some, or all of the elements in the list. Conjunctive language such as the phrase “at least one of X, Y, and Z,” unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle, comprising:

a chassis;

a turntable movably coupled with the chassis;

a first camera and a second camera;

a telescoping device;

a display device in communication with a control system of the vehicle;

the display device configured to display at least one user interface; and the control system including one or more memory devices storing instructions thereon that, when executed by one or more processors, cause the one or more processors to:

receive first data indicating movement of the vehicle;

generate a first user interface including first image data from the first camera;

provide, responsive to generation of the first user interface, a first signal to the display device to cause the display device to display the first user interface;

in response to the first data indicating the movement of the vehicle, generate a second user interface including second image data from the second camera;

receive, via the first user interface or the second user interface, one or more selections of the first image data; and provide, based on the one or more selections, a second signal to the display device to cause the display device to display a third user interface.

2. The vehicle of claim 1, wherein the instructions cause the one or more processors to:

determine, using the first data, a first position of the chassis or a second position of the turntable; and identify the first camera and the second camera, and wherein the first camera and the second camera are disposed on the chassis or a counterweight of the turntable.

3. The vehicle of claim 1, wherein the first user interface includes an indication of a first position of the first camera and an indication of a second position of the second camera relative to the vehicle, and wherein the instructions cause the one or more processors to:

detect, based on second data, a change in a first position of the chassis or a change in a second position of the turntable; and generate, responsive to detection of the change in the first position of the chassis or the change in the second position of the turntable, a fourth user interface to provide an indication of the change in the first position of the chassis or the change in the second position of the turntable, the indication including an image of the chassis in the first position of the chassis or an image of the turntable in the second position of the turntable.

4. The vehicle of claim 1, wherein the first user interface includes a plurality of selectable elements associated with operation of the vehicle, and wherein the instructions cause the one or more processors to:

detect, via the first user interface, a selection of a first selectable element of the plurality of selectable elements, the first selectable element associated with the chassis; and generate, responsive to detection of the selection, a fourth user interface to include a list of operations performable by the chassis.

5. The vehicle of claim 1, wherein the instructions cause the one or more processors to:

determine, using the first data, a first orientation of the chassis relative to the turntable;

determine, using the first data, a first orientation of the turntable relative to the chassis; and generate, responsive to determination of the first orientation of the chassis and the first orientation of the turntable, a fourth user interface to include:

a graphical representation of the chassis in the first orientation of the chassis; and a graphical representation of the turntable in the first orientation of the turntable.

6. The vehicle of claim 1, wherein the instructions cause the one or more processors to:

receive, from a plurality of sensors, second data indicating a second movement of the vehicle;

determine, based on the second data, a change in a first position of the chassis or a change in a second position of the turntable;

identify, based on the change in the first position of the chassis or the change in the second position of the turntable, one or more third cameras disposed on the vehicle; and generate a fourth user interface to include a graphical representation of the one or more third cameras.

7. The vehicle of claim 1, wherein the instructions cause the one or more processors to:

receive, via the first user interface, a request to initiate a registration process for one or more third cameras, the one or more third cameras connected to a network that includes the vehicle;

detect, responsive to receipt of the request, the one or more third cameras;

determine, using information pertaining to the one or more third cameras, that a given camera of the one or more third cameras was previously absent from the network;

generate, for the given camera of the one or more third cameras, an identifier for use in the network;

generate a fourth user interface to include a window to register the given camera, the window including one or more selectable regions configured to receive input pertaining to the registration process for the one or more third cameras; and detect, responsive to an interaction with the fourth user interface, an indication that identifies a position of the given camera relative to the vehicle.

8. The vehicle of claim 1, wherein the instructions cause the one or more processors to:

associate, responsive to identification of a given camera of one or more third cameras of the vehicle, the given camera with at least one component of the vehicle, the given camera configured to provide a video feed that captures an area proximate to at least a portion of the at least one component of the vehicle;

update, responsive to association of the given camera, a record to reflect that the given camera is associated with the at least one component of the vehicle;

identify, using the record, a second given camera of the one or more third cameras associated with the at least one component of the vehicle;

generate, responsive to identification of the second given camera, a fourth user interface that includes video feeds provided by the given camera and the second given camera; and determine, responsive to an interaction with the fourth user interface, a position of the given camera relative to the second given camera.

9. A vehicle, comprising:

a chassis;

a turntable movably coupled with the chassis;

a first camera and a second camera; and a control system including one or more memory devices storing instructions thereon that, when executed by one or more processors, cause the one or more processors to:

receive first data indicating movement of the vehicle;

generate a first user interface including first image data from the first camera;

in response to the first data indicating the movement of the vehicle, generate a second user interface including second image data from the second camera, wherein the first user interface or the second user interface includes a plurality of selectable elements associated with operation of the vehicle;

detect, via the first user interface or the second user interface, a selection of a first selectable element of the plurality of selectable elements, the first selectable element associated with the chassis; and generate, responsive to detection of the selection, a third user interface to include a list of operations performable by the chassis.

10. The vehicle of claim 9, wherein the instructions cause the one or more processors to:

determine, using the first data, a first position of the chassis or a second position of the turntable; and identify the first camera and the second camera, and wherein the first camera and the second camera are disposed on the chassis or a counterweight of the turntable.

11. The vehicle of claim 9, wherein the first user interface includes an indication of a first position of the first camera and an indication of a second position of the second camera relative to the vehicle, and wherein the instructions cause the one or more processors to:

detect, based on second data, a change in a first position of the chassis or a change in a second position of the turntable; and generate, responsive to detection of the change in the first position of the chassis or the change in the second position of the turntable, a fourth user interface to provide an indication of the change in the first position of the chassis or the change in the second position of the turntable, the indication including an image of the chassis in the first position of the chassis or an image of the turntable in the second position of the turntable.

12. The vehicle of claim 9, wherein the instructions cause the one or more processors to:

determine, using the first data, a first orientation of the chassis relative to the turntable;

determine, using the first data, a first orientation of the turntable relative to the chassis; and generate, responsive to determination of the first orientation of the chassis and the first orientation of the turntable, a fourth user interface to include:

a graphical representation of the chassis in the first orientation of the chassis; and a graphical representation of the turntable in the first orientation of the turntable.

13. The vehicle of claim 9, wherein the instructions cause the one or more processors to:

receive, from a plurality of sensors, second data indicating a second movement of the vehicle;

determine, based on the second data, a change in a first position of the chassis or a change in a second position of the turntable;

identify, based on the change in the first position of the chassis or the change in the second position of the turntable, one or more third cameras disposed on the vehicle; and generate a fourth user interface to include a graphical representation of the one or more third cameras.

14. A vehicle, comprising:

a chassis;

a turntable movably coupled with the chassis;

a first camera and a second camera; and a control system including one or more memory devices storing instructions thereon that, when executed by one or more processors, cause the one or more processors to:

receive first data indicating movement of the vehicle;

generate a first user interface including first image data from the first camera;

in response to the first data indicating the movement of the vehicle, generate a second user interface including second image data from the second camera;

receive, via the first user interface or the second user interface, a request to initiate a registration process for one or more third cameras, the one or more third cameras connected to a network that includes the vehicle;

detect, responsive to receipt of the request, the one or more third cameras;

determine, using information pertaining to the one or more third cameras, that a given camera of the one or more third cameras was previously absent from the network;

generate, for the given camera of the one or more third cameras, an identifier for use in the network;

generate a third user interface to include a window to register the given camera, the window including one or more selectable regions configured to receive input pertaining to the registration process for the one or more third cameras; and detect, responsive to an interaction with the third user interface, an indication that identifies a position of the given camera relative to the vehicle.

15. The vehicle of claim 14, wherein the instructions cause the one or more processors to:

determine, using the first data, a first position of the chassis or a second position of the turntable; and identify the first camera and the second camera, and wherein the first camera and the second camera are disposed on the chassis or a counterweight of the turntable.

16. The vehicle of claim 14, wherein the first user interface includes an indication of a first position of the first camera and an indication of a second position of the second camera relative to the vehicle, and wherein the instructions cause the one or more processors to:

detect, based on second data, a change in a first position of the chassis or a change in a second position of the turntable; and generate, responsive to detection of the change in the first position of the chassis or the change in the second position of the turntable, a fourth user interface to provide an indication of the change in the first position of the chassis or the change in the second position of the turntable, the indication including an image of the chassis in the first position of the chassis or an image of the turntable in the second position of the turntable.

17. The vehicle of claim 14, wherein the instructions cause the one or more processors to:

determine, using the first data, a first orientation of the chassis relative to the turntable;

determine, using the first data, a first orientation of the turntable relative to the chassis; and generate, responsive to determination of the first orientation of the chassis and the first orientation of the turntable, a fourth user interface to include:

a graphical representation of the chassis in the first orientation of the chassis; and a graphical representation of the turntable in the first orientation of the turntable.

18. The vehicle of claim 14, wherein the instructions cause the one or more processors to:

receive, from a plurality of sensors, second data indicating a second movement of the vehicle;

determine, based on the second data, a change in a first position of the chassis or a change in a second position of the turntable;

identify, based on the change in the first position of the chassis or the change in the second position of the turntable, one or more third cameras disposed on the vehicle; and generate a fourth user interface to include a graphical representation of the one or more third cameras.

19. A vehicle, comprising:

a chassis;

a turntable movably coupled with the chassis;

a first camera and a second camera; and a control system including one or more memory devices storing instructions thereon that, when executed by one or more processors, cause the one or more processors to:

receive first data indicating movement of the vehicle;

generate a first user interface including first image data from the first camera;

in response to the first data indicating the movement of the vehicle, generate a second user interface including second image data from the second camera;

associate, responsive to identification of a given camera of one or more third cameras of the vehicle, the given camera with at least one component of the vehicle, the given camera configured to provide a video feed that captures an area proximate to at least a portion of the at least one component of the vehicle;

update, responsive to association of the given camera, a record to reflect that the given camera is associated with the at least one component of the vehicle;

identify, using the record, a second given camera of the one or more third cameras associated with the at least one component of the vehicle;

generate, responsive to identification of the second given camera, a third user interface that includes video feeds provided by the given camera and the second given camera; and determine, responsive to an interaction with the third user interface, a position of the given camera relative to the second given camera.

* * * * *